(12) United States Patent
Okayama

(10) Patent No.: US 6,879,745 B2
(45) Date of Patent: Apr. 12, 2005

(54) OPTICAL SWITCH

(75) Inventor: Hideaki Okayama, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 331 days.

(21) Appl. No.: 09/987,719

(22) Filed: Nov. 15, 2001

(65) Prior Publication Data

US 2002/0057862 A1 May 16, 2002

(30) Foreign Application Priority Data

Nov. 15, 2000 (JP) .......................................... 2000-348577
May 11, 2001 (JP) .......................................... 2001-142370

(51) Int. Cl.⁷ .............................. G02B 6/35; G02B 26/00
(52) U.S. Cl. .................................................................. 385/16
(58) Field of Search .................................. 385/16–19

(56) References Cited

U.S. PATENT DOCUMENTS

| | | | |
|---|---|---|---|
| 5,923,480 A | | 7/1999 | Labeye |
| 6,301,402 B1 | * | 10/2001 | Bhalla et al. .................. 385/16 |
| 6,522,802 B2 | * | 2/2003 | Hoen ............................ 385/18 |
| 6,600,849 B2 | * | 7/2003 | Ducellier et al. .............. 385/17 |
| 6,657,771 B2 | * | 12/2003 | Okayama ...................... 359/290 |
| 6,724,953 B2 | * | 4/2004 | Asahi ........................... 385/17 |

FOREIGN PATENT DOCUMENTS

JP    2000-10029    1/2000

OTHER PUBLICATIONS

H. Toshiyoshi et al., "Micromechanical Lens Scanners for Fiber Optic Switches", Proceedings 3ʳᵈ International Conference on Micro Opto Electro Mechanical Systems (MOEMS 99).
D.T. Neilson et al., "Fully Provisioned 112×112 Micro–Mechanical Optical Crossconnect With 35.8Tb/S Demonstrated Capacity", Optical Fiber Communication (OFC) 2000, Mar. 2000.

* cited by examiner

Primary Examiner—Akm Enayet Ullah
Assistant Examiner—Jerry T Rahll
(74) Attorney, Agent, or Firm—Wenderoth, Lind & Ponack, L.L.P.

(57) ABSTRACT

An optical switch includes an input side switching element having a plurality of optical input ports and an output side switching element having a plurality of optical output ports. The input side switching element is provided with an input side optical deflection element group consisting of two optical deflection elements at each of optical input ports. These optical deflection elements are arranged along the direction of incidence of optical signals that are directed into the optical input ports. Respective optical output ports of the output side switching element are provided with a group of output side optical deflection elements consisting of two optical deflection elements. These optical deflection elements are arranged along the direction of emission of optical signals emitted from the optical output ports. With an optical switch of this construction, setting of the deflection angle of the light beams propagated through the space can be achieved with excellent accuracy.

4 Claims, 44 Drawing Sheets

OPTICAL SWITCH

BACKGROUND OF THE INVENTION

1. Field of the Invention

The present invention relates to an optical switch whereby an optical signal that is input to any one of a plurality of input ports is output at any one of a plurality of output ports.

2. Description of Related Art

Prior art optical switches are disclosed in Reference 1 "Proceedings of the 3rd International Conference on Micro Opt Electro Mechanical Systems (MOEMS 99), Paper 26, Aug. 29, 1999", Reference 2 "U.S. Pat. No. 5,923,480, Jul. 13, 1999", Reference 3 "Laid-open Japanese Patent Publication No. 2000-10029" and Reference 4 "Optical Fiber Communication (OFC) 2000 Collected Papers, Paper PD 20, March 2000".

As an example of a prior art optical switch, the optical switch described in Reference 3: Laid-open Japanese Patent Publication No. 2000-10029 is illustrated in FIG. 44.

FIG. 44(A) is a diagram of the layout of this prior art optical switch 4400. This optical switch 4400 comprises several optical deflection elements 4402 (4402a, 4402b) and a mirror 4404.

Mirror 4404 is fixed in a prescribed position within optical switch 4400. Also, optical deflection elements 4402 are aligned and arranged on a substrate 4406 facing this mirror 4404, separated by a space.

The optical and deflection elements 4402 (4402a, 4402b) referred to above are respectively provided with optical input/output ports. The terminal sections of optical fibers 4408 (4408a, 4408b) are inserted into these optical input/output ports and, furthermore, these terminal sections are inserted into optical deflection elements 4402, and fixed in the interior thereof.

Next, the operation in an optical switch 4400 constructed as above will be described. In this optical switch 4400, input and output of light are performed simultaneously by respective optical input/output ports.

Light that is emitted from the terminal section of optical fiber 4408b is input to optical deflection element 4402b, where it is deflected. After this, light emitted from optical deflection element 4402b is reflected by mirror 4404 and again input to optical deflection element 4402a. It is then guided into optical fiber 4408a by this optical deflection element 4402a, and output from an optical input/output port.

Next, the construction of an optical deflection element 4402 is shown in FIG. 44(B). In this optical deflection element 4402, there are arranged optical fiber 4408 inserted from the optical input/output port, collimator lens 4410, fixed mirror 4412, and moveable mirror 4414.

The light that is input from the optical input/output port is output from the terminal section of optical fiber 4408 within optical deflection element 4402. This light is collimated by collimator lens 4410, reflected by fixed mirror 4412, and deflected in the direction of moveable mirror 4414. It is then reflected with a deflection angle that may be chosen at will at this moveable mirror 4414.

This moveable mirror 4414 is moveable biaxially, having an axis of rotation perpendicular to the direction of incidence of the light. Adjustment of the rotation of moveable mirror 4414 is performed using any desired means.

The light can therefore be reflected towards mirror 4404 (FIG. 44(A)) with any desired deflection angle at this moveable mirror 4414. The light is then emitted via mirror 4404 in the direction of a prescribed optical deflection element 4402a.

In contrast, light that is again input to optical deflection element 4402a advances in the opposite direction to the direction of the arrow shown in FIG. 44(B) and is deflected by moveable mirror 4414. After this, the light is reflected by fixed mirror 4412, collimated by collimator lens 4410, input into optical fiber 4408a, and output from the input/output port. In this case, adjustment of the angle of deflection is performed at moveable mirror 4414 in order to input the light into optical fiber 4408a.

As described above, an optical switch of this type is constituted by a single-stage group of optical deflection elements, respectively moveable mirrors or moveable lenses being employed for these. The optical signal is then directed to a prescribed output port by controlling the direction of the light beam propagated through the space using a moveable mirror (or moveable lens). With such an optical switch, expansion of the number of ports is easy, since three-dimensional spatial "path arrangement" is employed.

However, in a conventional optical switch, setting of the angle of deflection of the light beam that is propagated through the space must be performed with fairly high accuracy with a single deflection element. Also, as described below, achievement of this accuracy is extremely difficult.

The diameter of the optical fibers that are employed in an ordinary optical communication system is of the order of 8 micron. Unless the light is input to the optical fiber with a position offset accuracy of the order of one micron, loss of one dB or more is produced, causing problems in practical use. An output port separation of at least a few hundred microns is considered to be necessary in practical installation, so even in the case of a two-channel device, the deflection angle needs to be accurate to of the order of 0.1%. Furthermore, in the case of a device having a few tens of channels, accuracy of the level $10^{-4}$ is required.

Also, in the case of a hundred-channel device using a moveable mirror, accuracy of the deflection angle of the order of 1% is considered necessary. And in the case of a device of 1000 or more channels, accuracy of 0.3% is demanded.

Previously, as a method of solving this problem, the method is known of superimposing the position detection signal on the light beam so that the angle of deflection can be detected and feeding back the detected angle to the deflection angle control system. However, with this method, there is the drawback that high-speed switching cannot be performed, because of considerations involving the speed of electrical processing. The method is also known of incorporating an angle detection mechanism in the deflection mirror and controlling this by feedback, but it has the drawback that high accuracy is not obtained.

An object of the present invention is to alleviate the accuracy that is required for the optical deflection elements provided in an optical switch.

Also, a further object of the present invention is to increase the number of channels and to perform optical switching at high speed.

SUMMARY OF THE INVENTION

A first optical switch according to the present invention comprises an input side switching element having a plurality of optical input ports and an output side switching element having a plurality of optical output ports. This optical switch outputs optical signals input at any one of the optical input ports from any one of the optical output ports.

The aforementioned input side switching element comprises a group of input side deflection elements comprising a plurality of optical deflection elements arranged along the direction of incidence of the optical signals at the respective optical input ports. Also, the aforementioned output side switching element comprises a group of output side optical deflection elements comprising a plurality of optical deflection elements arranged along the direction of emission of the optical signals at the respective optical output ports.

With this first optical switch construction, the optical signals that are output from the optical fibers are directed onto each optical deflection element as incident beams, deflected by the plurality of optical deflection elements and emitted towards the desired optical output port. The accuracy of deflection angle is therefore apportioned to each of the optical deflection elements included in the input side optical deflection element group. Consequently, the required accuracy of each optical deflection element is alleviated.

Also, a second optical switch according to the present invention that comprises a plurality of optical input ports and a plurality of optical output ports and that outputs optical signals input at any one of the optical input ports from any one of the optical output ports, comprises an input side optical deflection element at each respective optical input port; comprises an output side optical deflection element at each respective optical output port; comprises an input side optical fiber connected to the optical input port and an output side optical fiber connected to the optical output port; and comprises an optical system for expanding the optical input/output angle of the input side optical fiber and output side optical fiber respectively, at the optical input port and optical output port.

With this second optical switch construction, the distance of the lens and lens focal point plane can be reduced while maintaining the necessary optical flux width, by increasing the diffraction angle. As a result, increase in the number of channels can be achieved while maintaining the necessary accuracy.

Also, a third optical switch according to present invention that comprises a plurality of optical input ports and a plurality of optical output ports and that outputs optical signals input at any one of the optical input ports from any one of the optical output ports, comprises an input side optical deflection element at each respective optical input port; comprises an output side optical deflection element at each respective optical output port; comprises an input side optical fiber connected to the optical input port and an output side optical fiber connected to the optical output port; and comprises an optical system for expanding the beam diameter at the optical input port and optical output port.

This optical system comprises a coupler constituting a waveguide section of large width and a collimator constructed of a plurality of small lenses arranged within a plane parallel with the terminal face of this coupler.

Accordingly, with this third optical switch construction, even if the diffraction angle is not increased in this collimator lens, increase in the number of channels can be achieved with the same optical flux diameter and focal point distance, while ensuring the necessary accuracy.

Also, a fourth optical switch according to the present invention that comprises a plurality of optical input ports and a plurality of optical output ports and that outputs optical signals input at any one of the optical input ports from any one of the optical output ports, comprises a moveable mirror having an axis of rotation perpendicular to the direction of incidence of the optical signal as an input side optical deflection element at each respective optical input port; comprises a moveable mirror having an axis of rotation perpendicular to the direction of emission of the optical signal as an output side optical deflection element at each respective optical output port; and an optical element for focusing light reflected by the moveable mirror on the input side onto the moveable mirror on the output side is provided between the input side optical deflection element and output side optical deflection element.

In this case, collimator lenses are provided at each optical input port between the moveable mirror and optical fiber provided at the optical input ports. Likewise, collimator lenses are provided at each optical output port between the moveable mirror and optical fiber provided at the optical output ports.

With this construction, the beams from the optical fibers provided at all of the optical input ports can be focused on a moveable mirror by means of these collimator lenses. Thus, the angular control accuracy of the moveable mirror is alleviated, so changeover of mirror angle can be performed rapidly.

Also, in the fifth and sixth optical switches of the present invention, there are provided an input side switching element having a plurality of optical input ports and an output side switching element having a plurality of optical output ports, optical elements being arranged between them. These optical elements cause the optical signals from the optical input ports to be input as incoming beams and cause the emitted beams corresponding to these incoming beams to be emitted such that the central optical paths of the ray bundles are mutually parallel. These emitted beams are then output again as optical signals to the optical fibers arranged corresponding to the respective optical output ports.

In an optical switch of this construction, convex lenses constituted by a single lens or holograms may be employed as optical elements.

Also, the output side switching element and input side switching element are arranged symmetrically to the front and rear on either side of these optical elements.

In the fifth optical switch, the plurality of input ports are respectively provided with input side lens systems respectively corresponding to these input ports; the plurality of output ports are respectively provided with output side lens systems respectively corresponding to these output ports; and a concave lens is arranged at the plane where light is emitted from the input side lens system to the output side switching element and at the plane where light is incident from the input side switching element to the output side lens system.

Consequently, in this fifth optical switch, the light emitted from each input port is converted to light that is dispersed after passing through this concave lens. The central optical paths of the ray bundles are then directed in mutually parallel fashion onto the output ports by the optical elements arranged between the output ports and input ports. Which output port they enter depends on the angle of emission from this concave lens. However, this angle of emission does not depend on the angle of incidence of the optical flux onto the concave lens.

In this fifth optical switch, when a concave mirror is employed as optical element, the input side switching element and output side switching element may be employed in common.

In a sixth optical switch, when a convex lens is employed as optical element, this convex lens is formed of a first convex lens and second convex lenses formed on either side of the first convex lens. The second convex lenses are each constituted by a single lens, but the first convex lens is a collimating element of a construction in which a plurality of lenses are arranged in a single plane.

In this sixth optical switch, the plurality of input ports respectively comprise an input side lens system respectively corresponding to these input ports; the plurality of output ports respectively comprise an output lens system respectively corresponding to these output ports; and the input side lens system and the output side lens system comprise a fixed lens (or moveable lens moveable in a plane perpendicular to the direction of incidence or direction of emission of the optical signal) and a moveable mirror having an axis of rotation perpendicular to the direction of incidence or direction of emission of the optical signal. These moveable mirrors are not arranged alternately with respect to the first convex lenses but are arranged continuously on the substrate.

The moveable mirrors arranged in the input side lens system are arranged at the focal point positions of the second convex lenses. Also, the input side switching element and output side switching element are arranged in symmetrical positions to the front and to the rear taking the optical elements as the axis of symmetry, such that all of the optical flux of the moveable mirrors arranged in the input side lens system can reach the output side switching element.

In the sixth optical switch of such a construction, since which of the moveable mirrors arranged in the output side lens system the optical signal will go to is determined by the relative position of the first convex lens and the position of the moveable mirror provided in the input side lens system, which output port the optical signal will be output from is determined by choosing the identity of this first convex lens.

Next, a seventh optical switch according to the present invention comprises input side switching elements having a plurality of input ports arranged in matrix fashion, and output side switching elements having a plurality of output ports arranged in matrix fashion. The input ports respectively have input side lens systems respectively corresponding to these input ports; and likewise the output ports respectively have output side lens systems respectively corresponding to these output ports. The optical signals that are output from the input port side are output to the output port side.

Furthermore, of the input side and output side lens systems, at least the input side and output side lens systems at the periphery of the matrix arrangement are fixed or moveable lens systems operating so as to enable optical signals passing through the input side lens systems of this periphery to be guided to output side lens systems in the middle of the matrix arrangement.

With the construction of the fifth to seventh optical switches as above, an increase in the number of channels can be achieved, since, when the beam is output to the output port, the range of values that the deflection angle can take is the same for all the deflection elements, no matter at which port, of the input ports of the input side switching element, they are situated.

Also, in the sixth and seventh optical switches, the drive is straightforward since the relationship of the angle of inclination of the moveable mirrors provided in the input side lens system with the output ports can be made a one-to-one correspondence.

Next, the eighth optical switch comprises an input side switching element having a plurality of optical input ports and an output side switching element having a plurality of optical output ports, the optical signal that is input at any one of the optical input ports being output from any one of the optical output ports.

In this eighth optical switch, the input side switching element comprises first and second optical units and the output side switching element comprises third and fourth optical units.

The first optical unit comprises a plurality of combinations of pairs of an input side light guide and incoming side lens system that focuses optical signals from this input side light guide, respectively corresponding to the optical input port. The second optical unit comprises a plurality of first moveable mirrors arranged corresponding to the incoming side lens systems and that reflect optical signals from these incoming side lens systems. The input side light guides are arranged corresponding to respective input side lens systems.

Also, the third optical unit comprises a plurality of second moveable mirrors that individually reflect optical signals from the moveable mirrors of the second optical unit. The fourth optical unit comprises a plurality of combinations of pairs of an emission side lens system that focuses the optical signals from the second moveable mirror and an output side light guide onto which optical signals are incident from this lens system, arranged respectively corresponding to the optical output ports.

Also, the first, second, third, and fourth optical units are provided on a common substrate.

Furthermore, within the first optical unit the input side light guide is fixed on a first substrate and the incoming side lens system is fixed on a second substrate and within the fourth optical unit the emission side lens system is fixed on a third substrate and the output side light guide is likewise fixed on a fourth substrate.

Preferably, in this eighth optical switch, the first substrate to the fourth substrate are substrates of small or the same thermal expansion coefficient.

Furthermore, in this eighth optical switch, the thermal expansion coefficients of the first substrate to the fourth substrate and also the common substrate are small or the same.

In this eighth optical switch, the optical signals emitted from the input side light guide provided in the first optical unit constitute incoming beams to the incoming side lens system, where they are focused and deflected towards the desired second moveable mirror provided in the third optical unit by the first moveable mirror provided in the second optical unit. The beam that is further deflected by this second moveable mirror is input to the output side light guide through a lens system provided in the fourth optical unit.

It may be assumed that the common substrate is expanded by temperature fluctuations. Under these conditions, the first optical unit and fourth optical unit expand in the same way as the common substrate.

However, if the coefficient of thermal expansion of the first substrate and second substrate and third substrate and fourth substrate are the same, even though offset of the position of incidence of the beam onto the first moveable mirror provided in the second optical unit occurs, the angle of incidence does not fluctuate. Since the temperature fluctuation in the angle of this first moveable mirror is small, the angle of propagation of the light beam does not change.

Thus, at the second moveable mirror provided in the third optical unit, only fluctuation of the incidence position of the light occurs; there is no fluctuation of angle of incidence. Also, since there is little change of angle with temperature of the second moveable mirror, even though the position of incidence of the light onto the emission side lens system fluctuates, there is no fluctuation of angle of incidence.

Thus, with this construction of the eighth optical switch, even if the temperature changes, positional offset of the focal point position is minimized and only offset of the angle of input to the optical fiber is produced, so there is little effect on the optical output; consequently, output power fluctuation due to temperature change can be suppressed.

Next, optical switch devices employing these first to eighth optical switches will be described. An optical switch device using an optical switch according to the present invention comprises an optical switch having a moveable section for switching, a monitor section that monitors the emitted light from this optical switch, and an operation control section for adjusting the control condition of switching of the optical switch by controlling the moveable section for switching in response to a monitoring signal from this monitor section.

This optical switch device comprises a first optical switch and second optical switch.

The moveable section for switching comprises first optical signal introduction means and second optical signal introduction means of completely identical construction that input optical signals to the first and second optical switches; the monitor section also comprises first optical signal output means and second optical signal output means of completely identical construction.

The first and second optical signal introduction means comprise a monitoring signal output source and a signal synthesizing or multiplexing section; the monitoring signal output from the monitoring signal output source and the input optical signal are converted into a single synthesized or multiplexed signal by a signal synthesizing section and then input to the first and second optical switches.

Also, the first and second optical signal output means comprise an optical signal distribution section and a monitor; the optical signal distribution section distributes and outputs the optical signal output from an optical switch to outside the monitor and optical switch device.

Furthermore, in this optical switch device, the first and second optical signal output means are provided with a filter whereby only the optical signal is extracted from the synthesized signal output from the optical signal distribution section and output to outside the optical switch device. The operation of the monitoring signal output source is controlled by the operation control section.

Preferably, apart from being employed for standby use, the second optical switch is also employed for multi-casting optical signals from switching moveable section to the first and second optical signal output means.

Accordingly, with this construction of an optical switch device, condition monitoring of the optical switch becomes possible and furthermore the provision of a standby system and the function of multi-casting in two directions can be achieved with a small number of components.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
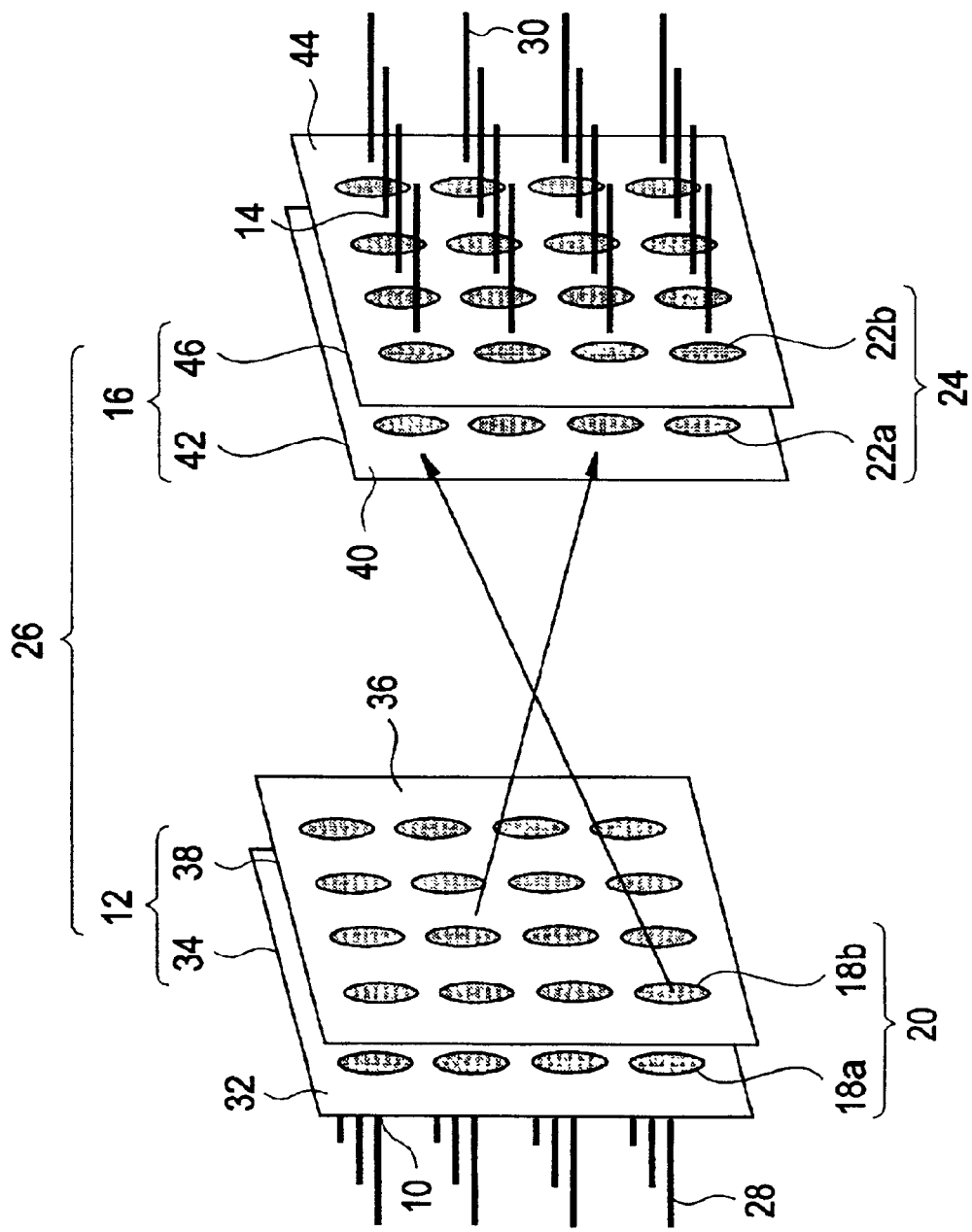
FIG. 1 is a diagram illustrating the construction of an optical switch according to a first embodiment.

Embodiments of the present invention are described below with reference to the drawings. It should be noted that, in the drawings, the shape, size and arrangement relationships are illustrated only diagrammatically to a degree such as to enable comprehension of the present invention. Accordingly, the present invention is in no way restricted to the examples illustrated. Furthermore, in the drawings used in the description, similar structural components are given the same reference symbols and repeated description is thereby avoided.

Also, in order to describe the operation of these embodiments, the shape of the optical flux is illustrated as needed. Also, the optical system with which the present invention is concerned is assumed to be a paraxial ray system.

[First Embodiment]

FIG. 1 is a perspective view illustrating the construction of an optical switch according to the first embodiment. This optical switch 26 comprises an input side switching element 12 having a plurality of optical input ports 10 and an output side switching element 16 having a plurality of optical output ports 14. The light rays are shown by the arrows in FIG. 1. With this optical switch, optical signals that are input at any one of the optical input ports 10 are output from any one of the optical output ports 14.

The input side switching element 12 described above comprises an input side optical deflection element group 20 consisting of two optical deflection elements 18a and 18b at each respective optical input port 10. These optical deflection elements 18a and 18b are arranged along the direction of incidence of the optical signals that are directed into the optical input port 10.

Also, the output side switching element 16 described above comprises an output side optical deflection element group 24 consisting of two optical deflection elements 22a and 22b at each respective optical output port 14. These optical deflection elements 22a and 22b are arranged along the direction of emission of the optical signals that are emitted from the optical output port 14.

Input side switching element 12 and output side switching element 14 are structurally the same.

In this example, optical fibers 28 are employed as optical input means to the input side switching element 12. The output terminal faces of these optical fibers 28 are connected to the aforementioned optical input port 10. Also, optical fibers 30 are employed as optical output means from the output side switching element 16. The input terminal faces of these optical fiber 30 are connected with the aforementioned optical output port 14.

In this way, with the optical switch of this embodiment, three-dimensional optical path arrangement is constituted between the input side optical fiber group and output side optical fiber group. Also, the optical deflection element group described above for realizing this three-dimensional optical path arrangement is of a two-stage construction comprising two optical deflection elements. Thus, whereas in the case of the conventional construction the optical deflection element group is constituted by a single-stage construction, in this embodiment, it is constituted by a two-stage construction.

It should be noted that, in this embodiment, one optical deflection element 18a constituting the input side optical deflection element group 20 is arranged on a substrate 32. A first deflection element array 34 is constituted by arranging optical deflection elements 18a of each port on substrate 32. Likewise, the optical deflection elements 18b on the other side constituting input side optical deflection element group 20 are arranged on another substrate 36. Second deflection element array 38 is constituted by arranging optical deflection elements 18b of each port on substrate 36. These first and second deflection element arrays 34 and 38 constitute input side switching element 12.

Also, the optical deflection elements 22a on one side constituting output side optical deflection element group 24 are arranged on substrate 40. Third deflection element array 42 is constituted by arranging the optical deflection elements 22a of each port on substrate 40. Likewise, the optical deflection elements 22b on the other side constituting output side optical deflection element group 24 are arranged on another substrate 44. A fourth deflection element array 46 is constituted by arranging optical deflection elements 22b of each port on substrate 44. These third and fourth deflection element arrays 42 and 46 constitute output side switching element 16.

It should be noted that the optical deflection elements could be arranged separately and individually, or could be arranged divided onto a plurality of substrates.

In this embodiment, first, second, third and fourth deflection element arrays 34, 38, 42 and 46 are arranged in this order such that substrates 32, 36, 40 and 44 are parallel.

Also, optical fibers 28 and 30 are held in an aligned condition by respective holding members, not shown, such as for example substrates. Guides for locating the optical fibers in position with precise positional accuracy on such substrates are formed by various suitable methods.

In this embodiment, moveable lenses are employed as the aforementioned optical deflection elements 18a, 18b, 22a and 22b. These moveable lenses are lenses that are moveable within a plane perpendicular with respect to the direction of incidence or the direction of emission of the optical signals. Also, the focal point instances of the two moveable lenses constituting optical deflection element groups 20 and 24 are different.

Figure 2:
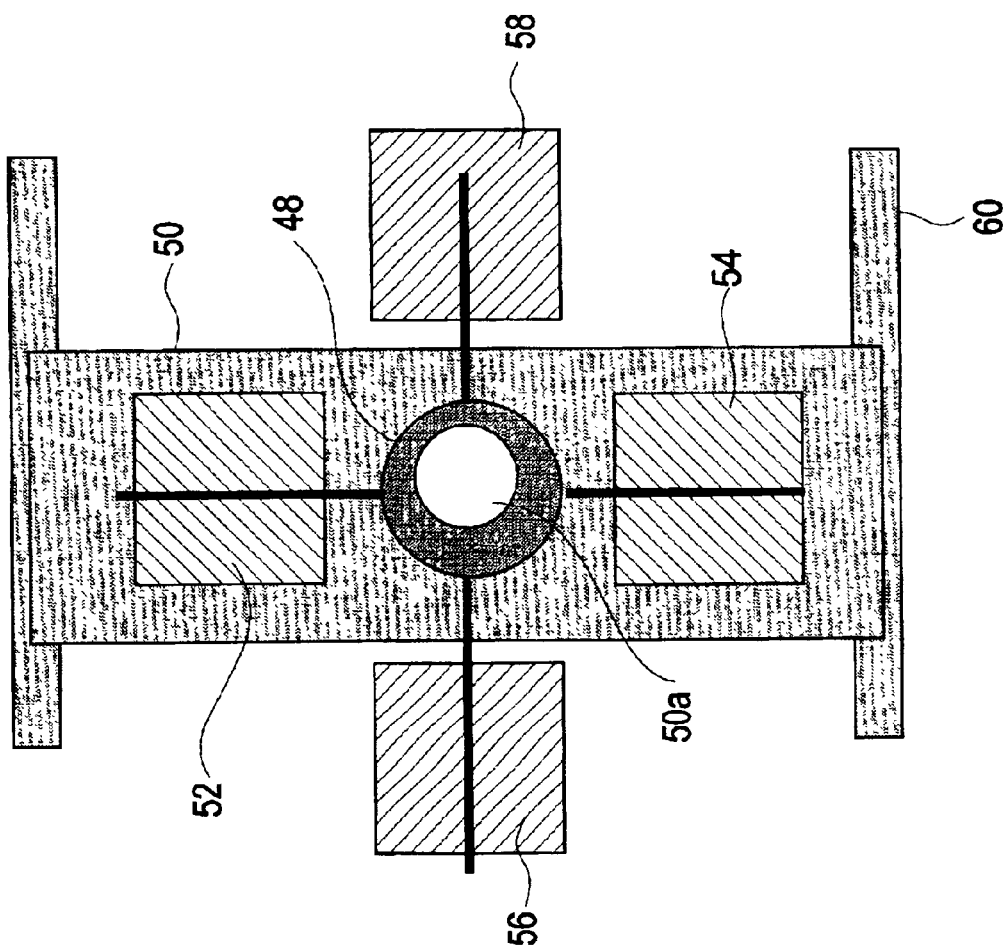
FIG. 2 is a view illustrating a constructional example of a moveable lens.

FIG. 2 is a plan view illustrating a constructional example of a moveable lens. Lens 48 is held by four actuators 52, 54, 56 and 58 on a micro movement base 50. Lens 48 is moved in one direction (the vertical direction in the Figure in the case of the example of FIG. 2) within the plane of micro movement base 50 by driving of actuators 52 and 54. Also, lens 48 is moved in the left/right direction in FIG. 2 by driving of actuators 56 and 58. The face of micro movement base 50 has formed therethrough a light passage hole 50a and lens 48 moves relatively with respect to this hole 50a. Also, micro movement base 50 can be moved in the left/right direction in FIG. 2 such that little vibration is generated, by being supported by slider 60. This construction is merely one example and various other constructions could be employed.

Figure 3:
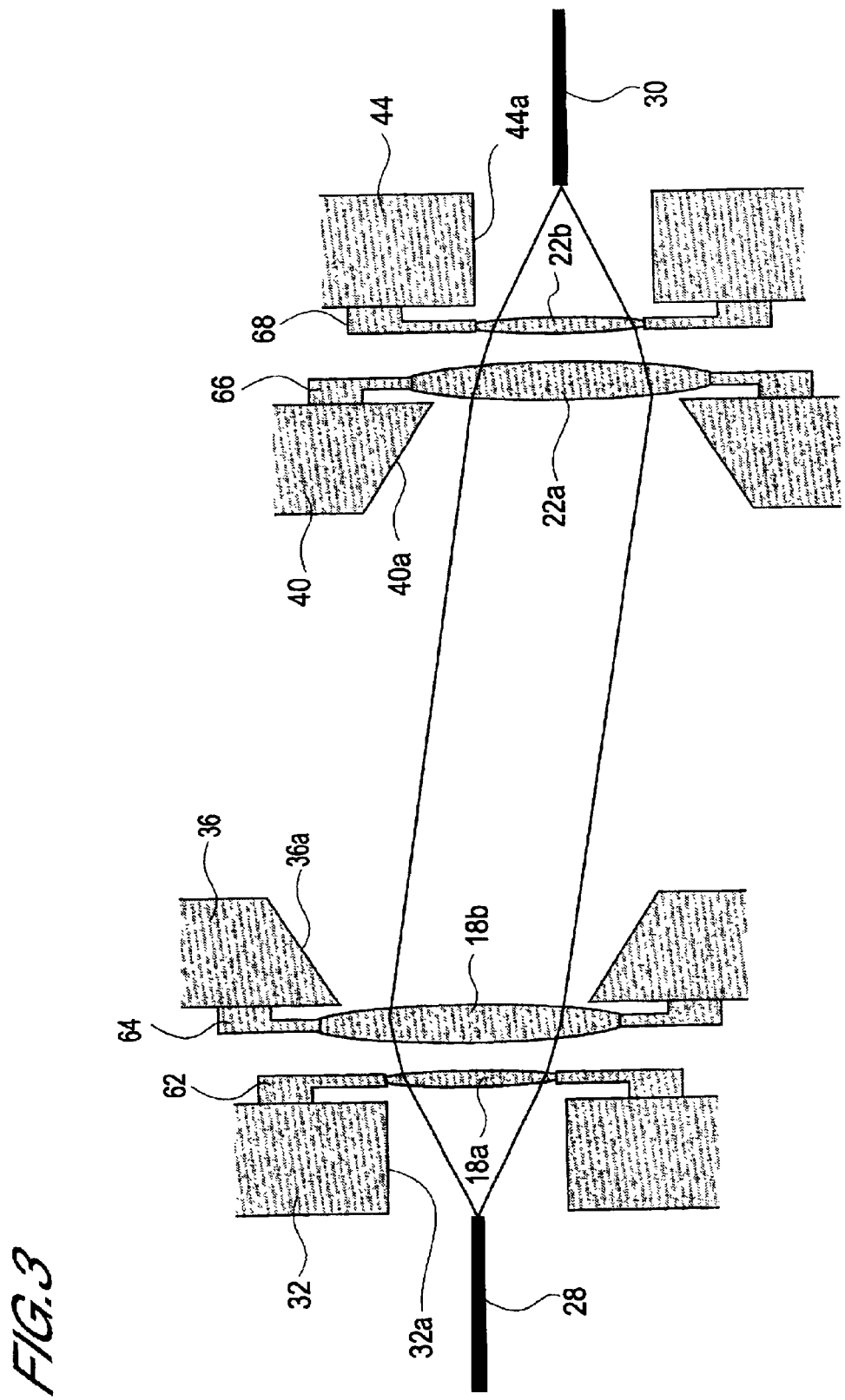
FIG. 3 is a view illustrating the cross section of part of an optical switch.

FIG. 3 is a view showing a cross-section of part of the optical switch illustrated in FIG. 1. As shown in FIG. 3, moveable lenses are employed as optical deflection elements 18a, 18b, 22a and 22b. Moveable lens 18a is held by means of actuator 62 on substrate 32. Moveable lens 18b is held by actuator 64 on substrate 36. Moveable lens 22a is held by actuator 66 on substrate 40. Moveable lens 22b is held by actuator 68 on substrate 44. The moveable lenses are capable of movement along the substrate faces by means of the actuators.

Apertures 32a, 36a, 40a and 44a for passage of light are formed respectively in substrates 32, 36, 40 and 44. Since the angles of optical deviation on the side of substrates 36 and 40 are large, if substrates 36 and 40 are thick, they must be chamfered as shown in the drawing so that the optical flux does not strike them. It should be noted that the aforementioned apertures are not necessarily essential if substrates 32, 36, 40 and 44 are of a material that is transparent with respect to the wavelength of light used. Also, substrate 32 and substrate 36 are stuck on with spacers interposed in order to achieve a separation between lens 18a and lens 18b. Likewise, substrate 40 and substrate 44 are stuck on with spacers interposed in order to achieve a separation between lens 22a and 22b.

As shown in FIG. 3, the light emitted from input side optical fiber 28 is converted into parallel light by lens pair 18a and 18b of the input side switching element, and is then focused onto the output side optical fiber 30 by lens pair 22a and 22b of the output side switching element.

Figure 4:
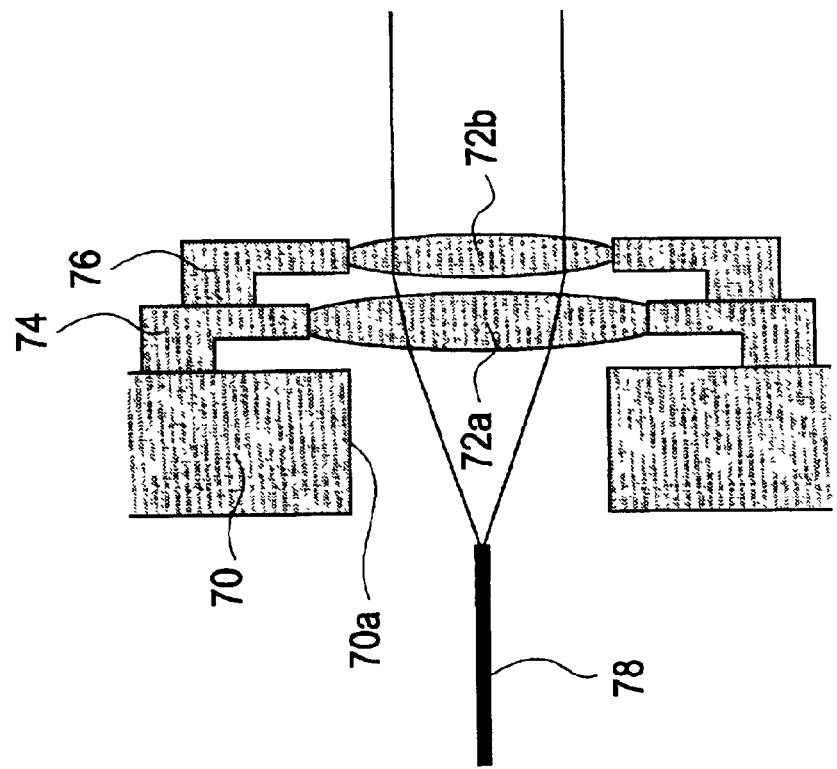
FIG. 4 is a view illustrating the cross section of an input side switching element.

Also, a construction as shown in FIG. 4 may be adopted. FIG. 4 is a view showing the cross-section of an input side switching element. An aperture 70a for passage of emitted light from optical fiber 78 is formed in substrate 70. An optical deflection element group is provided at the position of this aperture 70a. In this example, a pair of optical deflection elements constituting an optical deflection element group is provided on a single substrate 70. Specifically, moveable lens 72a, constituting the first-stage optical deflection element, is held on substrate 70 by means of actuator 74. Furthermore, moveable lens 72b constituting the second-stage optical deflection element, is held on actuator 74 by means of actuator 76. In this way, the actuators are constituted as a multi-stage construction. Lenses 72a and 72b are independently driven by respective actuators 74 and 76. Lenses 72a and 72b can be moved along the surface of substrate 70.

As will be described, if for example coarse adjustment of deflection angle is performed by lens 72a and fine adjustment of deflection angle by lens 72b, in principle, an arrangement as shown in FIG. 4 is desirable. However, if the actuators are constructed by a micro-machine manufacturing technique on a substrate, it is difficult to construct multi-stage actuators, so the present situation is that an arrangement as shown in FIG. 3 is easier to construct. However, even in the case of the arrangement of FIG. 4, this can be realized by constructing lenses 72a and 72b using an ultrasonic drive motor system and micro-lens as employed in for example a camera.

Next, the principles of operation of the optical switch of this embodiment will be described with reference to FIG. 5 to FIG. 10.

Figure 5:
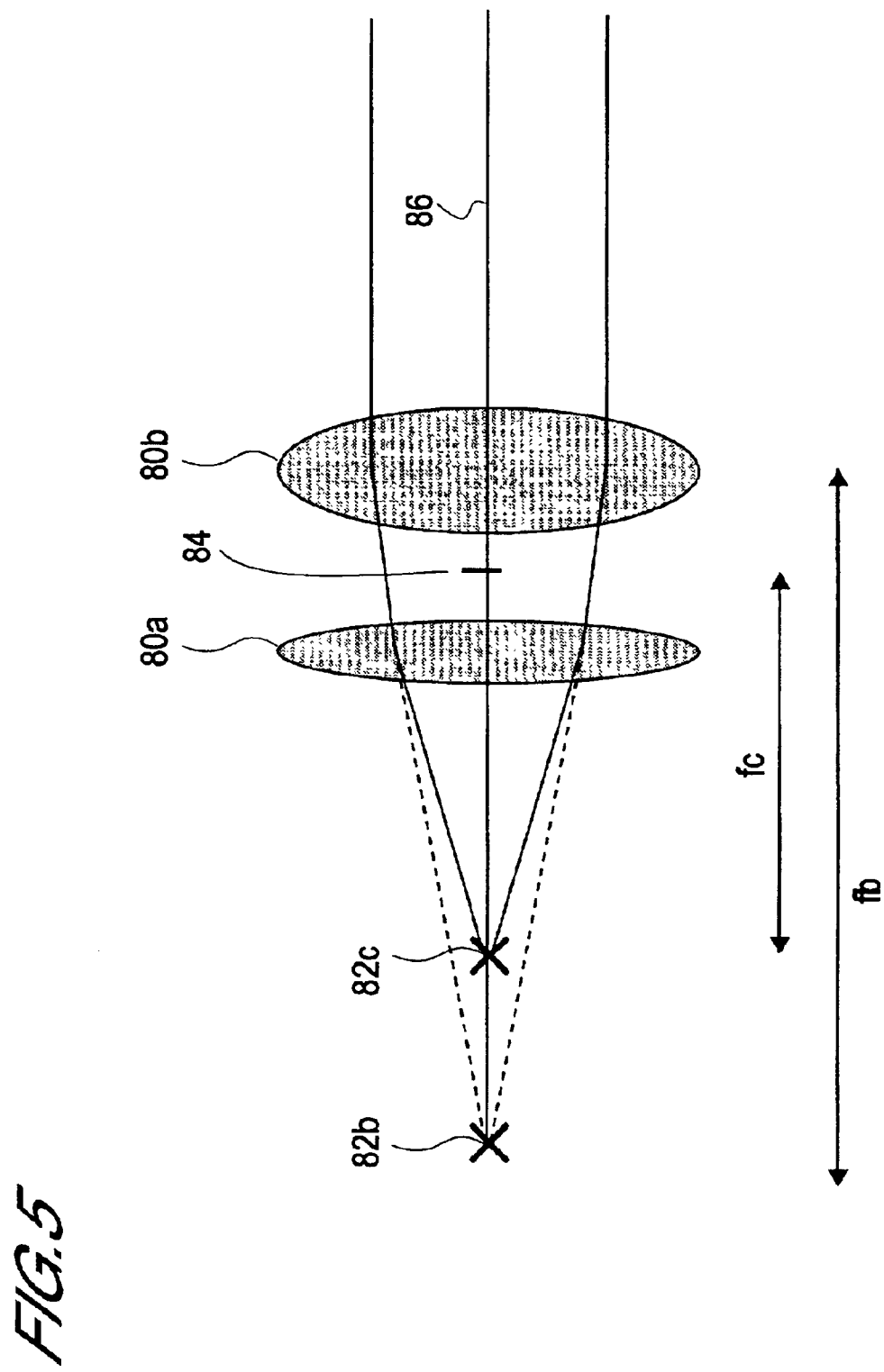
FIG. 5 is a view given in explanation of the principles of operation of an optical switch according to an embodiment.

Lenses 80a and 80b respectively corresponding to optical deflection elements 18a and 18b shown in FIG. 1 are illustrated in FIG. 5. Let the focal point distance of lens 80b be fb. Parallel light that is incident on lens 80b is focused at the position of focal point 82b separated by a distance fb from lens 80b. When lens 80a is assembled with lens 80b, the position of the focal point is moved. The focal point 82c after movement is at a position separated by a distance fc from the center 84 of a lens that performs an equivalent action to the compound lens system obtained by combination of lenses 80a and 80b. As shown in FIG. 3, the light source i.e. optical fiber is used with its terminal face placed at focal point 82c. In FIG. 5, center line 86 is a line passing through focal point 82c and center 84. If the focal point distance of lens 80a is assumed to be fa, the relationship of the following expression (1) obtains:

$$1/fc = 1/fa + 1/fb \quad (1)$$

Figure 6:
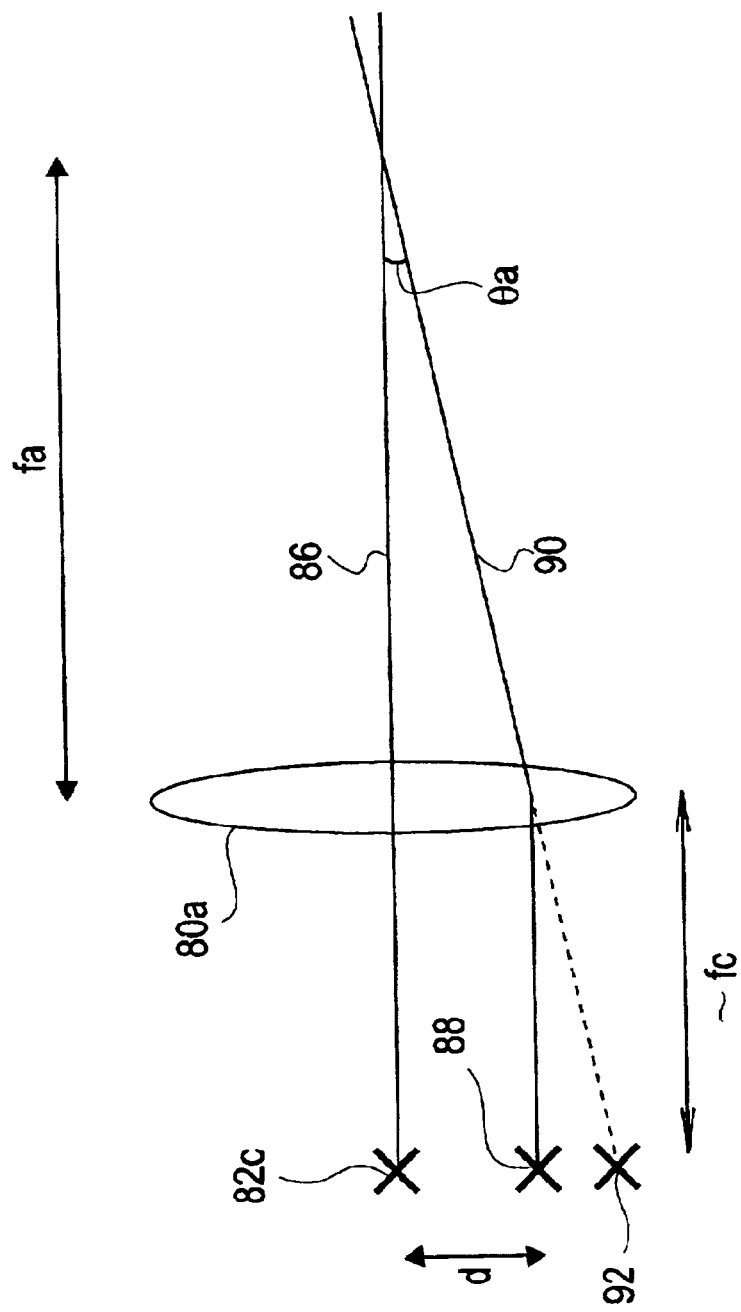
FIG. 6 is a view given in explanation of the principles of operation of an optical switch according to an embodiment.

Lens 80a is shown in FIG. 6. The focal point 82c of the equivalent lens described above is shown on center line 86. As described above, usually, the light source is placed at the position of this focal point 82c. Next, the case will be considered where the light source is moved by a distance d in a direction perpendicular with respect of the center line 86 from focal point 82c. When lens 80a and the center 84 of the equivalent lens are comparatively close, the distance of position 88 and lens 80a after movement of the light source is practically equal to fc. Hereinbelow, this distance will be represented by ~fc.

When the light source is at the position of focal point 82c, the center of the optical flux is on the center line 86. However, if the light source is displaced to position 88, the center of the optical flux is refracted in the direction of the line 90 intersecting with the center line 86 at a position separated from lens 80a by the focal point distance fa. In this case, a condition is produced that is equivalent to a virtual light source at a position 92 separated by ~fc from lens 80a on the extension of line 90. Furthermore, the focusing effect of the light achieved by lens 80a is equivalent to when the light source is at the position of focal point 82c. That is, it is approximately equal to the condition where the light source is at position 92 and lens 80a is placed perpendicular to line 90. Let the angle with which lines 86 and 90 intersect i.e. the angle of deflection be θa. The following expression (2) is then established:

$$\theta a = \tan^{-1}(d/fa) \quad (2)$$

Figure 7:
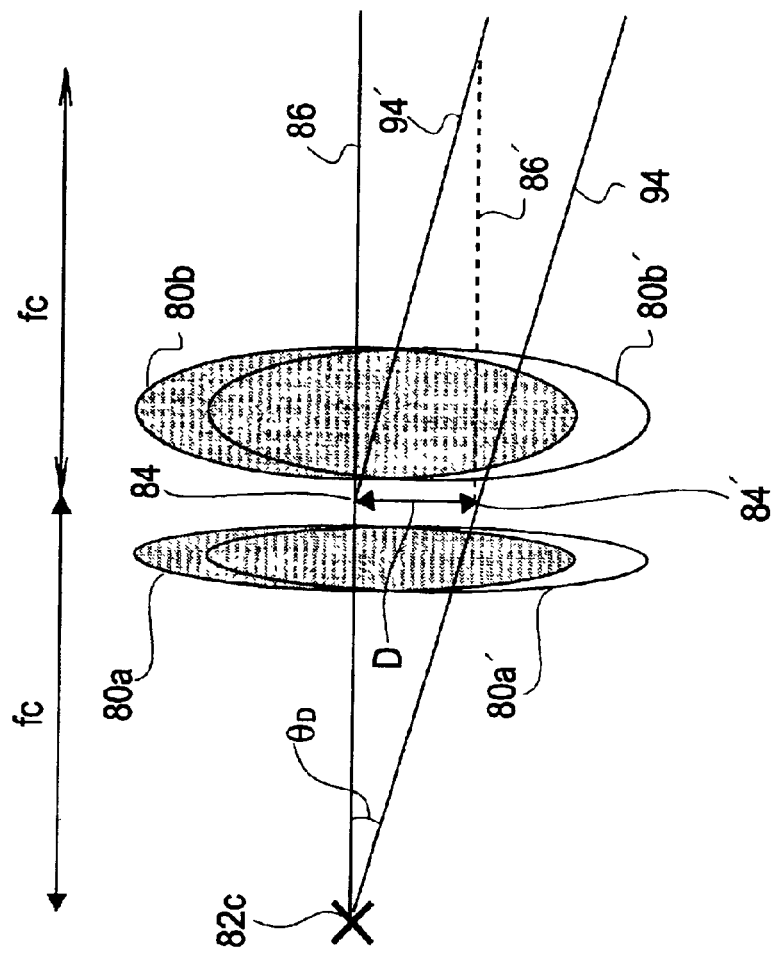
FIG. 7 is a view given in explanation of the principles of operation of an optical switch according to an embodiment.

Next, we return to the description of the operation of a compound lens system comprising lens 80a and 80b. FIG. 7 shows the condition in which the compound lens system has moved by a distance D in the direction perpendicular to center line 86 from on the center line 86. Also, in FIG. 7, lens 80a' and 80b' are shown after movement of lens 80a and 80b. Also, FIG. 7 shows the center line 86' after movement of center line 86 and center 84' after movement of center 84 of the compound lens system. When the light source is in the position of focal point 82c, the light advances along the line 94 joining focal point 82c and center 84'. The angle made by center line 86 and line 94 i.e. deflection angle $\theta_D$ is expressed by the following expression (3):

$$\theta_D = \tan^{-1}(D/fc) \quad (3)$$

Figure 8:
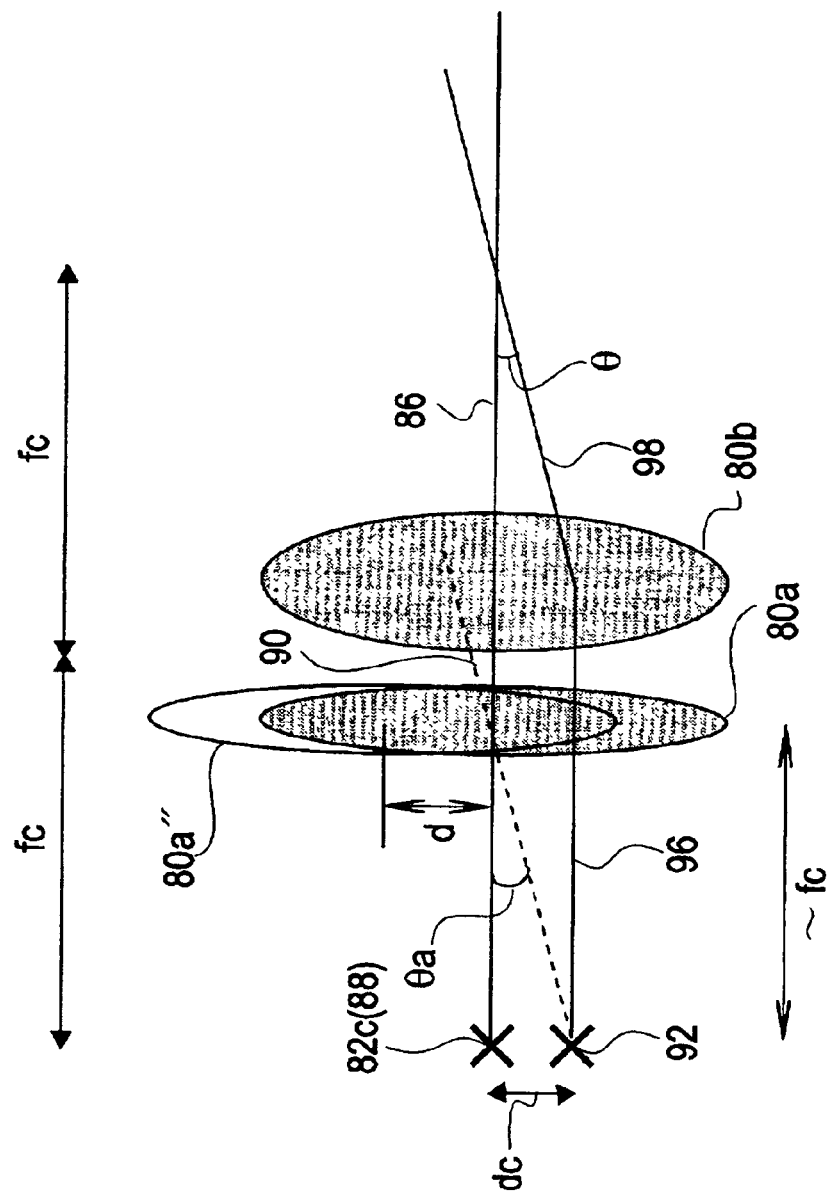
FIG. 8 is a view given in explanation of the principles of operation of an optical switch according to an embodiment.

Next, as shown in FIG. 8, the case where only lens 80a is moved i.e. where lens 80a is moved relative to lens 80b will be considered. Lens 80a is moved by a distance d in a direction perpendicular to center line 86 from on center line 86. FIG. 8 shows lens 80a" after movement of lens 80a. In this condition, just as in the case shown in FIG. 6, the light emitted from the light source positioned at focal point 82c (corresponding to position 88 of FIG. 6) is refracted in the direction of line 90. This therefore appears from lens 80b as if there is a light source at virtual position 92 on the other side of the lens perpendicular to line 90. Let the displacement from the original position 88 of the light source of virtual position 92 be dc. Using the results described with reference to FIG. 6, the following expression (4) is obtained:

$$dc = \sim fc \cdot \tan \theta a = \sim fc \cdot d/fa \quad (4)$$

Also, the emitted light 96 from the light source placed at position 92 is refracted into the direction of line 98 by lens 80b. Taking into account the focal point distance of the system of the two lenses, namely, the tilted lens and lens 80b, the angle made by lines 86 and 98 i.e. the deflection angle θ is given by the following expression (5):

$$\theta = \tan^{-1}(dc/fc) = \tan^{-1}[(d/fa)(\sim fc/fc)] \quad (5)$$

Figure 9:
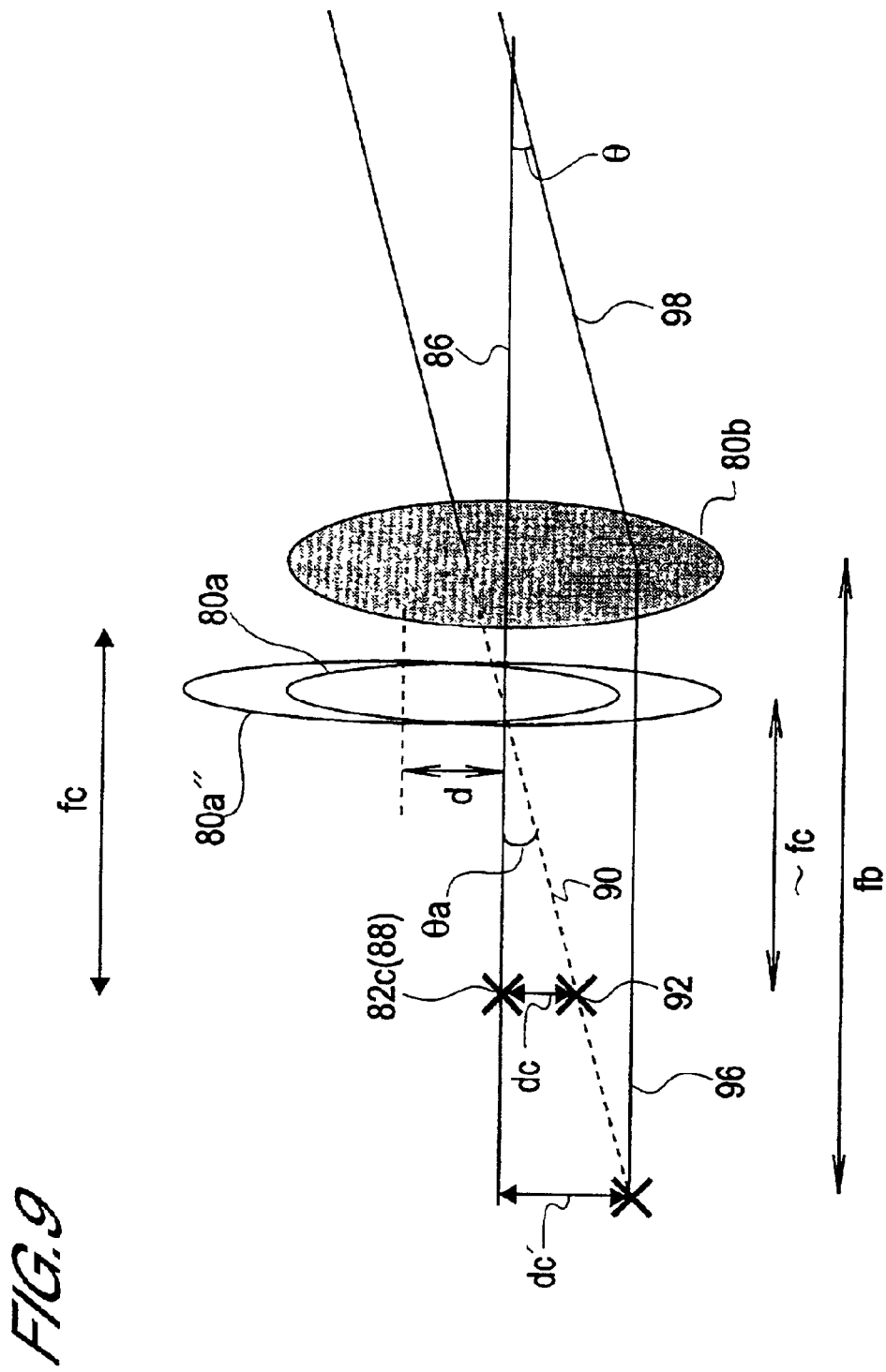
FIG. 9 is a view given in explanation of the principles of operation of an optical switch according to an embodiment.

Next, the results of the above expression (5) will be introduced from another viewpoint. In FIG. 9, there is no lens 80a (however, in FIG. 9, the position where lens 80a was is indicated by the symbol 80a). The arrangement of FIG. 9 corresponds to arrangement in which the arrangement of FIG. 8 is altered to a case where the light source is at the virtual position 82b as shown in FIG. 5. Line 90 in FIG. 9 shows how the light would advance if the light source were displaced in this direction if there were no lens 80a. As shown in FIG. 5, the focal point position when there is no lens 80a becomes a position 92' separated by a distance fb from lens 80b. It is assumed that the virtual light source is positioned at position 92'. The position 92' of the light source is separated by dc' with respect to center line 86. Distance dc' is expressed by the following expression (6):

$$dc' = dcfb/fc = (\sim fc/fc)(fb/fa)d \quad (6)$$

Also, the emitted light 96 from a light source positioned at position 92' is refracted in the direction of line 98 by lens 80b. The angle made by lines 86 and 98 i.e. the deflection angle θ is given by the following expression (7):

$$\theta = \tan^{-1}(dc'/fb) = \tan^{-1}[(d/fa)(\sim fc/fc)] \quad (7)$$

The same results as in the case of expression (5) described above are therefore obtained.

As described above, the deflection angle $\theta_D$ is determined by the ratio D/fc of the movement distance d of lens system 80a and 80b and the focal point distance fc of the compound lens system. Also, if it is assumed that (~fc/fc) is close to 1, the deflection angle θ is determined by the ratio d/fa of the relative distance d of lens 80a with respect to lens 80b and the focal point distance fa of lens 80a. It is assumed that movement distance D and d are of similar magnitude, since similar actuators are employed. Also, if the focusing power of lens 80b is made large (i.e. the focal point distance fb is made small) and the focusing power of lens 80a is made small (i.e. focal point distance fa is made large), fb/fa=r<<1. Also, in this case, $\theta_D/\theta$ is practically equal to fa/fc. fa/fc= (r+1)/r, so fa/fc>>1. Consequently, since $\theta_D/\theta$>>1, coarse adjustment of angle of deflection can be performed by means of deflection angle $\theta_D$ and fine adjustment of angle of deflection can be performed by deflection angle θ. Assuming that the positional accuracy is δ, the angular accuracy in the case of $\theta_D$ is δ/fc=$\theta_D$δ/D and in the case of θ is δ/fa=θδ/D, so it has the same value (δ/D) in terms of a ratio with respect to the maximum deflection angle. The accuracy of $\theta_D$ and θ is 1:r in absolute value.

Figure 10:
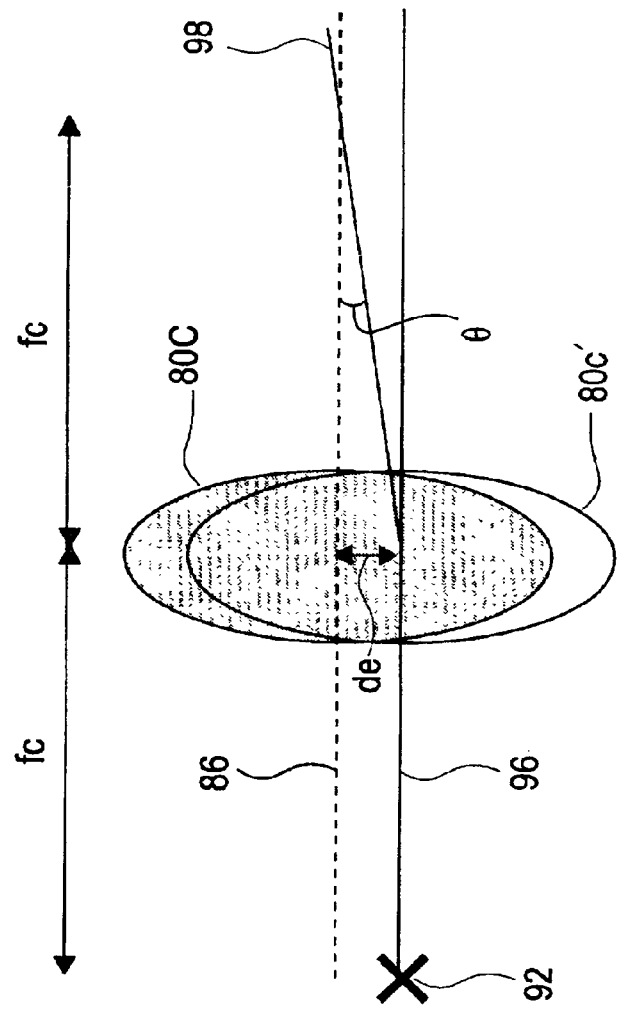
FIG. 10 is a view given in explanation of the principles of operation of an optical switch according to an embodiment.

It is also possible to adopt the following viewpoint. FIG. 10 shows the configuration when the compound lens system of lenses 80a and 80b is substituted by a single lens 80c. The focal point distance of this lens 80c is fc. If such a substitution is performed, the condition of FIG. 8 and FIG. 9 becomes equivalent to the case where lens 80c is moved by distance de from center line 86.

As shown in FIG. 10, the emitted light 96 from the light source positioned at position 92 is refracted in the direction of line 98 by lens 80c. The angle made by lines 86 and 98 i.e. the deflection angle θ is given by the following expression (8):

$$\theta = \tan^{-1}(de/fc) \quad (8)$$

From expressions (4) and (5), the following expression (9) is established:

$$de = (\sim fc/fa)d = dc \quad (9)$$

That is, this is equivalent to the situation where lens 80c is moved by an amount ~fc/fa=r smaller than the actual movement distance d of lens 80a. It may therefore be seen that coarse adjustment of deflection angle can be performed by moving the compound lens system of 80a and 80b simultaneously and fine adjustment of deflection angle performed by moving just lens 80a.

As described above, since the optical deflection element group is constituted by lens 80a of small focusing power and lens 80b of large focusing power, the deflection angle accuracy can be apportioned to respective lenses. If there are a few tens of channels, an accuracy of a few % is sufficient in the case of lens 80a. In this case, in the case of lens 80b, an accuracy of a fraction of 1% of low denominator is required in order to achieve accuracy of one micron in a few hundred micron of the adjacent channel separation. In this way, the accuracy of $10^{-4}$ (i.e. $10^{-4} \times 100 = 10^{-2}\%$) that was conventionally considered to be necessary is apportioned to two elements. For example if the accuracy of lens 80a is made to be of the order of $10^{-2}$ (200 micron), an accuracy of the order of $10^{-2}$ can be employed in the case of lens 80b also. The accuracy that is required overall can thereby be obtained by a simple and straightforward lens position detection method.

The above discussion applies also in the case where the lens system is constituted of three or more lenses. For example, a compound lens system may be considered in which the compound lens system of lenses 80a and 80b is replaced by a lens 80c and a new lens is added to this lens 80c. In this case, the adjustment accuracy of the deflection angle is apportioned to three lenses. If $\alpha$ is the number of lenses, the positional accuracy required for lens 80c and the new lenses, respectively, may be further alleviated to the order of $10^{-1}/\alpha$ ($\alpha=2$). In this way, benefits may be further increased by constituting the moveable lens system by three or more moveable lenses.

It should be noted that, although, in this embodiment, the lens of smaller focusing power and the lens of larger focusing power were arranged in that order from the input side as the optical deflection element group, an arrangement that is the reverse of this could be adopted, in which the lens of larger focusing power and the lens of smaller focusing power are arranged in that order from the input side.

[Second Embodiment]

Figure 11:
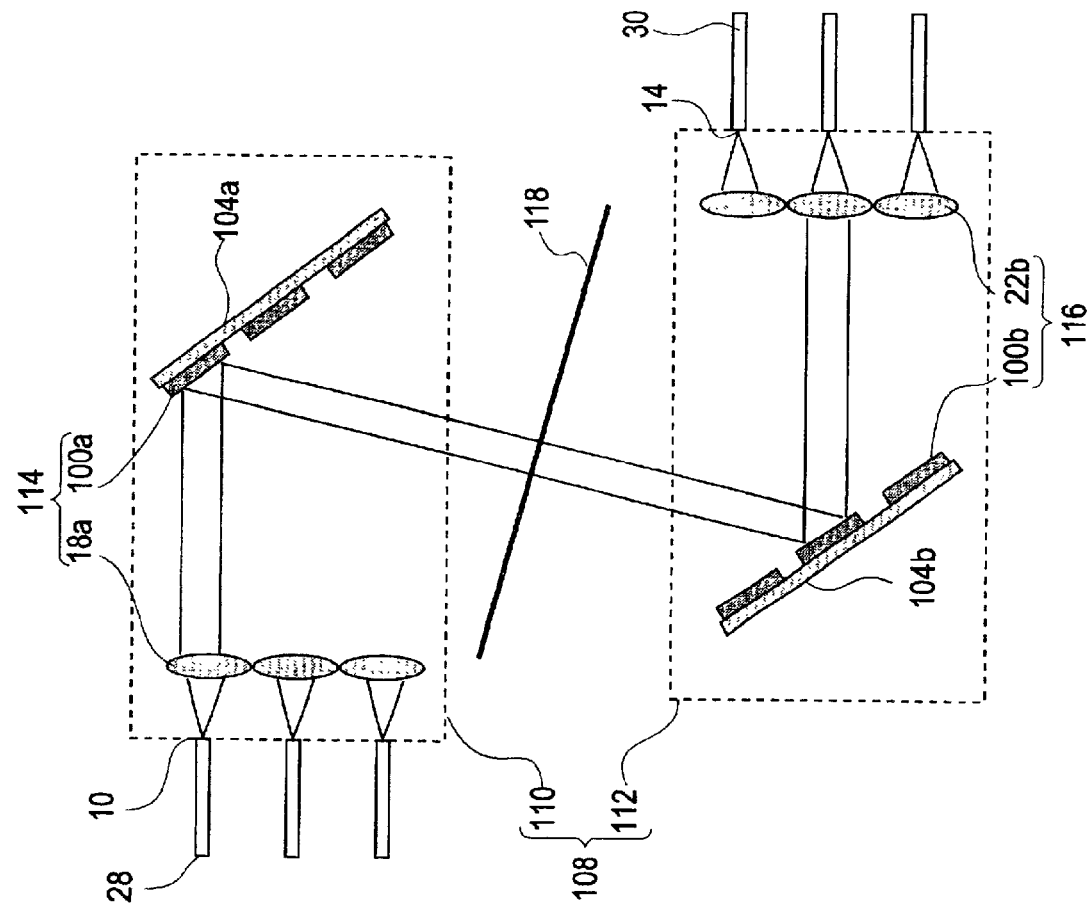
FIG. 11 is a view illustrating the construction of an optical switch according to a second embodiment.

FIG. 11 is a view showing the arrangement of an optical switch according to a second embodiment. This optical switch 108 comprises an input side switching element 110 having a plurality of optical input ports 10 and an output side switching element 112 having a plurality of optical output ports 14.

In the input side switching element 110 mentioned above, there is provided an input side optical deflection element group 114 comprising two optical deflection elements 18a and 100a at each respective optical input port 10. These optical deflection elements 18a and 100a are arranged along the direction of incidence of the optical signal that is launched into optical input port 10.

Also, the output side switching element 112 mentioned above comprises an output side optical deflection element group 116 comprising two optical deflection elements 100b and 22b at each respective optical output port 14. These optical deflection elements 100b and 22b are arranged along the direction of emission of the optical signal emitted from optical output port 14.

The input side switching element 110 and output side switching element 112 are structurally identical.

In this example, optical fibers 28 are employed as the optical input means to the input side switching element 110. The output terminal faces of these optical fibers 28 are connected to the optical input port 10 described above. Also, optical fibers 30 are employed as the optical output means from output side switching element 112. The input terminal faces of these optical fiber 30 are connected to the optical output port 14 described above.

Figure 12:
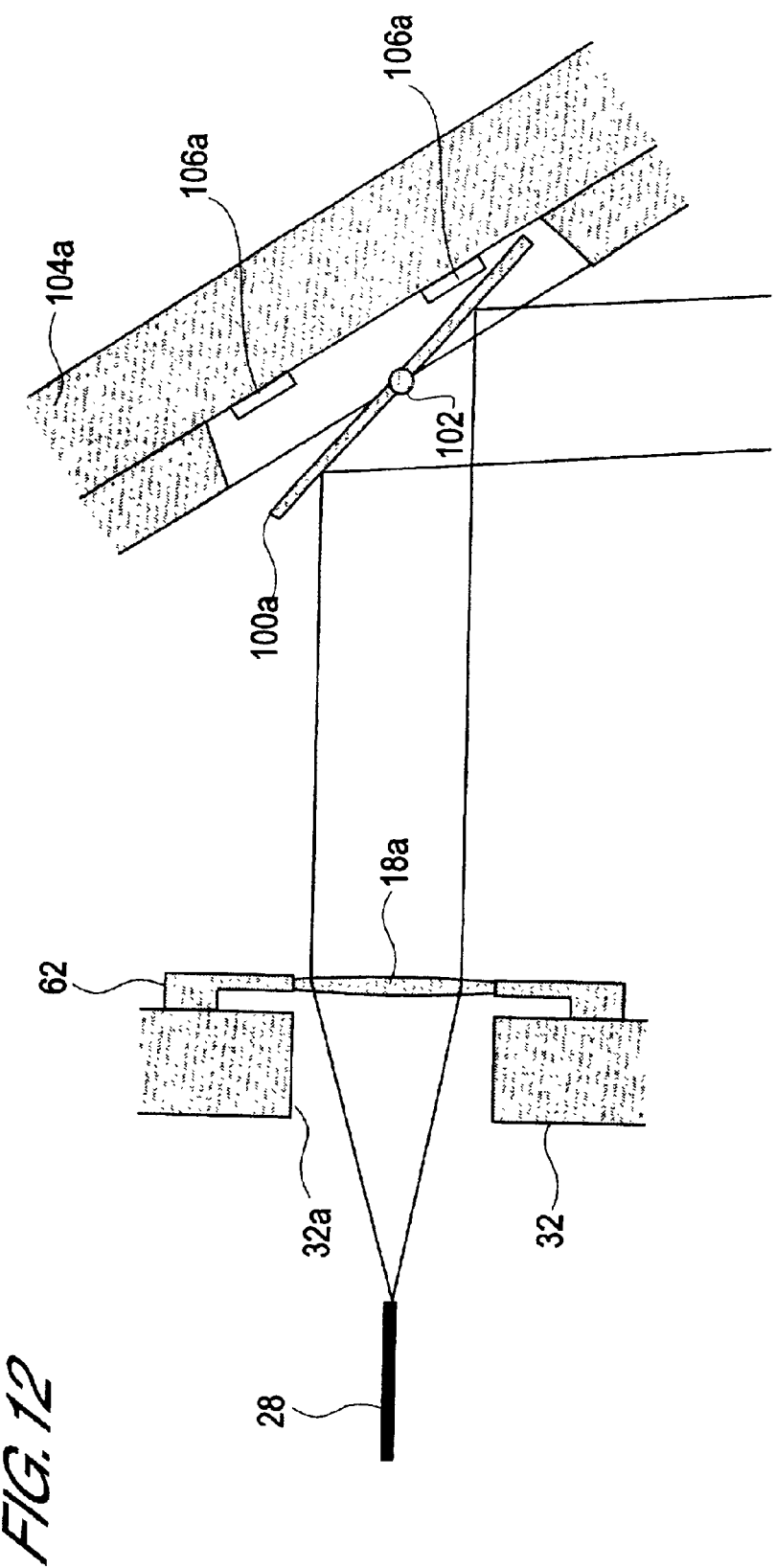
FIG. 12 is a view illustrating the construction of a detail of an optical switch according to the second embodiment.

FIG. 12 is a cross-sectional view showing the construction of a detail of the optical switch of the second embodiment. In FIG. 12, portions corresponding to those of the input side switching element 110 shown in FIG. 11 are illustrated. The output side switching element 112 also has the same construction as the input side switching element 110 shown in FIG. 12.

In this embodiment, optical deflection element 18a on one side constituting input side optical deflection element group 114 is arranged on substrate 32 (not shown in FIG. 11). Likewise, the optical deflection element 10a on the other side constituting input side optical deflection element group 114 is arranged on the other substrate 104a.

Also, optical deflection element 22b on one side constituting the output side optical deflection element group 116 is arranged on a substrate, not shown. Likewise, the optical deflection element 100b on the other side constituting output side optical deflection element group 116 is arranged on another substrate 104b.

In this embodiment, moveable lenses were employed as the optical deflection elements 18a and 22b described above. These moveable lenses are lenses that are moveable in a plane perpendicular to the direction of incidence or direction of emission of the optical signals. Also, in this embodiment, moveable mirrors were employed as optical deflection elements 110a and 100b described above.

Thus, the difference between the optical switch of the second embodiment and the optical switch of the first embodiment lies in that moveable mirrors are provided instead of the moveable lenses on one side. The light passes through the interior of the optical switch in the order: moveable lens 18a, moveable mirror 100a, moveable mirror 100b, moveable lens 22b.

As shown in FIG. 12, moveable mirror 100a has an axis of rotation (hinge) 102 perpendicular to the direction of incidence of the optical signal from optical fiber 28. Moveable mirror 100a is fixed to substrate 104a by means of hinge 102. Electrodes 106a and 106b are provided on substrate 104a at positions facing moveable mirror 100a. When any one of these electrodes 106a and 106b is charged up, moveable mirror 100a is tilted to the side of the charged electrode by means of the electrostatic attraction. This moveable mirror 100a therefore performs an equivalent action to that of moveable lens 18b illustrated in FIG. 1 and FIG. 3. Consequently, fine adjustment and coarse adjustment of the deflection angle can also be achieved by the construction of this second embodiment. The deflection angle accuracy is apportioned to the respective optical deflection elements.

It should be noted that if a reflecting construction is adopted in which mirror 118 is placed at a position between optical deflection elements 100a and 100b in FIG. 11, output side switching element 112 can be omitted, since deflection of the input light and output of the light after deflection can be achieved by the input side switching element 110 on its own.

[Third Embodiment]

Next, in the third embodiment, a construction for increasing the number of channels of the optical switch will be described. First of all, the problems of an optical switch not provided with this construction will be elucidated.

Figure 13:
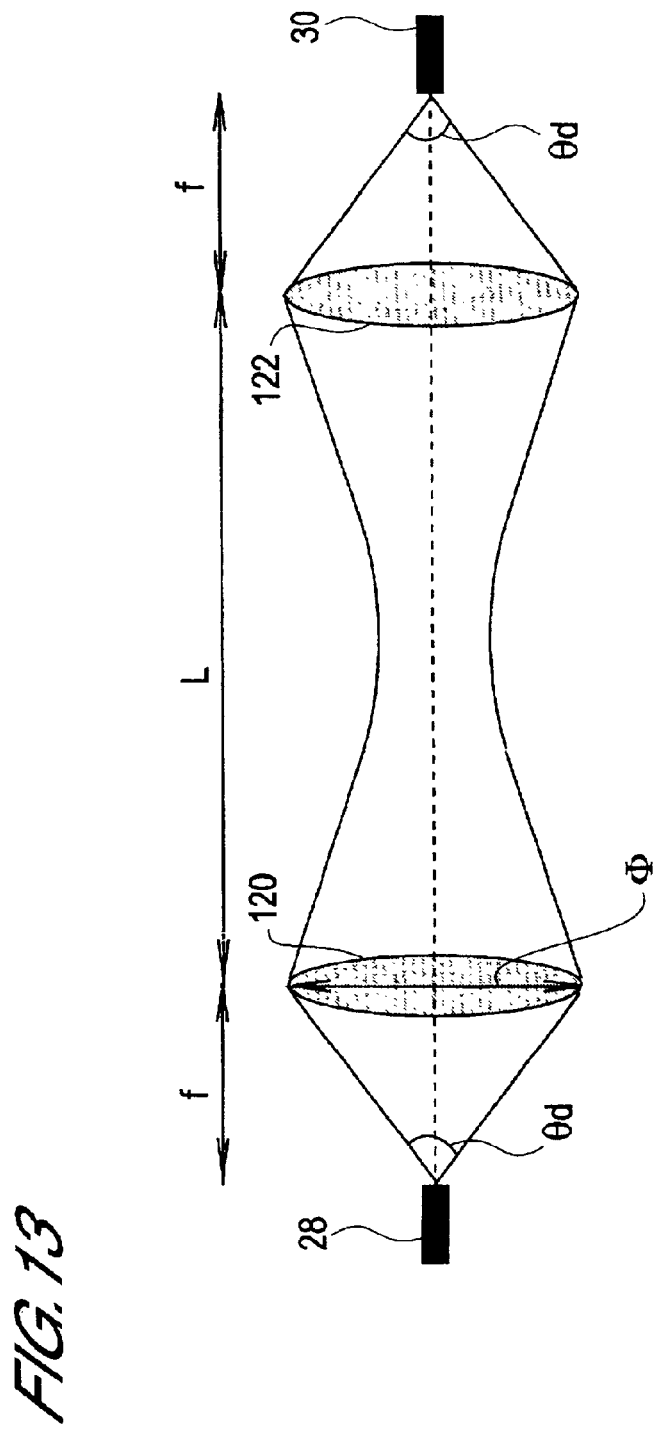
FIG. 13 is a view illustrating the construction of a detail of a typical optical switch.

As shown in FIG. 13, a typical optical switch comprises a collimator system having collimator lenses 120 and 122 between optical fibers 28 and 30. In a device using an optical deflection element of moveable lens type, deflection of the optical flux is performed by moving collimator lenses 120 and 122 themselves. In an device using an optical deflection element of moveable mirror type, deflection of the optical flux is performed by a moveable mirror provided on the optic path. Let the distance between the collimator lenses 120 and 122 be L and the focal point distance of lenses 120 and 122 be f. Also, let the maximum diameter of the collimator lens or optical flux (beam) be $\Phi$. From analysis considering the effect of refraction, it is necessary that:

$$L < \Pi \Phi^2 / \lambda \quad (10)$$

where $\lambda$ is the wavelength of the light. If the input/output angle or diffraction angle of optical fiber 28 is $\theta d$, we have the relationship:

$$\Phi = f \theta d \quad (11)$$

Figure 14:
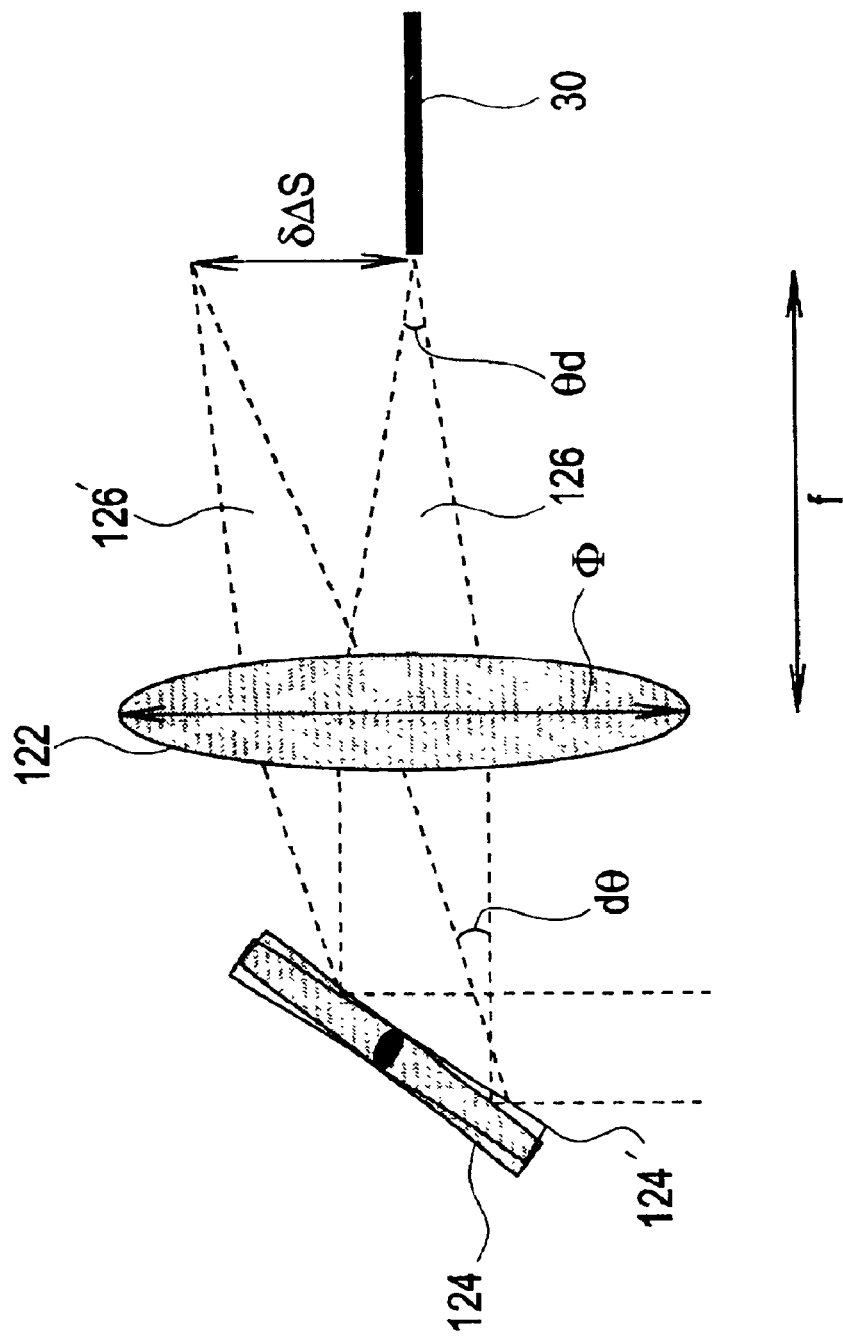
FIG. 14 is a view illustrating the construction of a detail of a moveable mirror type optical switch.

Next, calculation of accuracy for the case where the optical deflection element is a moveable mirror is performed with reference to FIG. 14. FIG. 14 is a view illustrating the construction of a detail of a moveable mirror type optical switch. FIG. 14 shows a portion corresponding to the output side switching element. This Figure shows the situation where optical flux that is deflected by an input side optical deflection element (not shown) is focused by lens 122 after deflection by output side moveable mirror 124, and is then input to optical fiber 30. In the case of the correct mirror angle as in the condition of the moveable mirror 124 in Figure, optical flux 126 is input to optical fiber 30 in the correct position. If the angle of mirror 124 is offset from the correct angle, as shown by reference symbol 124', the focal point position of the light becomes offset as indicated by the optical flux designated by reference symbol 126', and can no longer enter optical fiber 30. Let the angular offset of the optical flux produced by the offset of the mirror angle be $d\theta$. Let the focal point positional offset be $\delta \Delta S$. Then we have:

$$\delta \Delta S = f d \theta \quad (12)$$

This angular offset $d\theta$ is produced not solely by the angular offset of the moveable mirror 124 on the output side but also by the angular offset of the input side moveable mirror, if the input side optical deflection element is a moveable mirror.

As described with reference to FIG. 1 or FIG. 11, three-dimensional optical wiring is formed between the input ports and output ports. The input side and output side optical deflection elements are arranged at respective ports. In the case of an N channel optical switch, $N^{1/2}$ respective optical deflection elements are arranged next to each other in the upright and transverse directions in the plane parallel to the plane of arrangement of the ports. The optical deflection elements must be arranged next to each other with a pitch of at least $4\Phi$ due to the need to avoid crosstalk. The magnitude of one side of the plane of arrangement of the ports is therefore $4\Phi N^{1/2}$. The maximum tilted mirror angle $\theta m$ required is therefore $$\theta m = 2 \Phi N^{1/2} / L \quad (13)$$

From expressions (10) and (13), we obtain:

$$\Phi > 2 \lambda N^{1/2} / (\Pi \theta m) \quad (14)$$

In order to express mirror angular accuracy in percentage terms, we define $\epsilon = \delta \theta / \theta m$. If this is done, from expressions (11), (12), and (14), we obtain:

$$N < \{\Pi \theta d \delta \Delta S / (2 \epsilon \lambda)\}^2 \quad (15)$$

If we take $\delta \Delta Sm$ as being the minimum value of the focal point position offset in order to suppress the loss to below the necessary minimum, this can be expressed as:

$$N = \{\Pi \theta d \delta \Delta Sm / (2 \epsilon \lambda)\}^2 \quad (16)$$

The result of expression (16) indicates that the number of channels N can be increased not only by ensuring a good (i.e. small) error accuracy $\epsilon$ but also by increasing the diffraction angle $\theta d$ of the optical fiber. Alternatively, the number of channels N can be increased also by increasing $\delta \Delta Sm$. However, in the case of a single mode optical fiber, in order to make $\delta \Delta Sm$ large, the mode diameter of the optical fiber must be made large and in this case $\theta d$ becomes small, so no benefit is obtained.

An example of the calculation of the number of channels N will now be given. Let us assume that the values of $\delta \Delta Sm$ and $\theta d$ are 1 $\mu$m and 0.2 rad, in the case of a typical single mode optical fiber. Let us assume that the error $\epsilon$ is 1% and the wavelength $\lambda$ is 1.55 $\mu$m. We then have N=100.

Figure 15:
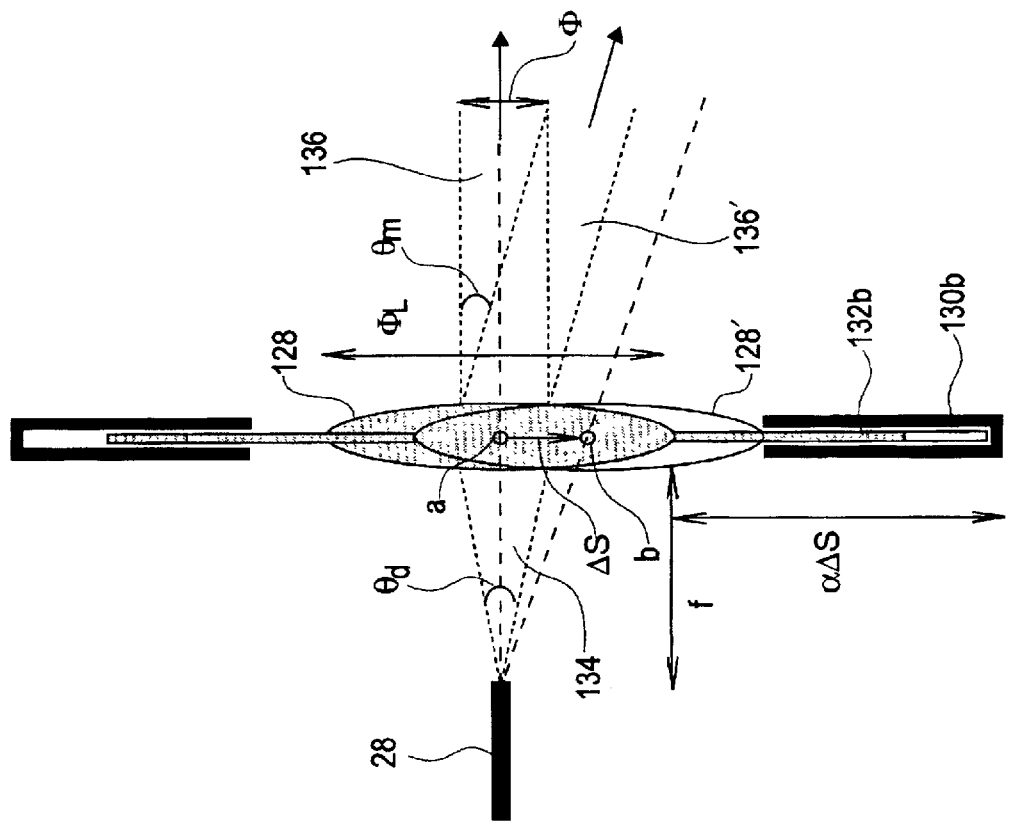
FIG. 15 is a view illustrating the construction of a detail of a moveable lens type optical switch.
Figure 16:
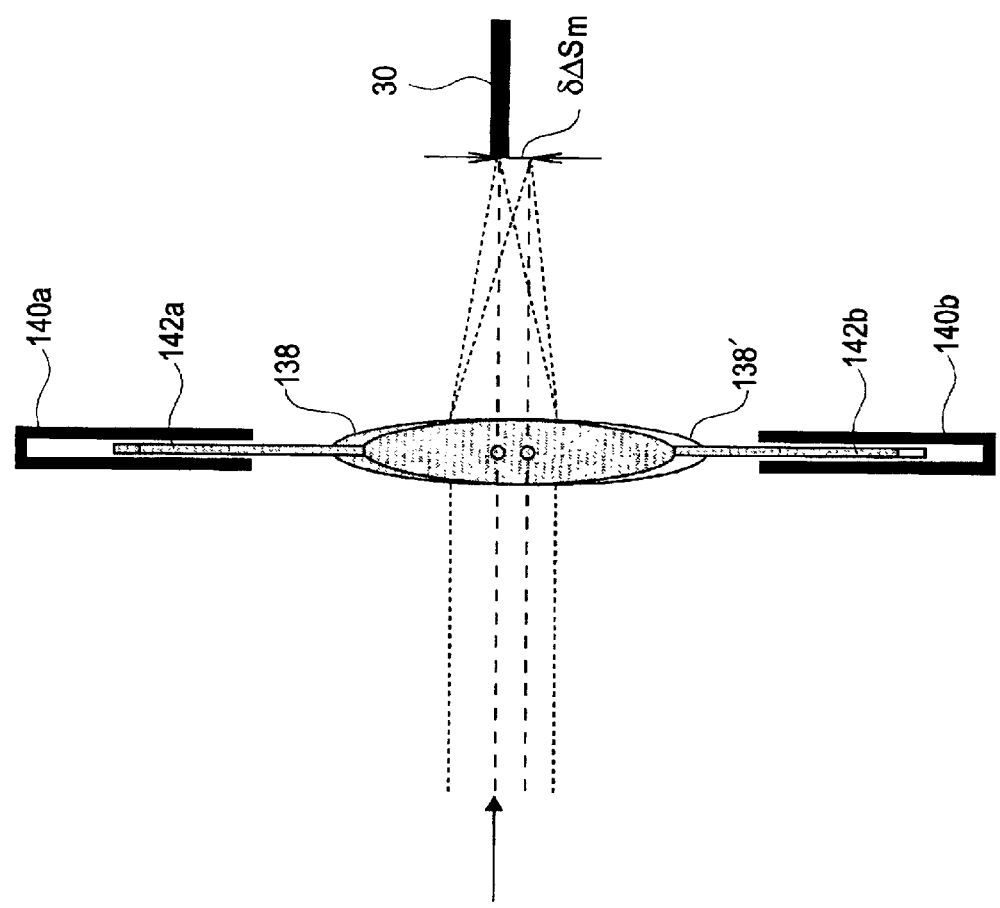
FIG. 16 is a view illustrating the construction of a detail of a moveable lens type optical switch.

Next, the same analysis will be conducted for the case where the optical deflection element is a moveable lens, with reference to FIG. 15 and FIG. 16. FIG. 15 and FIG. 16 are views illustrating the construction of a detail of a moveable lens type optical switch.

FIG. 15 shows a portion corresponding to the input side switching element. This Figure shows how the emitted light from an input side optical fiber 28 is deflected by input side moveable lens 128. In this Figure, actuators 130a and 130b are motors for moving moveable lens 128. Beams 132a and 132b serve to transmit the force generated by the actuators to lens 128. Also, symbols a and b in the Figure indicate the centers of respective moveable lenses 128 and 128'.

FIG. 16 also shows the portion corresponding to the output side switching element. This Figure shows how the light that is deflected by input side moveable lens 128 is focused by output side moveable lens 138 and input to optical fiber 30. In this Figure, actuators 140a and 140b are motors for moving moveable lens 138. Beams 142a and 142b serve to transmit the force generated by the actuators to lens 138. The moveable lens 138' after movement has taken place is shown in the Figure.

The optical flux 134 from optical fiber 28 is collimated by moveable lens 128. Corresponding to movement of moveable lens 128 to the position indicated by reference symbol 128', the optical flux 136 after collimation is deflected as indicated by optical flux 136' (FIG. 15). The reverse process to this is performed on the output side, with the result that the optical flux deflected at the input side is input to optical fiber 30 (FIG. 16) after passage through lens 138 (138').

If the lens movement distance is represented by $\Delta S$, the deflection angle $\theta$ is expressed by:

$$\theta = \Delta S / f \quad (17)$$

For the maximum value of the movement distance $\Delta S$, the diameter $\Phi_L$ of lens 128 must cover the diameter $\Phi$ of the optical flux, so the following expression (18) must hold:

$$\Phi_L = \gamma (2 \Delta S + \Phi) \quad (18)$$

where $\gamma$ is a parameter of value satisfying $\gamma > 1$. The accommodation of the actuators on both sides is expressed by $2 \alpha \Delta S$ where $\alpha$ is a parameter of value satisfying $\alpha > 1$. The size of the optical deflection element is therefore $\Phi_L + 2 \alpha \Delta S$. The size of one side of the plane of arrangement of the ports is therefore ($\Phi_L +$ $2\alpha\Delta S)N^{1/2}$. The maximum deviation angle $\theta m$ required is therefore given by $$\theta m=(\Phi_L+2\alpha\Delta S)N^{1/2}/L \qquad (19)$$

From expressions (10), (11), (18), and (19), we obtain:

$$\theta m=N^{1/2}\{\gamma(2\Delta S+f\theta d)+2\alpha\Delta S\}/\{\Pi(f\theta d)2/\lambda\} \qquad (20)$$

On the other hand, if the maximum movement distance is taken to be $\Delta S_{MAX}$, from expression (17), $\Delta S_{MAX}/f=\theta m$. The value of f is therefore given by the following expression (21):

$$f=\Delta S_{MAX}N^{1/2}(2\gamma+2\alpha)/\{\Pi\theta d\Delta S_{MAX}/\lambda-\gamma N^{1/2}\} \qquad (21)$$

The value of L can be found using expression (21) and expression (10). If we assume that the error on the output side is expressed in % and $\delta\Delta Sm/\Delta S_{MAX}=\epsilon$, we obtain:

$$L=(\Pi/\lambda)(\delta\Delta Sm/\epsilon)N^{1/2}(2\gamma+2\alpha)/\{\Pi\theta d(\delta\Delta Sm/\epsilon)/\lambda-\gamma N^{1/2}\} \qquad (22)$$

There is a tendency for L to increase when the number of channels N increases. Of course, just as in the case of moveable mirrors, increasing $\theta d$ shortens L and increases realism.

An example calculation is indicated below. Taking $\alpha=1$, $\gamma=1$ and the other parameters the same as in the case of the moveable mirrors, $N=529$ and $L=28$ (cm) are obtained.

As described above, in order to increase the number of channels N, L must be made long. To make L long, the beam diameter $\Phi$ must be made large. However, in making $\Phi$ large, if the diffraction angle $\theta d$ of the optical fiber is small, the focal point distance becomes long, so offset of the focal point position due to angular error becomes large.

[Third Embodiment]

Next, an optical switch according to a third embodiment will be described referring to the above aspects. In the optical switch of this embodiment, in order to increase the number of channels, an optical system is incorporated that expands the diffraction angle $\theta d$ of the optical fiber.

The basic construction of an optical switch according to the third embodiment is the same as in the case of the device shown in FIG. 13. Specifically, it comprises an input side optical fiber connected with the optical input port, and output side optical fiber connected with the optical output port, and a collimator system inserted between these optical fibers. Also, it is provided with optical deflection elements constituted by a moveable lens or moveable mirror, respectively, on the input side and output side.

Figure 17:
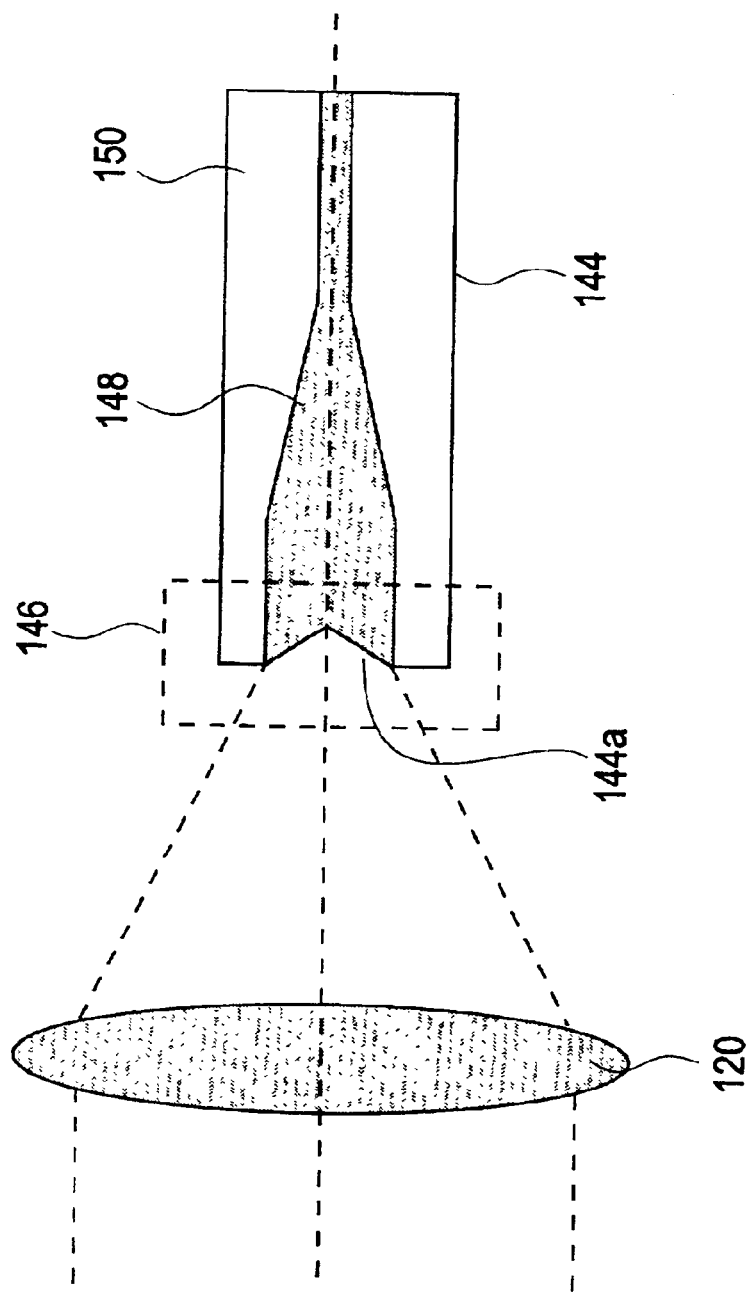
FIG. 17 is a view illustrating the construction of a detail of an optical switch according to a third embodiment.

FIG. 17 is a view illustrating the construction of a detail of an optical switch according to the third embodiment. FIG. 17 shows an input side collimator lens 120 and an input side optical fiber 144. Although the optical deflection elements are not shown in FIG. 17, as described above, collimator lens 120 itself could also be employed as a moveable lens. Also the terminal face of optical fiber 144 may be employed as an optical input port. The construction on the output side is also the same as the construction of FIG. 17.

Also, in the case of the optical switch of this embodiment, an optical system for expanding the optical input/output angle of the input side optical fiber and output side optical fiber respectively is provided at the optical input port and optical output port. This optical system 146 provided at the optical input port of optical fiber 144 on the input side is shown in FIG. 17.

Optical system 146 is formed at the terminal section of optical fiber 144. The terminal section of this optical fiber 144 is constituted by a core 148 of tapered construction extending towards terminal face 144a and cladding 150 that covers core 148. Also, terminal face (emission face) 144a is of concave shape, in this example, of conical shape.

At the terminal section of optical fiber 144 described above, the light is that is guided within the optical fiber constitutes a plane wave. This plane wave is converted into light that is dispersed with a desired angle, using reflection or refraction. If the emission face 144a is a conical reflective face, the light is propagated in the form of concentric circular optical flux and after passing through collimator lens 120 is propagated as a so-called Bessel beam. The same applies if emission face 144a is a refractive face of conical shape, but, due to restrictions on the angle of total reflection at this face, the limit of the angle of diffraction $\theta d$ in optical fiber 144 is 48°. Even in this case, an improvement of a factor of four can be obtained compared with the ordinary construction.

Apart from a conical face, emission face 144a could be for example a concave lens shape.

A tapered construction of core 148 is not necessarily essential, but, with such a construction, the allowed angle in respect of offset of the focal point position is increased. Apart from this, for example an MMI (multi-mode interference) coupler construction could be adopted.

Next, the operation of an optical switch according to this embodiment will be described. If for example the collimator lens 120 described above is used as a moveable lens, lens 120 is driven in accordance with information as to which collimator lens on the output side is to have light directed into it. Changeover between channels can thereby be performed. Also, by fine angle adjustment of the collimator lens (moveable lens) on the output side into which light is directed, it can be ensured that light is input in the maximum amount to the output side optical fiber. The necessary changeover angle is determined by the lens pitch on the output side, the number of lenses, and the distance L between the input and output optical deflection elements. In the case of the moveable mirror type, this angle can be set irrespective of $\theta d$. In contrast, in the case of the moveable lens type, the angle of deflection becomes larger as f becomes shorter, and so L is decreased.

In the case of the construction shown in FIG. 17, the distance f between the lens 120 and lens focal point plane can be decreased while maintaining the necessary width of optical flux by increasing the diffraction angle $\theta d$. The change of focal point position $fd\theta$ with respect to change of angle $d\theta$ can thereby be reduced.

With an optical switch as described above, by multiplying the diffraction angle by a factor of n, the number of channels N that can be realized with the same accuracy can be multiplied by factor of $n^2$. That is, if the number of channels is N, the necessary accuracy can be alleviated by a factor of n compared with conventionally.

It should be noted that, although for example a concave lens could also be used instead of making the emission face 144a of the shape described above, in this case, it would be necessary to solve the problem of expansion of the change of angle upstream of the lens. Specifically, there is the problem of a trade-off between the diminution of loss due to decrease in the change of position and increase of loss due to increase in the change of input angle. If an emission face 144a of the shape described above is adopted, this problem does not exist.

Figure 18:
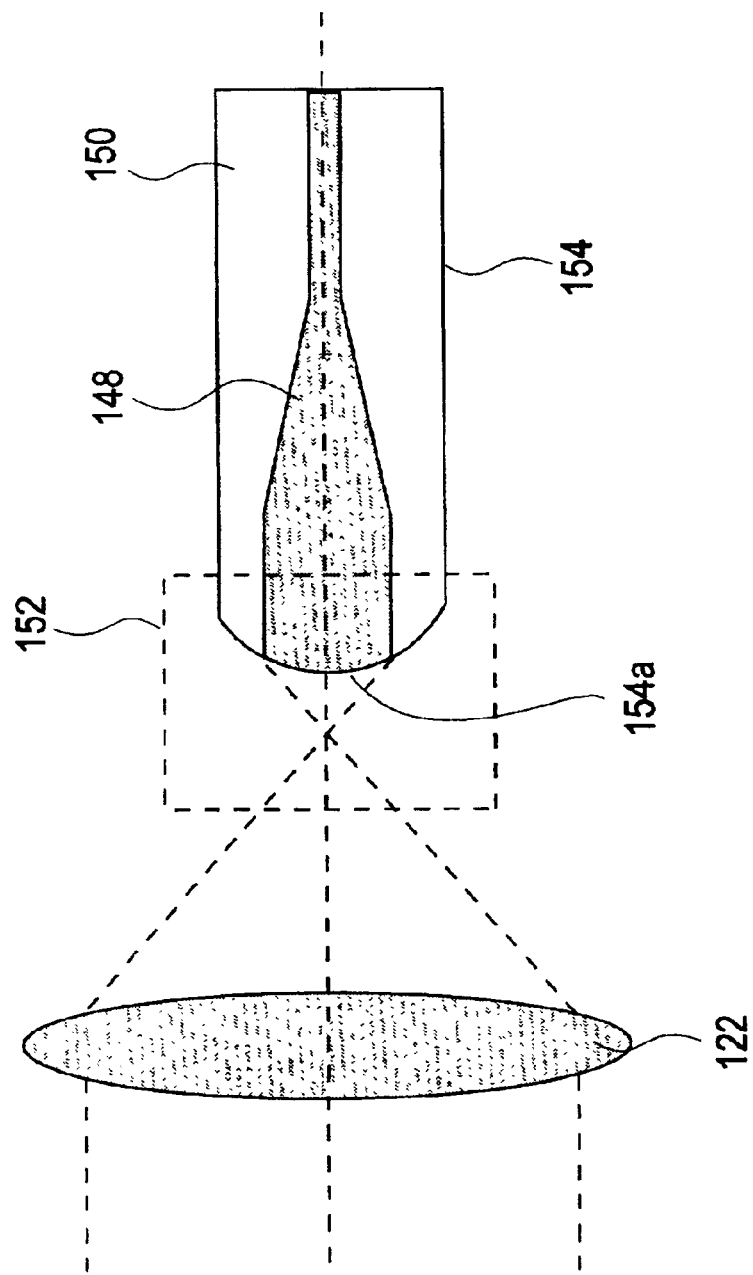
FIG. 18 is a view illustrating the construction of a detail of a modified example of an optical switch according to the third embodiment.

Apart from the construction illustrated in FIG. 17, employing an optical system as shown in FIG. 18 for example is effective in expanding the diffraction angle. FIG. 18 is a view illustrating the construction of a detail of a modified example of an optical switch according to the third embodiment. FIG. 18 shows output side collimator lens 122 and output side optical fiber 154. The terminal face of optical fiber 154 is employed as an optical output port. The construction of the input side is identical with the construction of FIG. 18.

In the optical system 152 shown in FIG. 18, a face 154a at which the light is incident is of convex shape and formed at the terminal section of output side optical fiber 154. In this system, the spherical tip section (face where the light is incident) 154a is employed as a convex lens, and the focal point 156 of this convex lens also serves as a common focal point with collimator lens 122. The diffraction angle can be made large by making this focal point distance of the convex lens sufficiently small. As a result, in a condition in which the angular error is expanded, the light that is incident on collimator lens 122 is input into optical fiber 154. If the focal point ratio of the convex lens and collimator lens 122 is made to be r, the magnification factor is r times. r coincides with the ratio of the necessary optical flux (beam) diameter $\Phi$ and the mode diameter of the optical fiber. The allowed angle of input to optical fiber 154 is about 1.5 times at 0.5 dB. The core 148 of optical fiber 154 is tapered to ensure that the ratio r does not become very large, while maintaining this allowed angle.

[Fourth Embodiment]

Although in the third embodiment an optical system for increasing the diffraction angle $\theta d$ has been illustrated, it would be possible to employ instead an optical system for increasing the beam diameter $\Phi$.

The basic construction of the optical switch of the fourth embodiment is identical with the device shown in FIG. 13. Specifically, it comprises input side optical fibers connected with the optical input port, output side optical fibers connected with the optical output port, and a collimator system inserted between these optical fibers. Optical deflection elements constituted by moveable lenses or moveable mirrors are respectively provided on the input side and output side.

Figure 19:
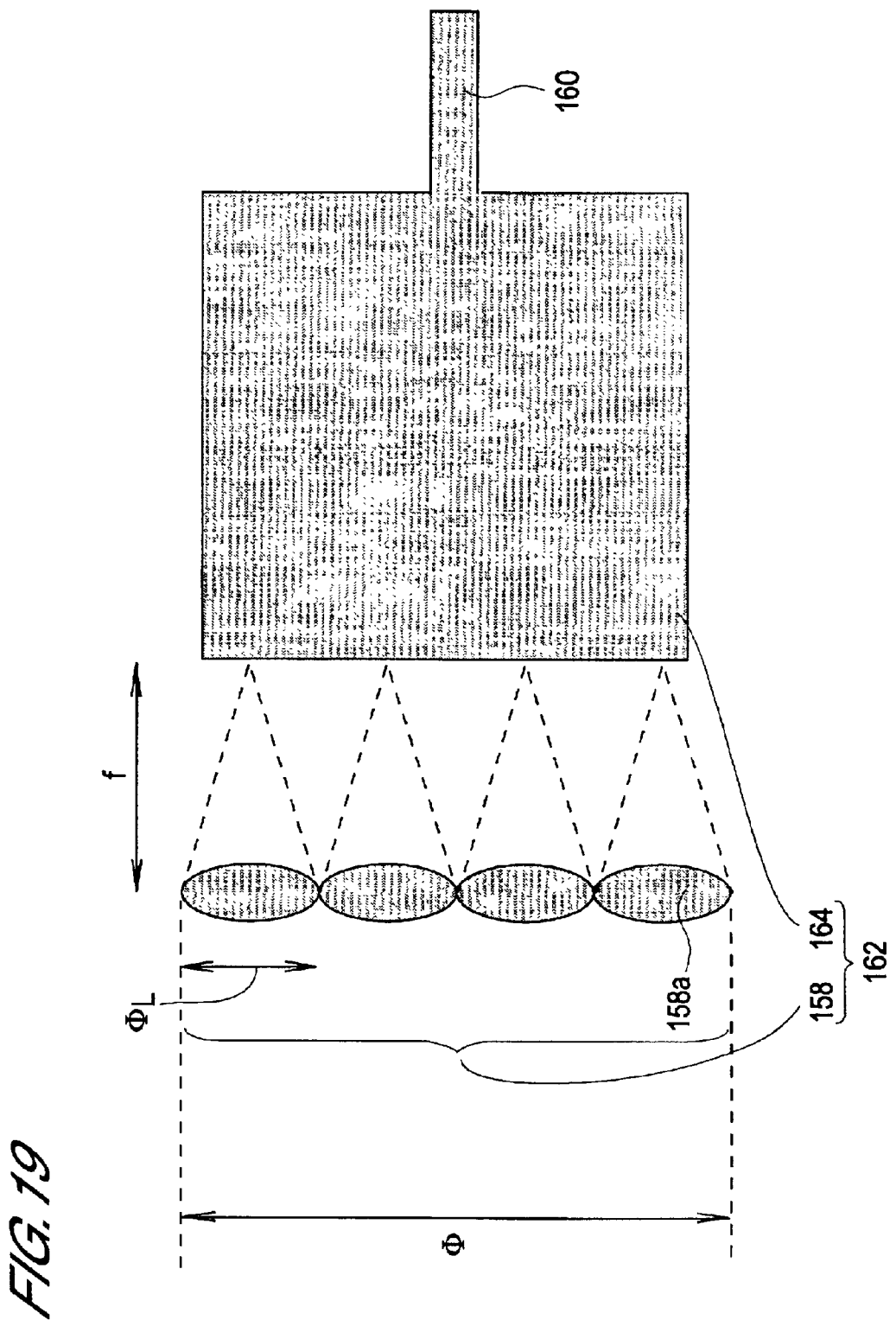
FIG. 19 is a view illustrating the construction of a detail of an optical switch according to a fourth embodiment.

FIG. 19 is a view illustrating the construction of a detail of an optical switch according to a fourth embodiment. FIG. 19 shows output side collimator lens 158 and an output side optical fiber 160. The terminal face of an optical fiber 160 is employed as the optical output port described above. The construction on the input side is also identical with the construction of FIG. 19. It should be noted that, in FIG. 19, the optical deflection elements are not shown. Also, in FIG. 19, the cladding of optical fiber 160 is not shown.

Furthermore, in the optical switch of this embodiment, an optical system for expanding the beam diameter of the respective beams is provided at the optical input port and optical output port. FIG. 19 shows this optical system 162 provided at the optical output port of the output side optical fiber 160.

Specifically, optical system 162 is constituted by $m^2 \times 1$ couplers 164 (where m is an integer) and collimator lenses 158. The $m^2 \times 1$ couplers 164 are waveguide sections of large width coupled with the terminal section of optical fiber 160. Also, collimator lenses 158 are provided facing the terminal face of coupler 164, being constituted by a plurality of small lenses 158a arranged in a plane parallel with the terminal face of this coupler 164.

With this construction, performance of focusing is apportioned to respective small lenses 158a and the respectively focused beams are input to optical fibers 160 after being merged by coupler 164. The size of the necessary diffraction angle can therefore be reduced to ($\Phi_L/m\Phi$) even for the same optical flux diameter and focal point distance.

It should be noted that, if there are a restricted number of small lenses 158a, the presence of stray optical flux becomes a problem, as is well known. In order to ensure that input light (stray optical flux) other than the target optical flux is not received if the construction of FIG. 19 is adopted, in the case of both input and output, it is necessary to set the distance between the input and output optical deflection elements and their pitch (i.e. the angle between the optical deflection elements).

It should be noted that, although, in this embodiment, small lenses 158a were employed for optical flux generation/collimation elements, other elements having the same function, such as for example diffraction gratings or spherical mirrors could be employed.

With an optical switch as described above, the number of channels N that can be realized with the same accuracy can be multiplied by a factor of $n^2$ by multiplying the diffraction angle by a factor of n. That is, if the number of channels is N, the necessary accuracy can be alleviated by a factor of n compared with conventionally.

[Fifth Embodiment]

Figure 20:
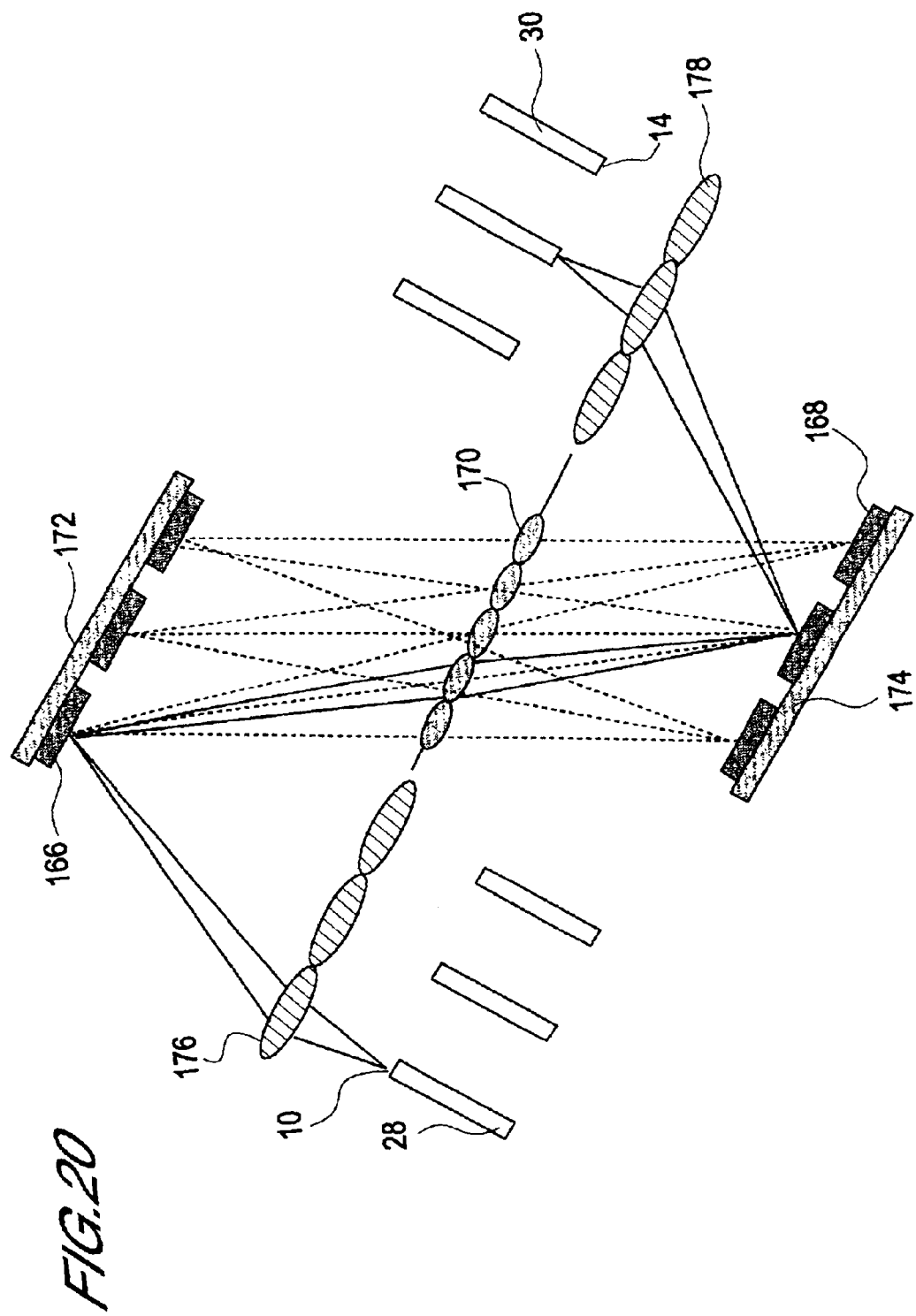
FIG. 20 is a view illustrating the construction of an optical switch according to a fifth embodiment.

The construction of an optical switch according to a fifth embodiment is illustrated in FIG. 20. This optical switch comprises a plurality of optical input ports 10 and a plurality of optical output ports 14. Also, moveable mirrors 166 having an axis of rotation perpendicular to the direction of incidence of the optical signal are provided as input side optical deflection elements at each of the respective optical input ports 10. Also, moveable mirrors 168 having an axis of rotation perpendicular to the emission direction of the optical signals are provided as output side optical deflection elements at each of the optical output ports 14. Furthermore, optical elements 170 are provided between the input side and output side optical deflection elements for focusing the light reflected by moveable mirrors 166 on the input side onto the moveable mirrors 168 on the output side.

Also, in this example, optical fibers 28 are employed as optical input means to optical input port 10. The output terminal faces of these optical fibers 28 are connected to the optical input port 10 mentioned above. Also, optical fibers 30 are employed as optical output means from optical output port 14. The input terminal faces of these optical fibers 30 are connected to the optical output port 14 mentioned above.

Also, in this example, a number of moveable mirrors 166 corresponding to the number of optical input ports 10 is provided on substrate 172. Likewise, a number of moveable mirrors 168 corresponding to the number of optical output ports 14 is arranged on substrate 174. The construction of these moveable mirrors is essentially the same as the construction of the moveable mirrors described with reference to FIG. 11.

Also, in this example, collimator lenses 176 are provided at each optical input port 10 between the optical input port 10 and moveable mirror 166. Likewise, collimator lenses 178 are provided at each optical output port 14 between the optical output port 14 and moveable mirror 168. These collimator lenses may be constituted as moveable lenses. In this example, these collimator lenses are constituted by diffraction grating elements that are capable of focusing in any desired direction by suitable design.

The optical elements 170 described above are collimation elements of a construction in which a plurality of lenses are arranged in the same plane. If moveable mirrors 166 and 168 are coupled by a linear optical path through optical elements 170, these lenses may be arranged such that the pitch of the moveable mirrors 166, 168 described above is twice the pitch of the lenses constituting optical element 170. The diameter of the lenses constituting optical element 170 must correspond to the collimation length; this is given by expression (10).

Also in FIG. 20 the dotted lines and solid lines connecting the various sections indicate diagrammatically the paths of the light in each of the sections.

Relay lenses constituting optical elements 170 are arranged at each alternate one so as to face the individual moveable mirrors 166 and 168. In this way, all the paths joining 166 and 168 pass through optical element 170.

The diameters of the respective relay lenses constituting optical element 170 must be of a size of at least about that necessary for suppressing diffraction. This diameter is made the same as the value of the mirror diameter in a system provided with moveable mirrors at the portions of largest beam diameter of the collimation system in an optical switch using the technology disclosed in Reference 1. Specifically, it is of the order 200 to 300 µm.

It should be noted that, in FIG. 20, lenses 176, 178 and 170 could be formed on a substrate in the same way as moveable mirrors 166, 168. The pitch of the lenses constituting optical element 170 can be reduced by inserting convex lenses between moveable mirrors 166, 168 and optical elements 170.

As will be described, if the distance between optical input port 10 and collimator lens 176 and the distance between optical output port 14 and collimator lens 178 are made much closer than the distance between lens 176 and moveable mirror 166 and the distance between lens 178 and moveable mirror 168, the control error of moveable mirrors 166, 168 can be reduced.

With this construction, the light from fibers 28 is focused by lens 176 and is deflected (fixed angle) towards mirror 166. Then, the light is deflected by input side moveable mirror 166 in the direction of the desired output side moveable mirror 168. At some point along its path, the light reflected by input side moveable mirror 166 is focused by optical element 170. The light is deflected by output side moveable mirror 168 in the direction of the desired collimator lens 178. Light that is focused by collimator lens 178 is input to optical fiber 30 connected with optical output port 14 corresponding to lens 178.

In this way, at the output side to the rear of lens 170, operation is performed by mirror 168, lens 178 and fiber 30 in the reverse order to the order of the operation of the input side optical switch elements. It is therefore desirable that lenses 176 and 178 should be of the hologram type capable of focusing and deflection.

In this way, since the arrangement of the input or output terminals of optical fibers 28, 30 can be made parallel with lenses 176, 178, 170, the light from all of the optical fibers 28, 30 can be brought to the minimum diameter of the collimated light (i.e. focused) on mirror 166 or 168.

The center position of the optical flux focused and deflected by lens 176 or 178 on moveable mirror 166 or optical fiber 30 shows scarcely any fluctuation of its focusing position even if the angle of deflection is offset. Although the angle of input to the optical fiber does vary, this has less effect than the variation of the position of focusing, so the variation of loss can be kept to a low level.

Figure 21A:
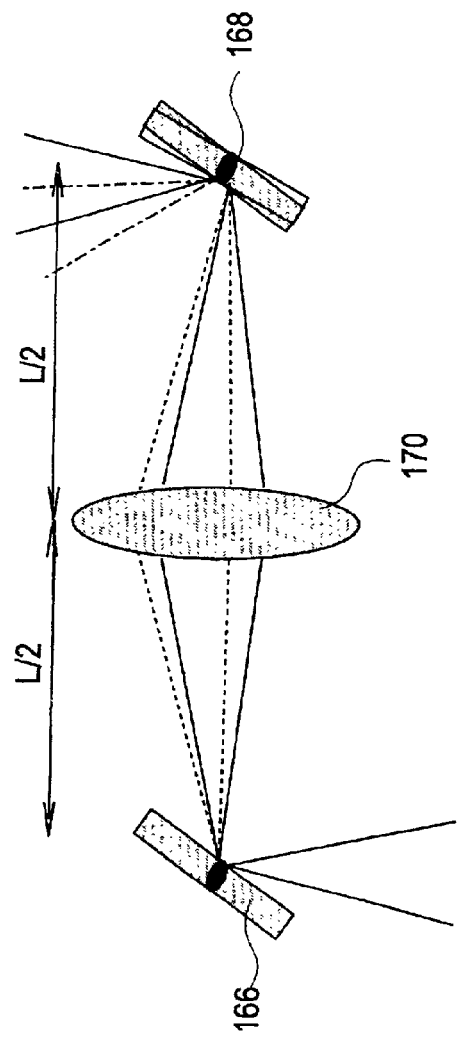
FIG. 21 is a view given in explanation of error analysis using a ray matrix.
Figure 21B:
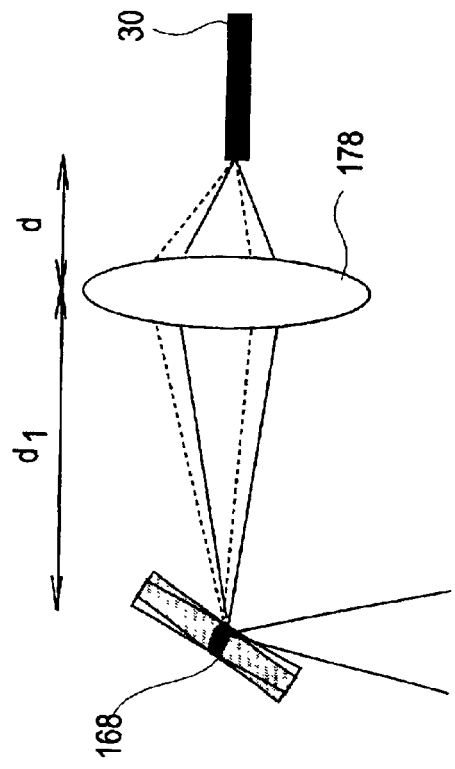
Figure 22:
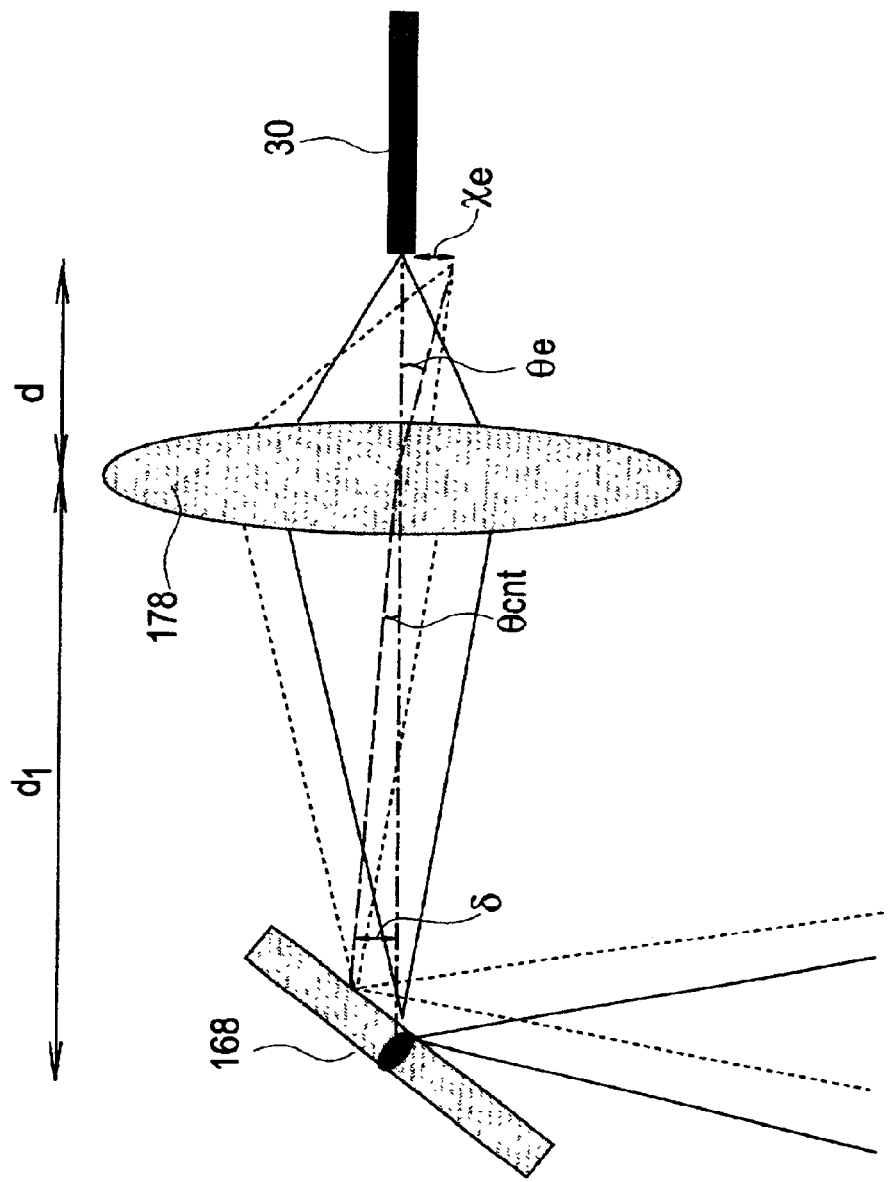
FIG. 22 is a view given in explanation of error analysis using a ray matrix.

Next, analysis using the ray matrix of error will be performed with reference to FIG. 21 and FIG. 22. In FIG. 21(A), of the optical switch shown in FIG. 20, the region of moveable mirrors 166, optical elements 170 and moveable mirrors 168 is illustrated. In FIG. 21(B) and FIG. 22, of the optical switch shown in FIG. 20, the region of moveable mirrors or flash 168, collimator lenses 178 and optical fibers 30 is illustrated.

In analysis using a ray matrix, vectors (ray position and ray angle) are employed whose components are the ray position and ray angle. Also, a 2×2 matrix (M) that describes how the rays change on passing through a given optical system is employed as ray matrix. In matrix (M), the first row first column component, first row second column component, second row first column component and second row second column component will be respectively designated as m11, m12, m21 and m22.

In the case of FIG. 21(A), the ray matrix between moveable mirror 166 and optical element (lens) 170 is represented by the following expressions (23a) to (23d).

$$m11 = 1 - L/(2f) \quad (23a)$$

$$m12 = L - L^2/(4f) \quad (23b)$$

$$m21 = -1/f \quad (23c)$$

$$m22 = 1 - L/(2f) \quad (23d)$$

where f is the focal point distance of lens 170. Also, the distance between mirror 166 and lens 170 and the distance between lens 170 and mirror 168 are both L/2. In the case where L/2=2f, the ray matrix is expressed by the following expressions (24a) to (24d).

$$m11 = -1 \quad (24a)$$

$$m12 = 0 \quad (24b)$$

$$m21 = -4/L \quad (24c)$$

$$m22 = -1 \quad (24d)$$

There is therefore no possibility of occurrence of positional offset on mirror 168 resulting from the angle of mirror 166. It is also possible to eliminate angular offset generated from focal point positional offset on mirror 168 by the angle of mirror 166.

If we let the input angle of the light to optical fiber 30 be θe, the positional offset of the optical flux at the input terminal face of optical fiber 30 be δ, and the angle of mirror 168 be θcnt, we have:

$$\theta e = -4\delta/L - \theta cnt \quad (25)$$

In the case of FIG. 21(B), the ray matrix between mirror 168 and optical fiber 30 is expressed by the following expressions (26a) to (26d).

$$m11 = 1 - d/f \quad (26a)$$

$$m12 = d_1 + d - d_1 d/f \quad (26b)$$

$$m21 = -1/f \quad (26c)$$

$$m22 = 1 - d_1/f \quad (26d)$$

where $d_1$ represents the distance between mirror 168 and lens 178, and d represents the distance between lens 178 and the input terminal face of optical fiber 30. If $1/d + 1/d_1 = 1/f$, m12=0, so change of the focal point position on the optical fiber 30 in response to the angle of mirror 168 is eliminated. In this case, the ray matrix is expressed by the following expressions (27a) to (27d).

$$m11 = -d/d_1 \quad (27a)$$

$$m12 = 0 \quad (27b)$$

$$m21 = -1/f \quad (27c)$$

$$m22 = -d_1/d \quad (27d)$$

By making $d/d_1$ small, it is possible to make the positional offset $\chi e = d/d_1 \delta$ of the image produced by positional offset $\delta$ of the optical flux small, as shown in FIG. 22. Also, the input angle $\theta e$ of the light input to optical fiber 30 is expressed by $$\theta e = -\delta/f - \theta cnt\, d_1/d \quad (28)$$

It is possible for the angle $\theta e$ to be also made substantially 0° by adjusting the angle $\theta cnt$ of mirror 168.

Typically the allowed input angle of optical fiber 30 is of the order of 1.5°, which is large compared with the possible angle of deflection (6 to 10°) of a micro machine mirror. It is therefore considered that this condition is less demanding than the allowed error (1 $\mu$m) of the focal point position $\delta$. Also, if f and L are sufficiently large compared to $\delta$, $\theta e$ becomes small enough to be neglected.

By making lenses of 176 and 178 of the semi-fixed moveable type, even if there is some positional offset of optical fibers 28, 30 on assembly, the spot position of the optical flux on mirrors 166, 168 can be brought to the centers thereof. Once positional alignment of lenses 176 and 178 has been completed, changeover of the optical path can be effected by mirrors 166, 168 without moving the lenses. Alternatively, slight changes in the focal point position can be achieved by coarse angular control of mirrors 166, 168, by ensuring that $m12 = d_1 + d - d_1 d/f = de$ is a minute amount. Adjustment of assembly accuracy can thereby be achieved.

As described above, with an optical switch according to this embodiment, changeover of optical path is effected by a large change of angle of mirrors 166, 168 such as to select any one of the lenses constituting optical element 170. So long as the optical flux strikes lens 170, there is no problem concerning its precise position, so the accuracy of angular control of mirrors 166, 168 is alleviated. Mirror changeover can therefore be performed with high speed.

Figure 23:
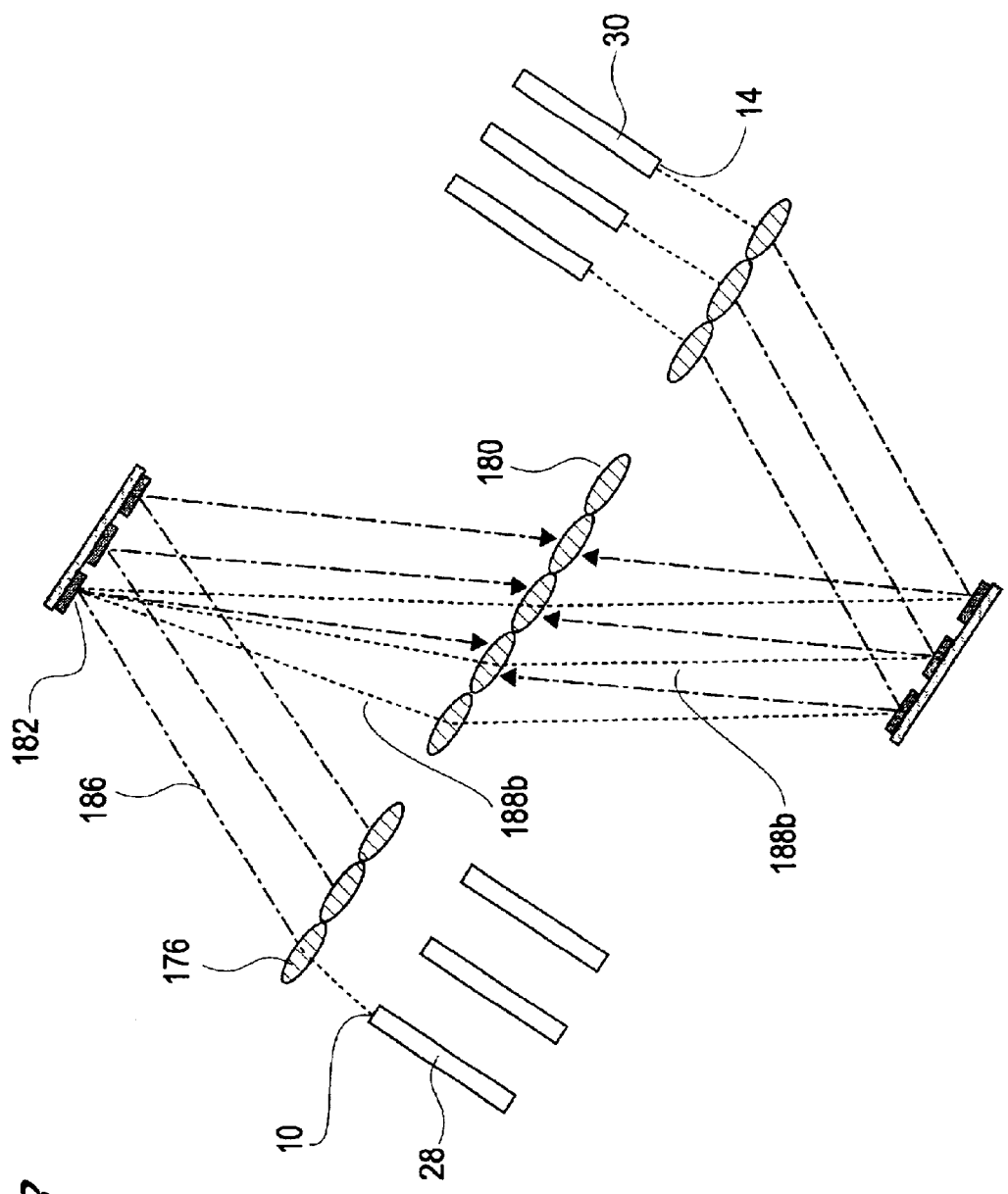
FIG. 23 is a view illustrating a first modified example of an optical switch according to the fifth embodiment.

Also, a first modified example of the optical switch of the fifth embodiment is illustrated in FIG. 23. Although in the optical switch illustrated in FIG. 20, the pitch of lenses 170 is one half of the pitch of mirrors 166, 168, FIG. 23 illustrates an example in which these pitches are roughly equal. The pitch of mirrors 182, 184 in the example of FIG. 23 corresponding to mirrors 166, 168 therefore becomes smaller than in the example of FIG. 20. Also, instead of optical elements 170, optical elements (lenses) 180 are employed that combine a deflection function and focusing function, such as holograms. In this example, the lenses that constitute optical elements 180 are individually provided corresponding to the optical paths between the input side optical deflection elements (moveable mirrors 182) and output side optical deflection elements (moveable mirrors 184).

We shall now turn our attention to optical path 186 in FIG. 23. In FIG. 20, the light that is propagated along the optical path corresponding to this optical path enters lens 170 on the extreme left side after being reflected by mirror 166. However, the light advancing along optical path 186, like optical path 188a of FIG. 23, is reflected by mirror 182 and thereupon enters a lens 180 which is one on the left from the center. Also, of the light advancing along optical path 186, the light advancing along optical path 188b that enters the left-most lens 180 after being reflected by mirror 182 is subjected to focusing and deflection so as to enter the left-most mirror 184 in the same way as in the case of FIG. 20. Since a swing of angle to the left or right (side of 188a or 188b) in the Figure is produced by the action of mirrors 182, and 184, the number of channels is doubled. Also, substrate 172 carrying mirror 182 and substrate 174 carrying mirror 184 can be reduced in size.

Figure 24:
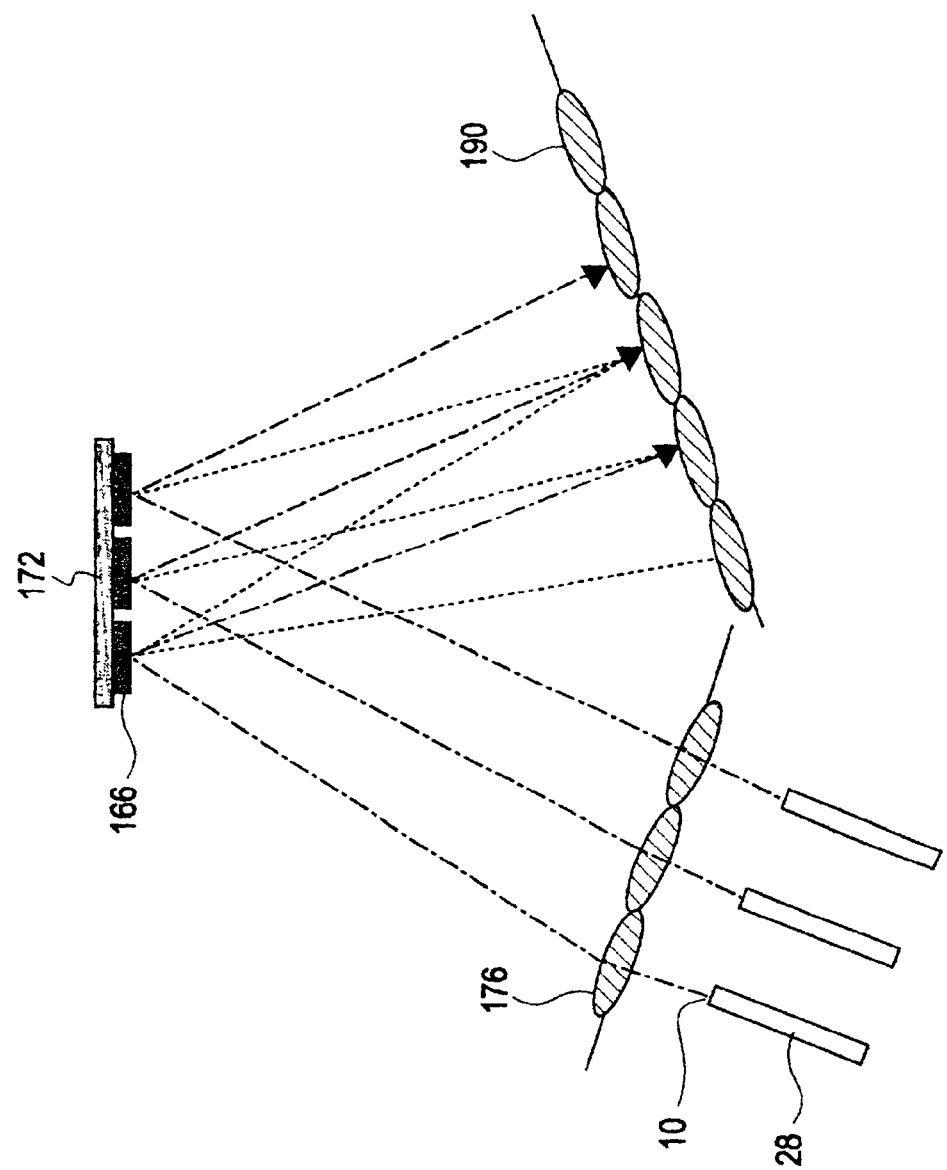
FIG. 24 is a view illustrating a second modified example of an optical switch according to the fifth embodiment.

Also, FIG. 24 shows a second modified example of the optical switch according to the fifth embodiment. In the case of the optical switch shown in FIG. 24, an optical element 190 having a reflecting face on its surface is provided instead of optical element 170 of FIG. 20. As a result, the input and output ports can be commoned. Moveable mirror 168 on the output side, collimator lens 178 and optical fiber 30 etc are therefore unnecessary.

Next, the sixth and subsequent embodiments will be described; however, in order to explain the objects of these embodiments, aspects of the first to fifth embodiments of the present invention which may be improved will be described. To this end, in the construction of the embodiments described above, the elements which are on the periphery of the substrate when the deflection elements are arranged on the substrate will be considered.

For example in the optical switch of FIG. 1, of the deflection element group 20 constituting the input side optical switch element 12, the case where an optical deflection element 18b at a position close to the edge of the top of the substrate selects a port 14 of the output side substrate will be considered. For this purpose, the description will now refer to FIG. 26 in the same way as hitherto to FIG. 1.

Figure 26:
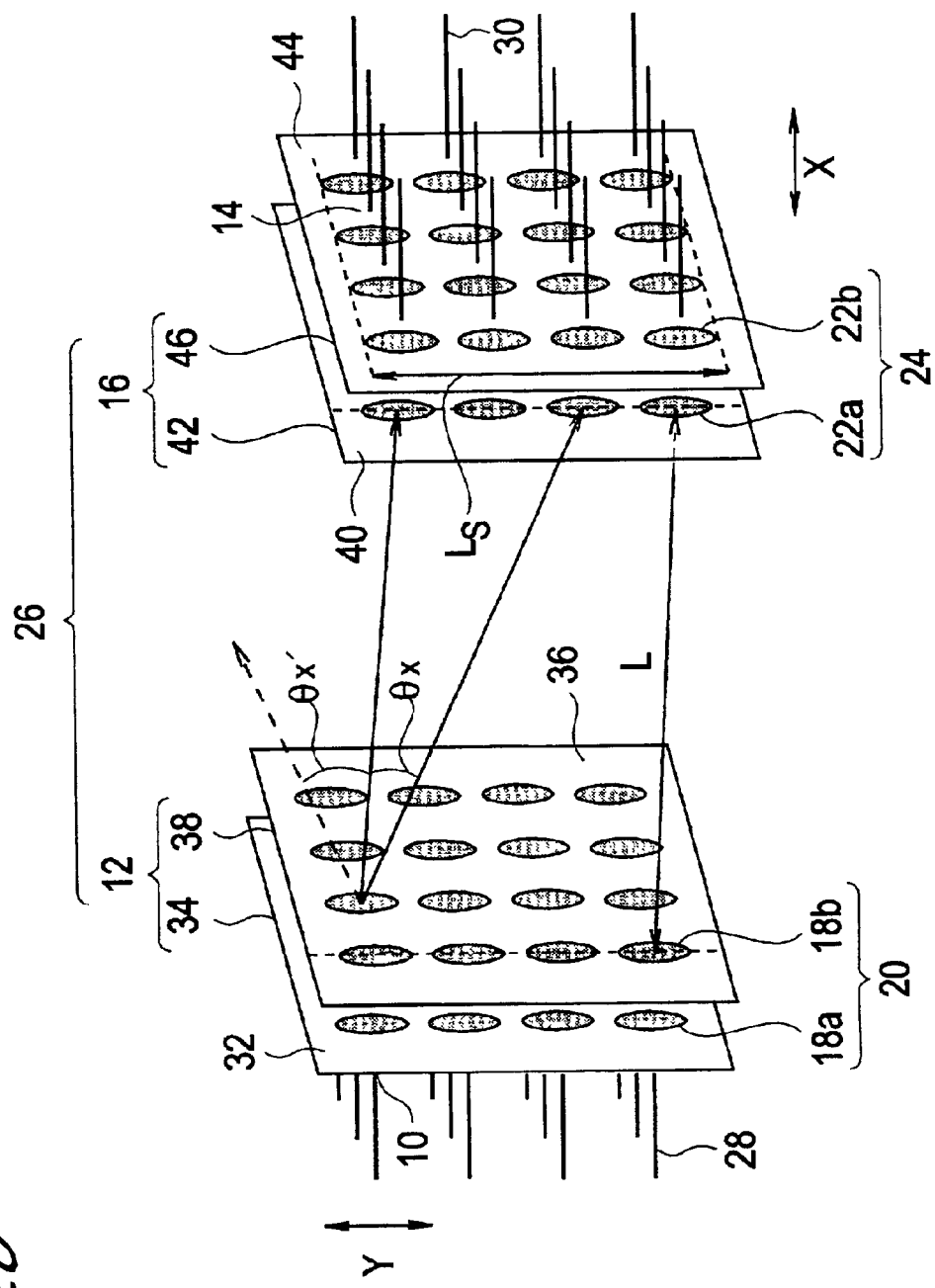
FIG. 26 is a view given in explanation of an aspect of improvement of the first to fifth embodiments.

The optical flux must then be deflected with a deflection angle $\theta x$ of the optical flux in the downwards direction (Y direction) with respect to an angle of deviation of X or less in the horizontal direction i.e. for example the horizontal direction (X direction) in FIG. 26; an angle of deflection $\theta x'$ of the optical flux in the upwards direction (Y direction) above the horizontal direction X i.e. the horizontal direction (X direction) in FIG. 26 for example is useless.

In contrast, in the case of deflection elements in the vicinity of the middle of the substrate, such deflection angles $\theta x$, $\theta x'$ i.e. deviations of the vertical direction Y are feasible.

In the output side switching element 16, the length in the perpendicular direction (Y direction) from the optical deflection element group 24 positioned uppermost on the substrate to the optical deflection element group 24 positioned lowermost on the substrate will be designated as $L_S$ and the distance in the horizontal direction (X direction) from the optical deflection element 18b to the optical deflection element 22a in the same position on the facing substrate will be designated as L.

The necessary deflection angle at an optical deflection element at the periphery of the substrate as described above is then $L_S/L$. In contrast, deflection in the upwards and downwards directions Y is feasible in the case of a deflection element positioned in the vicinity of the center of the substrate, so the required deflection angle is $L_S/(2L)$ i.e. it can be half that of a deflection element at the periphery of the substrate.

The number of channels that can be achieved by a single element positioned in the vicinity of the center of the substrate in the vertical direction Y is therefore twice the number of channels of a single element positioned in vicinity of the periphery of the substrate.

That is, the number of channels that can be achieved with a single deflection element positioned at the periphery of the substrate is one quarter of that of a single element positioned in the vicinity of the center.

This is common to the first to fifth embodiments. That is, in these optical switches, in the elements constituting the switching element on the optical input side, as the angle from the directly opposite element constituting the switching element on the optical output side facing this to the element at the periphery on the opposite side of the output substrate, only half of the space bounded by the perpendicular can be used. The fact that only half of the deflection angle capable of being assumed by the element could be employed therefore represented an aspect in respect of which improvement was desirable. The sixth and subsequent embodiments were made in view of this point. A sequential description will now be given from this sixth embodiment.

[Sixth Embodiment]

Figure 27:
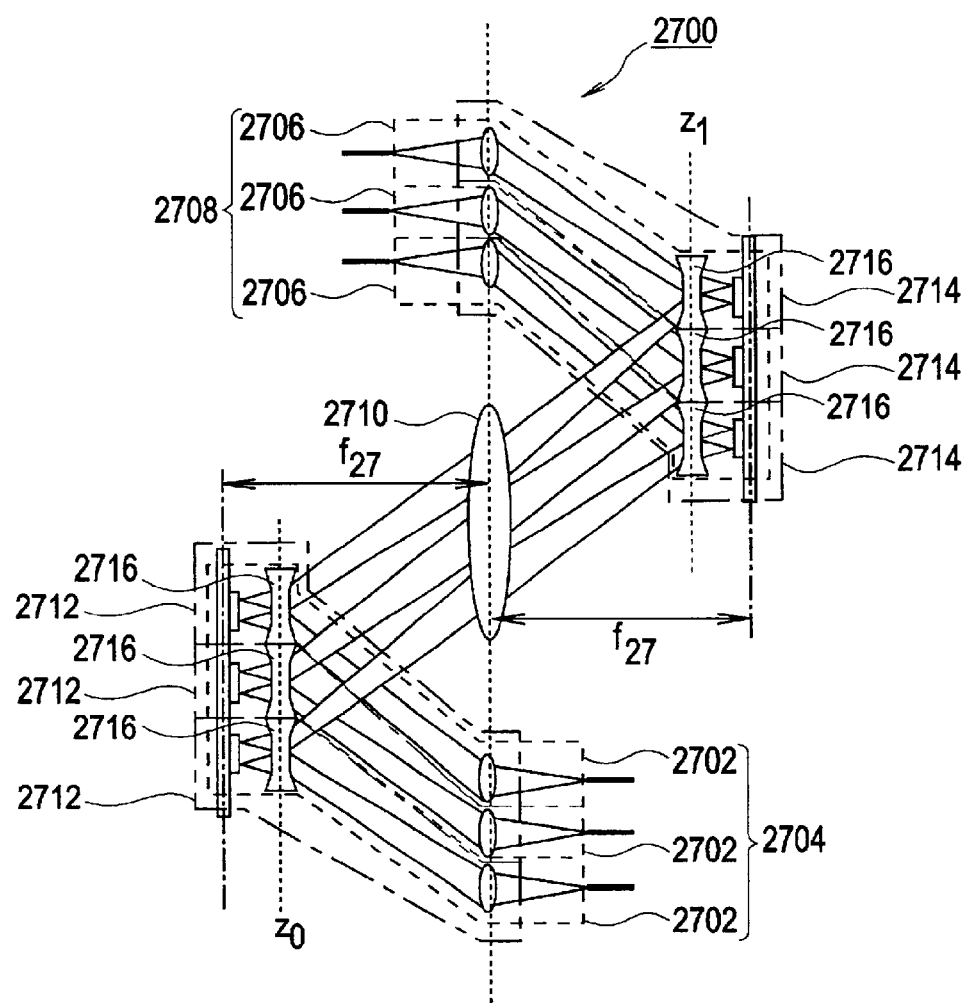
FIG. 27 is a view illustrating an optical switch (example using a convex lens as an optical element) of a sixth embodiment.

FIG. 27 shows a constructional example of a sixth embodiment. This optical switch 2700 comprises an input side switching element 2704 having a plurality of optical input ports 2702 and an output side switching element 2708 having a plurality of optical output ports 2706. In this optical switch 2700, an optical signal input at any one of optical input ports 2702 is output from any one of optical output ports 2706.

Also, in this optical switch 2700, optical signals from input ports 2702 arranged between input side switching element 2704 and output side switching element 2708 are input as incoming light, and an optical element 2710 is provided that emits emitted light corresponding to the incoming light such that the central optical parts of the ray bundles are mutually parallel.

The positions of the input ports 2702 and output ports 2706 change depending on whether this optical element 2710 is of the transparent type or reflective type. As optical element 2710, there is preferably employed a convex lens constituted by a single lens or a hologram. An example will now be described employing a convex lens.

Also, in this optical switch 2700, input side switching element 2704 is arranged on the focal plane of optical element 2710. A focal plane means a plane passing through the focal point of optical element 2710 and orthogonal to its central axis. The distance between this optical element 2710 and the input side switching element 2704 is therefore the focal point distance f27 of optical element 2710.

If output side switching element of 2708 and input side switching element 2704 are arranged at upstream and downstream symmetrical positions on either side of optical element 2710, all of the light emitted from input ports 2702 can be collected at the output side switching element 2708. The distance between this optical element 2710 and the output side switching element 2708 is therefore the focal point distance $f_{27}$ of optical element 2710.

The individual input ports 2702 of the plurality of input ports have input side lens systems 2712 corresponding to these input ports. Also, the individual output ports 2706 of the plurality of output ports have output side lens systems 2714 corresponding to these output ports. Respective concave lenses 2716 are arranged at the plane $z_0$ where light is emitted from the input side lens system 2712 to the output side switching element 2708 and at the plane $z_1$ where light is incident from input side lens system 2712 in the output side switching element 2708.

The straight lines connecting the respective sections shown in FIG. 27 indicate diagrammatically the shape of the optical flux in each section. The operation of the various sections will be described with reference to the shape of such optical flux.

In optical switch 2700, the optical flux (beam) issuing from the input side switching element 2704 is focused by convex lens by 2710 and directed into output side switching element 2708. If the light that is emitted from the input side lens systems 2712 is light such as would be dispersed from points on the optical signal emission plane $z_0$, it becomes parallel light after passing through convex lens 2710. Concave lenses 2716 are therefore provided on plane $z_0$ whence the light of input side lens systems 2712 is emitted.

Furthermore, as shown in FIG. 27, the light that is directed into these concave lenses 2716 is assumed to be parallel light. This parallel light is then dispersed after passage through concave lenses 2716 and is directed into convex lenses 2710. The light becomes parallel light within these convex lenses 2710.

Furthermore, if concave lenses 2716 are provided on the plane z1 where the light of the output side lens systems 2714 is incoming, as shown in FIG. 27, the shape of the light that has passed through these concave lenses 2716 is parallel light identical with the incoming light to the concave lenses provided on plane $z_0$ whence the light is emitted.

Figure 29:
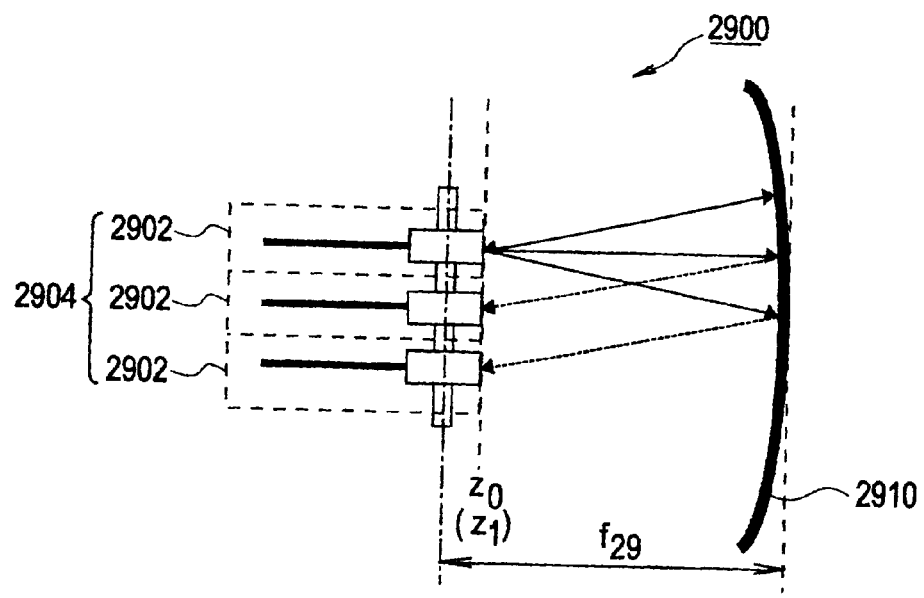
FIG. 29 is a view illustrating an optical switch (example using a concave mirror as an optical element) of the sixth embodiment.

Next, an example in which spherical surface concave mirrors are employed as the optical elements instead of the convex lenses 2710 is illustrated in FIG. 29. In this case, the input side switching elements and output side switching elements are shared. For convenience in description, these will therefore be referred to by the general title of input/output side switching elements 2904.

These switching elements are arranged at positions in the focal plane of concave mirror 2910. The focal plane is a plane passing through the focal point of the concave mirror 2910 and orthogonal to the central axis thereof.

It should be noted that the distance from optical elements 2910 to the deflection elements within input/output side switching element 2904 is the focal point distance $f_{29}$ of optical elements 2910.

The arrows shown by the straight lines in the figure indicate diagrammatically the shape of the ray bundles emitted from the input/output side switching elements 2904 and the arrows indicated by the dotted lines in the figure indicate diagrammatically the central optical paths of the ray bundles directed into the input/output side switching elements 2904.

In this embodiment, the optical flux of the respective emission angles emitted from input/output ports 2902 is reflected by concave mirror 2910 and directed into the respective input/output ports 2902. In this case, the central optical paths of the ray bundles reflected by concave mirrors 2910 are mutually parallel.

In the optical switches shown in FIGS. 27 and 29, switching elements of mutually identical construction are employed for the input side switching elements and output side switching elements.

FIG. 28 shows a typical example of the construction of an input side switching element 2704.

This lens system is constituted of fixed lenses 2800 and moveable mirrors 2802.

It should be noted that 2800 could be constituted by moveable lenses. In this case, the moveable lenses are capable of movement in the case of input side switching elements 2704 in a plane perpendicular to the direction of incidence of the optical signal with respect to the optical fiber and, in the case of output side switching elements 2708, in a plane perpendicular to the emission direction. That is, in this constructional example, when moveable lenses are employed, these moveable lenses are provided so as to be parallel with the substrate surface of substrate 2806 and capable of movement in a direction parallel with the substrate surface.

Rotation of moveable mirrors 2802 is controlled such that the central optical path of the incoming ray of the optical signal in input side switching element 2704 is reflected towards one other of the moveable mirrors 2802 of output side switching element 2708. Also, the construction is such that rotation is controlled so that the central optical path of the reflected ray of the optical signal in output side switching element 2708 is reflected towards one other of the moveable mirrors 2802 of input side switching elements 2704.

Also, as optical input means to the optical input ports 2702 of FIG. 27, the optical fibers 2804 of FIG. 28 are employed. The output terminal faces of these optical fibers 2804 are connected with the optical input ports 2702 in FIG. 27.

Figure 28A:
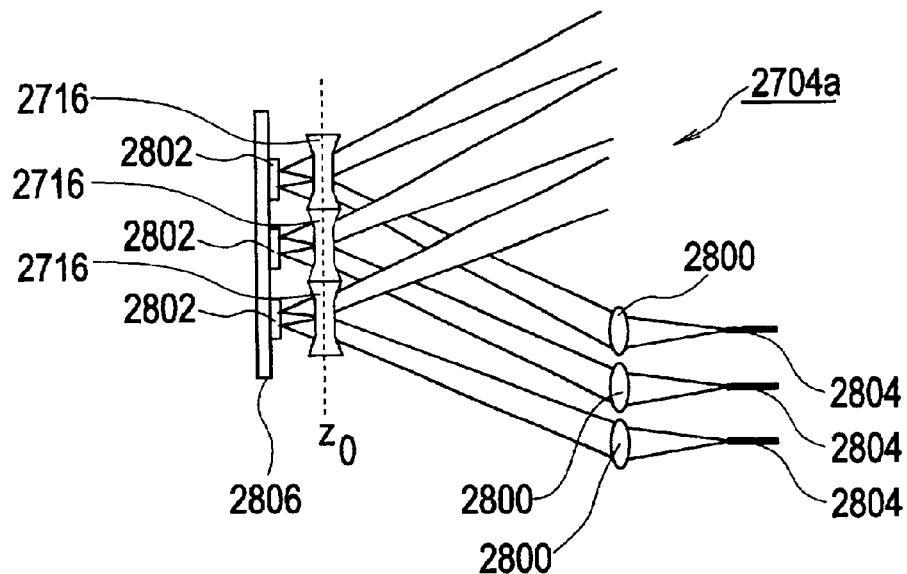
FIG. 28(A) is a view illustrating the construction (first mode) of an input side switching element.

FIG. 28(A) shows a first mode 2704a of input side switching element 2704 employed in this embodiment.

The lens system provided in this input side switching element 2704a is constituted of fixed lenses 2800, a plurality of moveable mirrors 2802 provided on substrate 2806, and concave lenses 2716 provided respectively corresponding to these moveable mirrors 2802. This construction corresponds to an arrangement in which concave lenses 2716 are provided on plane $z_0$ whence light of the input side lens system is emitted.

It is not essential to integrate moveable mirrors 2802 on substrate 2806 as illustrated and they could be provided in individually separated fashion, one by one. In this case, the respective lens systems 2712 (see FIG. 27) would also be provided separately for each set.

In this FIG. 28(A), these straight lines connecting the various structural elements indicate diagrammatically the shape of the beams in each section. The operation of each section may therefore be described from these with reference to the shapes of the beams.

In this input side lens system, the light from optical fibers 2804 is focused by fixed lens 2800 and deflected (fixed angle) towards the focal point on the side of moveable mirror 2802 of concave lens 2716. Accordingly, fixed lenses 2800 are preferably of the hologram type capable of focusing and deflection.

The light passing through concave lenses 2716 is parallel light. This parallel light is reflected by moveable mirrors 2802 and becomes parallel light having the desired angle of deflection. This parallel light becomes light dispersed by concave lenses 2716 and is input to the downstream stage optical element 2710 (see FIG. 27).

Figure 28B:
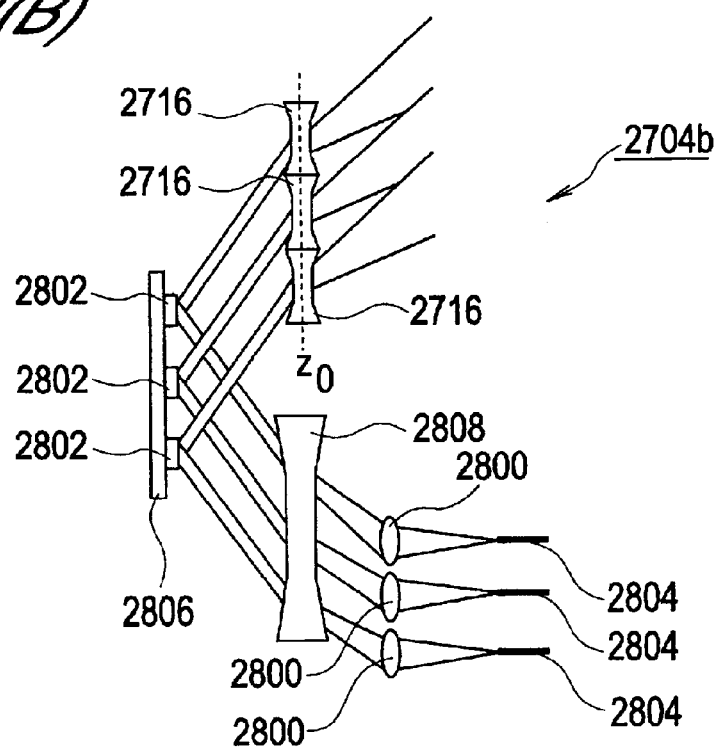
FIG. 28(B) is a view illustrating the construction (second mode) of an input side switching element.

Next, in FIG. 28(B) shows a second mode 2704b of input side switching element 2704 used in this embodiment will be described.

The construction of the lens system provided in this input side switching element is practically identical with that illustrated in FIG. 28(A). Duplicated description of the various parts of the construction and figure will therefore be omitted.

In this lens system, apart from concave lens 2716, a second concave lens 2808 of single lens construction is provided between fixed lens 2800 and moveable mirror 2802. In this way, by means of the second concave lens to 2808, it becomes possible to narrow the intervals between the optical flux series from optical fibers 2804, and thereby becomes possible to increase the density of arrangement of moveable mirrors 2802, so raising the level of integration.

It should be noted that the lens system used in the sixth embodiment is not restricted to the layout shown in FIGS. 28(A) and (B). So long as the construction is one in which concave lenses are provided on plane z1 where the light of these lens systems is incident and plane z0 whence the light is emitted, a construction may be adopted wherein moveable lenses are employed for example as described previously in FIG. 3. In this case, preferably the concave lenses provided on the plane where the light of these lens systems is incident and the plane whence light is emitted are constituted by a second moveable lense.

Figure 30:
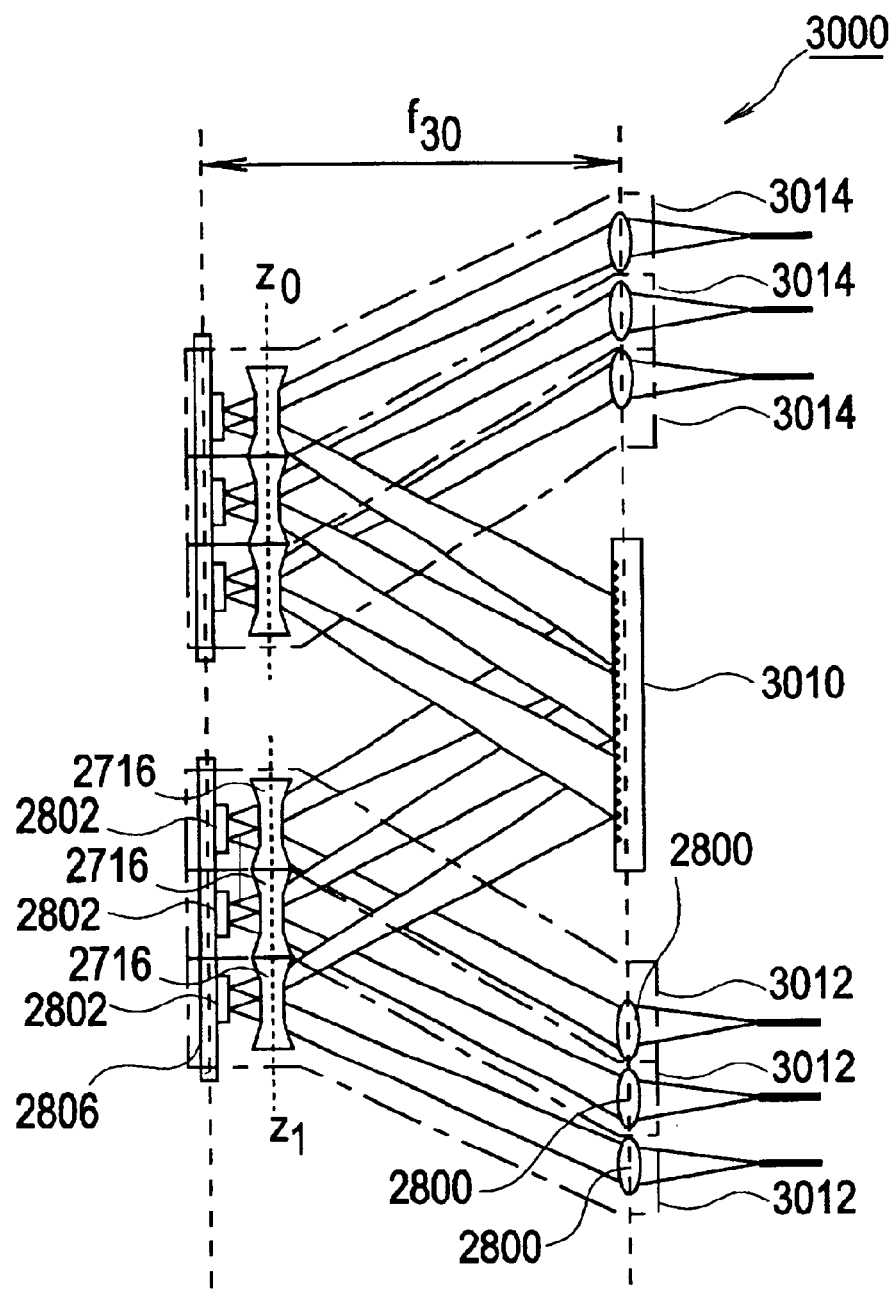
FIG. 30 is a view illustrating an optical switch (example using a hologram as an optical element) of the sixth embodiment.

Next, an example is illustrated in which a hologram 3010 is employed as the optical element in FIG. 30. The basic construction of this optical switch 3000 is the same as the construction shown in FIG. 27. Accordingly, in FIG. 30, duplicated description of the various parts of the construction and Figure is omitted.

It should be noted that, in optical switch 3000, the construction of the input side lens systems 3012 and output side lens systems 3014 is identical. Accordingly, in FIG. 30, the structural elements are indicated by attaching reference symbols, taking the input side lens system 3012 as being representative.

In this optical switch 3000, the central optical paths of the optical flux that is input/output with respect to the moveable mirrors 2802 shown in the drawing provided in lens systems 3012 and 3014 at the input side and output side fall in the same plane (in this case, the plane of the figure). Consequently, the moveable mirrors 2802 provided in lens systems and 3012, 3014 on the input side and output side can be integrated on a single substrate. Also, the central optical paths of the optical flux that is input/output with respect to fixed lenses 2800 and optical elements 3010 fall within the same plane, so fixed lenses 2800 and optical elements 3010 can be constructed unitarily on the substrate by hologram 3010.

Next, an example of a method of integrating these lens systems on a substrate will be described with reference to FIG. 31.

Figure 31A:
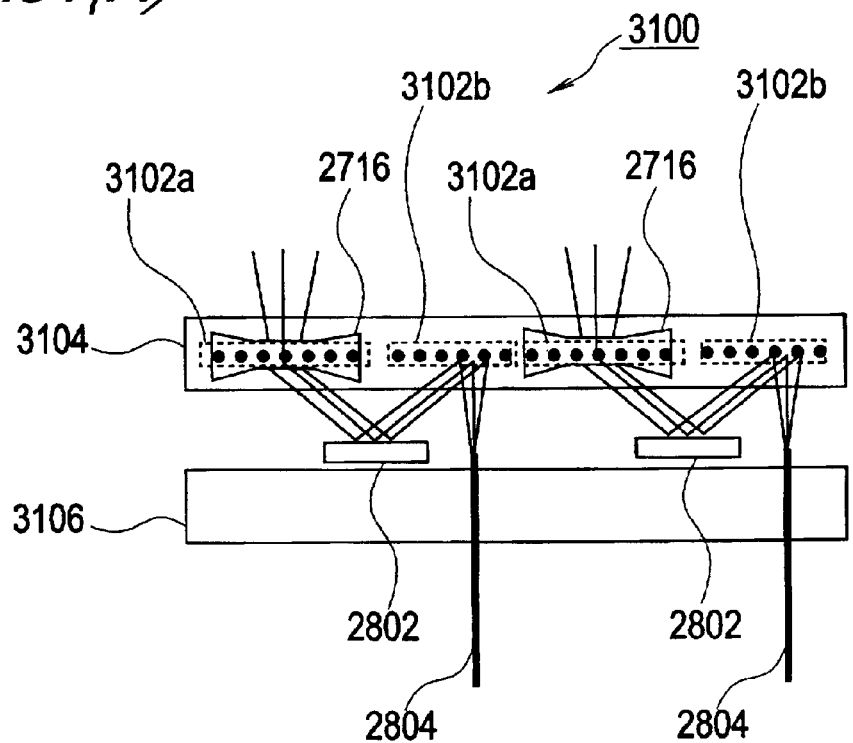
FIG. 31(A) is a cross-sectional view illustrating an example of a lens system integrated on a substrate.
Figure 31B:
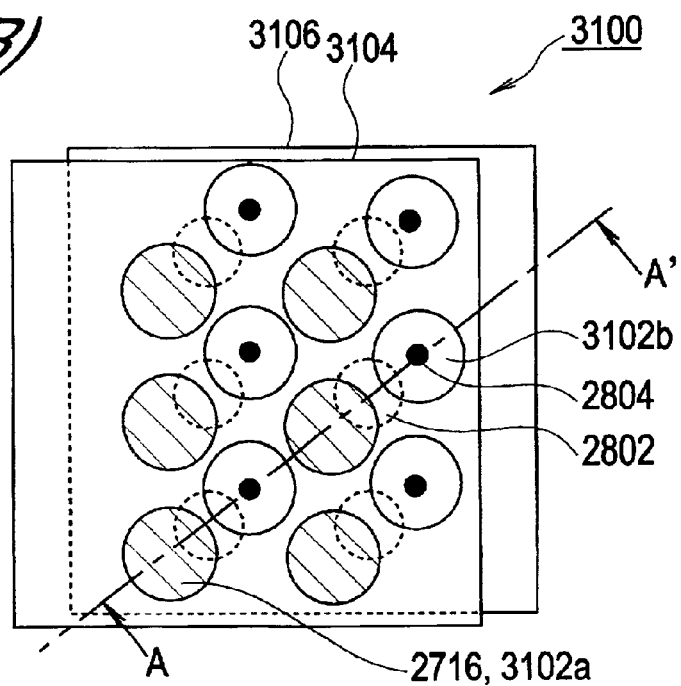
FIG. 31(B) is a plan view illustrating an example of a lens system integrated on a substrate.

FIG. 31(A) is a view given in explanation of the condition of arrangement of the lens systems integrated on the substrate. FIG. 31(B) is a diagram of the arrangement relationships of the structural elements of these lens systems, FIG. 31(A) corresponding to a view seen from the direction of the arrows of a cross section along the line A–A' of FIG. 31(B). Also, in this embodiment, switching elements of the same construction are employed on the input side and output side. These will therefore be described here with reference to the lens system in the input side switching element 3100.

In FIG. 31(A), a substrate on which concave lenses 2716 are integrated with holograms 3102a and 3102b is designated substrate 3104. Also, the substrate where moveable mirrors 2802 are provided is designated substrate 3106. Optical signals are input from optical fibers 2804 provided extending from the rear face side to the front face of substrate 3104 and substrate 3106.

The substrate 3104 that is provided with holograms 3102a, 3102b and concave lenses 2716 is arranged as shown in FIG. 31(B) with respect to substrate 3106. Specifically, holograms 3102a are arranged, likewise in matrix fashion, with respect to concave lenses 2716 which are arranged in matrix fashion, such that a portion of the holograms overlaps the concave lenses while the rest of the holograms 3102b is embedded in the gaps between the concave lenses.

Furthermore, substrate 3106 on which moveable mirrors 2802 are provided is arranged with respect to substrate 3104 such that the moveable mirrors 2802 face the holograms 3102a, 3102b and concave lenses 2716 provided on substrate 3104. Thanks to this arrangement, concave lenses 2716 can be arranged with high density.

The straight lines linking the constructional elements shown in FIG. 31(A) represent diagrammatically the shapes of the beams in each section. The operation of each section will be described referring to these beam shapes.

The optical signals issuing from optical fibers 2804 constitute incoming light which is reflected by holograms 3102b to form parallel light which is directed onto moveable mirrors 2802. The light that is reflected by moveable mirrors 2802 then passes through holograms 3102a and concave lenses 2716 arranged on substrate 3104. The light that has passed through concave lenses 2716 is then dispersed and is emitted in a direction perpendicular to substrate 3104 by holograms 3102a.

Next, a sixth embodiment will be analyzed using a matrix representation, referring to FIG. 32.

FIG. 32 is a view given in explanation of the operation of the various sections in the optical system including lens systems and optical elements in this embodiment.

Figure 32A:
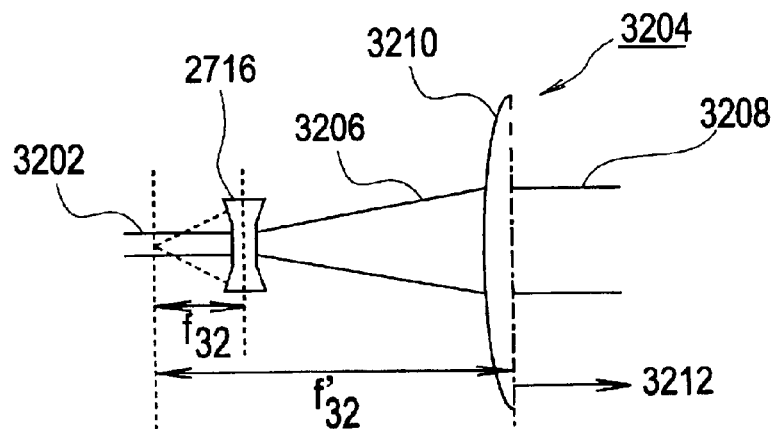
FIG. 32(A) is a view illustrating the shape of optical flux between a concave lens and an optical element in the sixth embodiment.

FIG. 32(A) shows diagrammatically by means of straight lines 3202, 3206, 3208 linking the respective sections the shapes of the optical flux therein, in respect of concave lenses 2716 and optical elements 3210 arranged on the light emission plane of the input side lens system of the input side switching element 3204 in this embodiment.

Figure 32B:
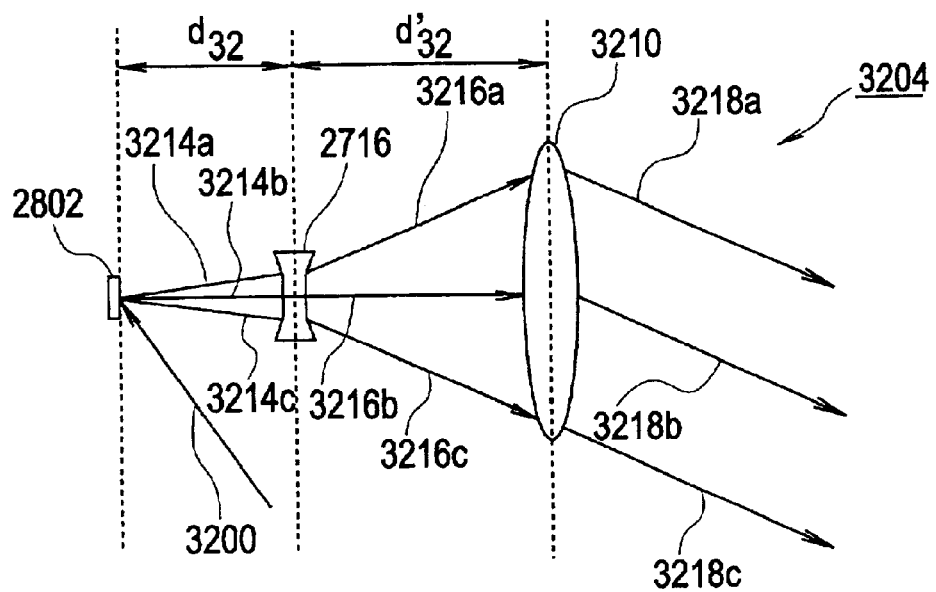
FIG. 32(B) is a view illustrating the shape of optical flux from a moveable mirror up to after passage through an optical element in the sixth embodiment.

Also, FIG. 32(B) shows diagrammatically by means of straight lines 3214a, 3214b, 3214c and arrows 3216a, 3216b, 3216c and 3218a, 3218b and 3218c the shapes of the central optical paths of the ray bundles therein, in respect of the moveable mirrors 2802 provided in the input side lens system of input side switching element of 3204 and concave lenses 2716 and optical elements 3210 arranged in the plane whence the light is emitted.

Also, in this sixth embodiment, the construction of the input side and output side switching elements is the same.

In FIG. 32(A), the incoming light 3202 to the concave lenses 2716 arranged on the plane whence the light of the lens system is emitted is parallel light. Thus, this parallel light 3202 becomes light 3206 that is dispersed after passage through concave lenses 2716 and is directed into optical element 3210. It becomes parallel light 3208 in the middle of the interior 3212 of optical element 3210.

In FIG. 32(B), if a moveable mirror 2802 is provided in the lens system, of the respective beams corresponding to the central optical paths 3214a, 3214b, 3214c of the ray bundles, light that has been deflected with a desired angle with respect to the moveable mirror 2802 can be obtained.

In FIG. 32(A), $f_{32}$ is the distance between the concave lens 2716 and its virtual focal point, $f'_{32}$ is the focal point distance of optical element 3210, and in FIG. 32(B), $d_{32}$ is the distance from the moveable mirror to the concave lens 2716 and $d'_{32}$ is the distance from the concave lens 2716 to the optical element 3210.

If the ray matrix corresponding to the operation of FIG. 32(A) is found, the elements of this ray matrix are expressed as:

$$m11 = 1 + d'_{32}/f_{32} \quad (29a)$$

$$m12 = d_{32} + d'_{32} + d'_{32}d_{32}/f_{32} \quad (29b)$$

$$m21 = -1/(2f'_{32}) + 1/f_{32} - d'_{32}/(2f'_{32}f_{32}) \quad (29c)$$

$$m22 = -d_{32}/(2f'_{32}) + [1 - d'_{32}/2f'_{32}](1 + d_{32}/f = \quad (29d).$$

In order for the parallel light (angle of incidence=0) 3202 to concave lens 2716 to become parallel light 3208 at the center point of optical element 3210, it is necessary that m21=0.

Consequently, $$-1/(2f'_{32}) + 1/f_{32} - d'_{32}/(2f'_{32}f_{32}) = 0 \quad (30)$$

And if the ray matrix corresponding to the operation of FIG. 32(B) is found, this is:

$$m11 = 1 + d'_{32}d_{32}/f_{32tm} \quad (31a)$$

$$m12 = d_{32} + d'_{32} + d'_{32}d_{32}/f_{32} \quad (31b)$$

$$m21 = -1/f'_{32} + 1/f_{32} - d'_{32}/(f'_{32}f_{32}) \quad (31c)$$

$$m22 = -d_{32}/(f'_{32}) + [1 - d'_{32}/f'_{32}](1 + d_{32}/f_{32}) \quad (31d).$$

When parallel light 3202 is emitted from concave lenses 2716 of FIG. 32(A), in order for all of the ray bundles 3206 that are emitted with respective angles of deflection from the concave lenses 2716 to become parallel light after passing through optical element 3210, the angle of emission of the light from concave lenses 2716 should be independent of the angle of incidence of the parallel light 3202 on the concave lenses 2716.

Consequently, in expression (31d), from m22=0, we obtain:

$$0 = -d_{32}/(f'_{32}) + [1 - d'_{32}/f'_{32}](1 + d_{32}/f_{32}) \quad (32).$$

The condition that (30) and (32) are simultaneously satisfied is:

$$f_{32}/f'_{32} = 1 + d_{32}/f_{32} \quad (33a)$$

$$d'_{32} = 2f'_{32} - f_{32} \quad (33b)$$

The extreme limiting values that can be designed are $d_{32}=0$ and $d'_{32}=0$. We then have respectively: $f_{32}=f'_{32}$, $d'_{32}=f'_{32}$ and $f_{32}=2f'_{32}$, $d_{32}=f_{32}$.

Considering the overall system including the input side and output side lens systems, at the extreme limit where $d'_{32}=0$, concave lenses 2716 are merged from the input/output side with respect to optical elements 3210 and furthermore assume a condition in which the lens functions are mutually canceled i.e. this is equivalent to a condition in which no lens is included in any system.

Also, in FIG. 32(B), if we let the angle of deflection produced by moveable mirror 2802 be θ, the center position of the optical flux after optical element 3210, from expressions (31a) to (31d), becomes m12θ. Using expressions (33a), (33b), and rearranging the expressions for $d'_{32}$, $f'_{32}$, we have:

$$m12\theta = [2(f_{32} - f'_{32}) + d'_{32}]\theta = f_{32}\theta \quad (34)$$

At the extreme limit of $d_{32}=0$, the central position of the optical flux after optical element 3210 is $m12\theta = d'_{32}\theta$.

Figure 33:
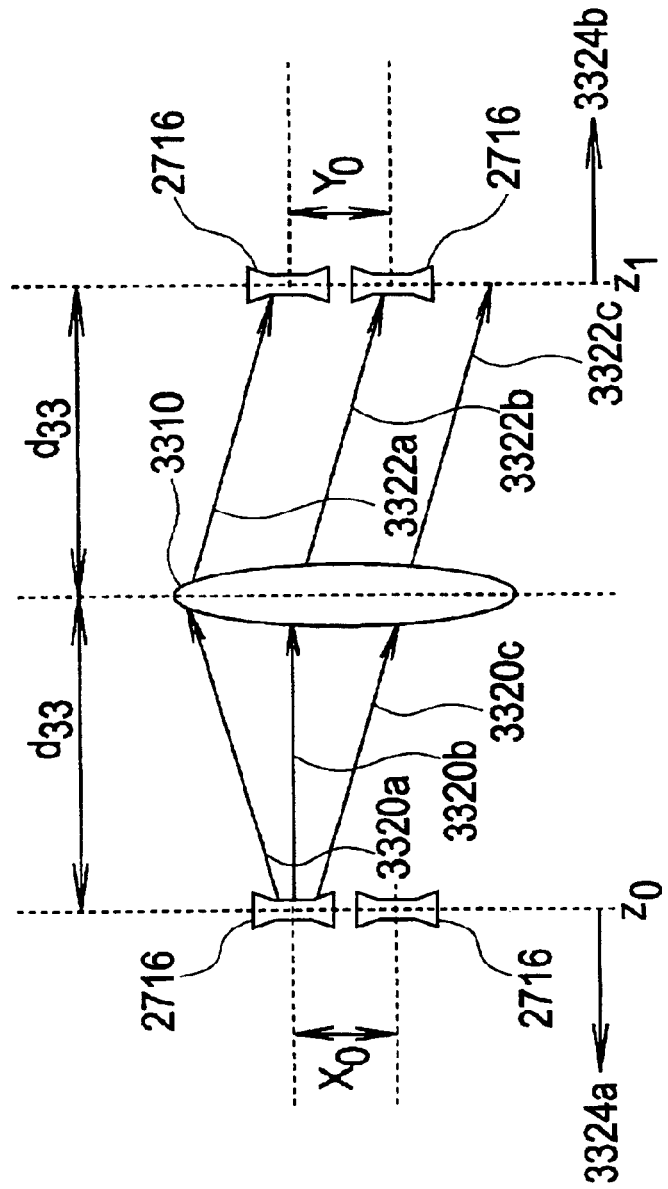
FIG. 33 is a view illustrating the shape of optical flux between an input side switching element and an output side switching element in the sixth embodiment.

Next, using FIG. 33, the appearance of the optical flux at plane $z_1$ where the light is incident, where concave lenses 2716 are arranged on the output side from optical element 3310 will be investigated. The construction of the various sections shown in FIG. 33 is basically the same as in the case of the construction of FIG. 32. This FIG. 33 shows the relationship with optical elements 3310 in respect of the respectively provided concave lenses 2716 of the input side switching element 3324a and the output side switching element 3324b formed on either side of optical elements 3310. The central optical path of the ray bundles in each section is represented diagrammatically by arrows 3320a, 3320b, 3320c and 3322a, 3322b, 3322c.

In this sixth embodiment, the distance of optical element 3310 and the plane $z_0$ whence the light is emitted, and the distance of optical element 3310 and the plane $z_1$ at which the light is incident are the same, this distance being designated as $d_{33}$. The ray matrix of the concave lenses 2716 arranged on the plane $z_0$ whence the light of the input side switching element is emitted to the plane $z_1$ at which the light of the output side switching element is incident will now be found.

Furthermore, referring to FIG. 32, using the results of the focal point distance $f'_{32}$ of the optical element, distance $f_{32}$ to the virtual focal point of the concave lens, and distance $d'_{32}$ between the concave lens and the optical element that were found hitherto, we have:

$$m11=1-d_{33}/f'_{32}=f_{32}/f'_{32}-1=d_{32}/f_{32} \tag{35a}$$

$$m12=d_{33}(2-d'_{32}/f'_{32})=d'_{32}(f_{32}/f'_{32}) \tag{35b}$$

$$m21=-1/f'_{32} \tag{35c}$$

$$m22=1-d_{33}/f'_{32}=f_{32}/f'_{32}-1 \tag{35d}$$

Under the condition $d_{32}=0$ ($f_{32}/f'_{32}=0$), m11=0, so the position of the optical flux on plane $z_1$ where the light of the output port is incident is determined solely by the deflection angle at concave lens 2716 arranged on plane $z_0$ whence the light of the input port is emitted.

Taking the diameter of the optical flux of the parallel beam 3202 in front of the concave lens 2716 as being r, the diameter R of the optical flux at plane $z_1$ where the light from this output port is incident is:

$$R=m11r+m12r/f_{32} \tag{36}$$

Calculating expression (36) using expressions (33a) and (33b), this diameter R is r i.e. the system is of unit multiplication factor.

If $d_{32}\neq 0$, the output position of concave lens 2716 provided on plane $z_0$ whence the light of the input port is emitted is different with the deflection angle $\theta$ of the moveable mirror 2802, so the optical flux is incident at a position corresponding thereto on the plane $z_1$ where the light at the output port is incident.

As shown in FIG. 33, directing attention to the two concave lenses 2716 provided on plane $z_0$ whence the light at the input port is emitted let the distance between the centers of these concave lenses 2716 be $X_0$. At this point, at $\theta=0$, from m11, the position at which the optical flux that is output from the input port reaches plane $z_1$ where the output port light is incident is $X_0 d_{32}/f_{32}$ with respect to the distance $X_0$ between the centers of these concave lenses 2716. This must coincide with the emission position $d_0\theta$ of the light in concave lens 2716 arranged on plane $z_0$ whence the input port light is emitted in FIG. 32(B).

Consequently, in order to select the input side lens system at $X_0$, it is necessary to perform angular setting of $\theta=X_0/f_{32}$ on the output side.

The optical flux centers 3320a, 3320b, 3320c immediately after issuing from input side concave lens 2716 have angles $\theta(1+d_{32}/f_{32})$.

The optical flux position on the plane $z_1$ where the light at the output port is incident is:

$$Y_1=m11(X_0+d_{32}\theta)+m12\theta(1+d_{32}/f_{32})=X_0d_{32}/f_{32}+\theta d_{32}{}^2/f_{32}+\theta d_{33}(f_{32}/f'_{32})(1+d_{32}/f_{32})=X_0d_{32}/f_{32}+\theta f_{32} \tag{37}$$

For the final equation expressions (33a) and (33b) are employed. When interchange of the input and output are considered, matching is obtained with $\theta=X_0/f_{32}$ found in the preceding paragraph.

The radius $\phi/2$ of the concave lenses 2716 must be larger than the maximum value $X_{0m}$ of $X_0$ for the optical flux position $X_{0m}d_{32}/f_{32}$ at the plane $z_1$ where the light is incident at the output port. $d_{32}/f_{32}$ should preferably be small.

The number of circuits that can be achieved with the optical switch of this sixth embodiment will now be estimated. The description will be given recalling the construction of the optical switch of the present invention shown in FIG. 1.

In this sixth embodiment, concave lenses 2716 are provided at plane $z_0$ where the light of the input side lens system is emitted, as shown in FIG. 27.

Also, in an optical switch according to the present invention of the construction illustrated in FIG. 1, the number of these concave lenses 2716 must be considered in relation to the size on substrates 32, 36, 42 and 46. Furthermore, switching elements of identical construction are employed for the input side switching element and output side switching element. Accordingly, referring specifically for example to substrate 32 in FIG. 1, the size of this substrate is $\phi N^{1/2}$.

From FIGS. 32(A) and (B), the deflection angle of the light emitted from a concave lens 2716 is $1+d_{32}/f_{32}$ times the deflection angle after moveable mirror 2802.

The deflection angle is therefore kept at $d_{32}\approx 0$. As the maximum deflection angle $\theta m$, the maximum scanning width is $2d'_{32}\theta m$. Consequently, by making the maximum scanning width coincide with the size of substrates 32, 36, 42, 46 per FIG. 1, we have:

$$N=(2d'_{32}\theta m/\phi)^2 \tag{38}$$

In an ideal optical system, the focal point offset produced by angular offset at an optical fiber provided in the output side optical switch element is $\delta S=f\delta\theta$, so, if the error is represented as $\delta\theta/\theta m=\epsilon$, we have:

$$N=[2d'_{32}\delta S/(\epsilon f\phi)]^2 \tag{39}$$

By making $d'_{32}/(f\phi)$ sufficiently large, any desired increase in number of channels can be achieved.

For example, if we put $\delta S=1$ μm, $\epsilon=0.01$, f=0.5 mm, $\phi=80\mu$, and $d_1=10$ cm, N=640,000 circuits. If $\theta m$ is restricted to 0.1 rad, N=160,000 circuits.

[Seventh Embodiment]

Figure 34:
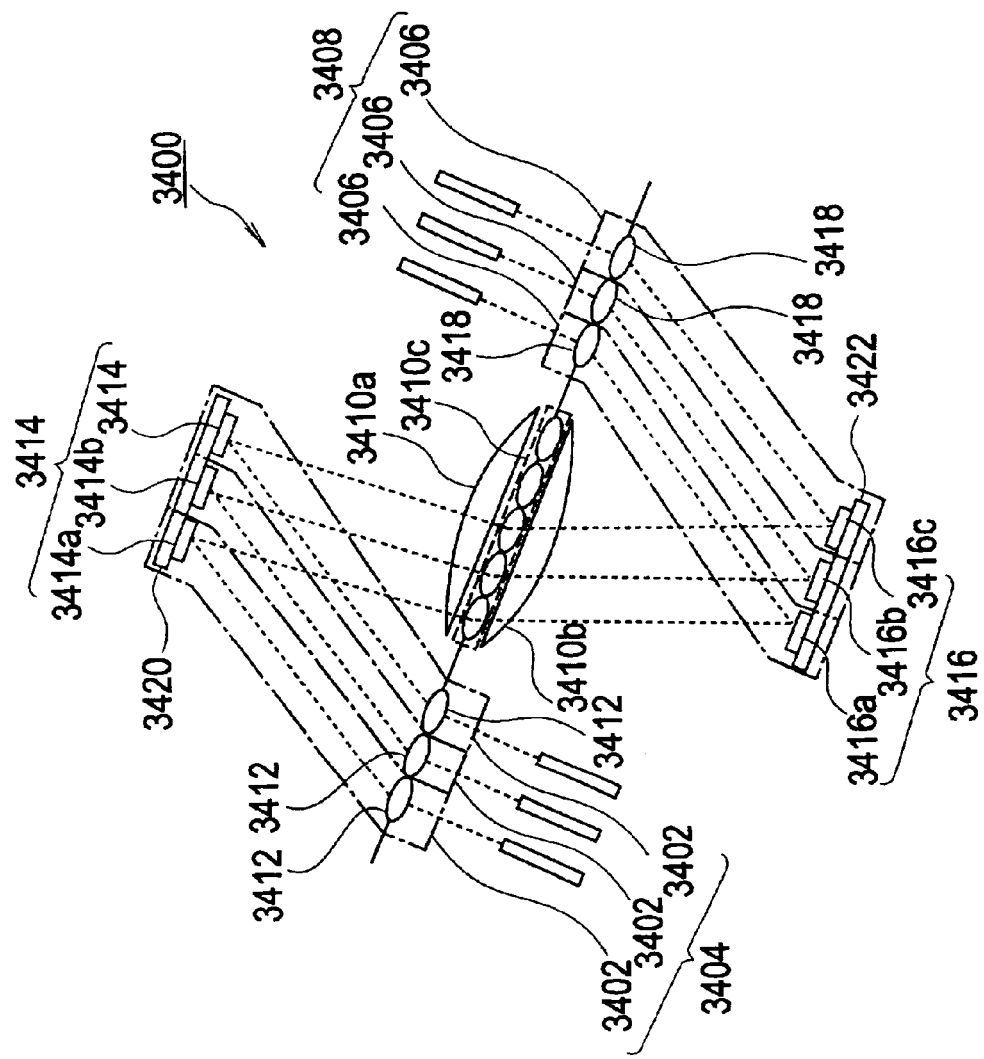
FIG. 34 is a view illustrating an example of an optical switch according to a seventh embodiment.

The construction of a seventh embodiment is illustrated in FIG. 34. The basic construction of optical switch 3400 in this embodiment is same as the construction described in the sixth embodiment illustrated in FIG. 27. Accordingly, duplicated description of identical structure will be omitted.

In this optical switch 3400, as the optical elements, preferably convex lenses or holograms are employed. An example will now be described in which convex lenses are employed as the optical elements.

In optical switch 3400 of this embodiment, the convex lenses serving as the optical elements are constituted by a combination of a first convex lens 3410c provided individually corresponding to the optical path between the input side switching element 3404 and the output side switching element 3408, and two second convex lenses 3410a and 3410b provided on both sides sandwiching this first convex lens 3410c. The shapes and physical properties of these two second convex lenses 3410a and 3410b are identical.

Also, input side lens system 3402 and output side lens system 3406 are constituted of fixed lenses 3412 and 3418 and moveable mirrors 3414 and 3416.

It should be noted that it would alternatively be possible to construct 3412 and 3418 as moveable lenses. In this case, these moveable lenses, in the input side lens system 3402, are capable of movement in the direction of incidence of the optical signal with respect to the optical fiber and, in the output side lens system 3406, are capable of movement in a plane perpendicular to the emission direction.

In contrast, moveable mirrors 3414 and 3416 are of a construction having axes of rotation in the direction of the central optical path of the incident rays of the optical signal in the case of the input side lens system 3402 and in the direction perpendicular to the plane containing the central optical path of the reflected rays of the optical signal, in the case of the output side lens system 3406.

Figure 35:
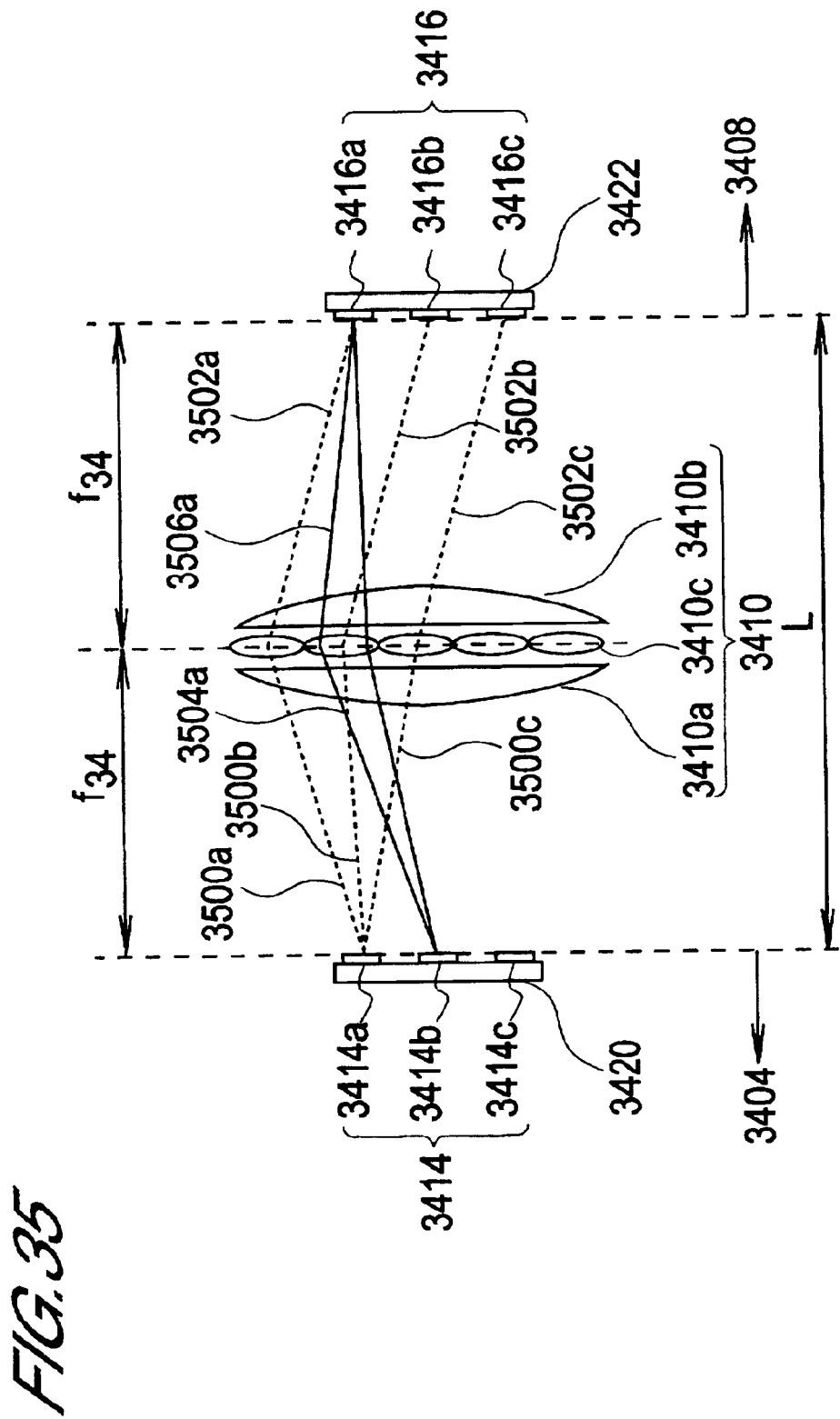
FIG. 35 is a view illustrating an example of the arrangement of an optical element and a moveable mirror in the seventh embodiment.

FIG. 35 shows how the optical path is set between the input side switching element 3404 and the output side switching element 3408 in this optical switch 3400. Unlike the arrangement relationship of the optical elements and moveable mirrors described in the fifth embodiment illustrated in FIG. 20, the input side moveable mirrors 3414 and output side moveable mirrors 3416 are not arranged alternately with respect to the first convex lenses 3410c but rather are arranged on the substrate with the same pitch as the first convex lenses 3410c. If the first convex lenses 3410c are arranged continuously successively in contact, these two moveable mirrors 3414 and 3416 are also respectively arranged continuously successively in contact. However, it is not essential that the number of first convex lenses and the number of the two moveable mirrors should coincide and any desired suitable number thereof could be adopted in accordance with the design.

Input side moveable mirrors 3414 are then respectively arranged at the focal point position i.e. focal plane of the compound lens (complex lens) 3410 constituted by first convex lens 3410c and second convex lenses 3410a and 3410b. The focal point distance of this compound lens is indicated by $f_{34}$ in FIG. 35.

In the figure, the dotted lines 3500a to 3500c and dotted lines 3502a to 3502c and the straight lines 3504a, 3506a linking the respective sections indicate diagrammatically the shapes of the light beams in each section. Directing attention to a single one, namely, 3414a, of these moveable mirrors 3414 on the input side, the optical flux bundles 3500a to 3500c deflected in radial fashion from this moveable mirror 3414a are converted into parallel optical flux bundles 3502a to 3502c to the rear of second convex lenses 3410a, 3410b.

All of the optical flux bundles 3500a to 3500c from this input side moveable mirror 3414a are arranged to arrive at output side moveable mirrors 3416. Specifically, input side and output side moveable mirrors 3414, 3416 are arranged in a plane perpendicular to the optic axis at symmetrical positions to the front and to the rear of compound lens 3410, taking as axis of symmetry an axis perpendicular to the optic axis (i.e. an axis in the radial direction of the lens) passing through the center of compound lens 3410.

Supposing that first lens 3410c were not arranged in this compound lens 3410, when the moveable mirror 3414 provided in the input side lens system 3402 shown in FIG. 34 is arranged on the focal plane i.e. at the focal point position (or position of minimum diameter of the optical flux) of the compound lens consisting solely of the second convex lenses, the optical flux emitted from one moveable mirror, for example 3414b, becomes purely parallel light after passing through this compound lens consisting solely of this second convex lens.

Furthermore, as described in the fifth embodiment, in order to reduce focal point positional offset on the output side moveable mirrors 3416 resulting from the angle of the input side moveable mirrors 3414 and angular error generated thereby, it is necessary to form the focal points on the output side moveable mirrors 3416 in the same way as on the input side.

To this end, apart from second convex lenses 3410a, 3410b for determining the deflection direction of the optical flux, there is provided a first convex lens 3410c for focusing purposes. If this first convex lens 3410c were of a single lens construction as with the second convex lenses 3410a, 3410b, the deflection function thereof would be disturbed. As a result, a lens array structure is adopted in which a single one in each case of first convex lenses 3410c is provided in respect of the set optical path.

The focal point distance of first convex lens 3410c for bringing the light that has passed through this compound lens 3410 to a focus at a focal point on output side moveable mirror 3416 may be the same as in the case of second convex lenses 3410a, 3410b. When the second convex lenses 3410a and 3410b and the first convex lens 3410c are combined, a focal point distance of one half of the focal point distance of second convex lenses 3410a, 3410b is obtained.

The respective input side and output side moveable mirrors 3414, 3416 are arranged such that the distance between a given single mirror 3414a of the input side moveable mirrors and the output side moveable mirror 3416a associated therewith arranged in the same position on substrate 3422 is equal to a value of twice the combined focal point distance of the first convex lens and second convex lens.

Thus, in an optical switch of the construction described above, referring to a single mirror 3414b of the input side moveable mirrors 3414, as indicated by the beams 3504a, 3506a, the input side and output side moveable mirrors 3414 and 3416 can be arranged such that the beam 3504a that is dispersed from this moveable mirror 3414b, like the beam 3506b, is brought to a focus on the output side moveable mirror 3416a.

The light is deflected at the input side moveable mirrors 3414 towards a desired first convex lens 3410c. Which of the moveable mirrors of the output side moveable mirrors 3416 the light arrives at is determined by the relative positions of this input side moveable mirror 3414 and the first convex lens 3410c. The output port can therefore be selected by choosing the identity of the position of the first convex lens 3410c that is to be employed.

If the distance between one mirror belonging to the input side moveable mirrors 3414 and the output side moveable mirror that is associated with this and is provided on substrate 3422 is designated as L, this distance L is in the relationship $L < \Pi \theta^2 / \lambda$ with respect to the diameter of the first convex lens 3410c.

The seventh embodiment of the construction illustrated in FIG. 34 is an embodiment in which the fifth embodiment illustrated in FIG. 20 is improved by the introduction of second convex lenses 3410a and 3410b. A comparison with the optical switch of the fifth embodiment of the construction shown in FIG. 20 will therefore be made.

Now, in the optical switch 3400 illustrated in FIG. 34, the input side or output side moveable mirrors 3414 and 3416 are arranged in a number of $N^{1/2}$ on one side, in a matrix arrangement of number N in a plane on substrate 3420 or 3422.

Also, a number $(2N^{1/2}-1)$ of first convex lenses 3410c are arranged on one side corresponding to these moveable mirrors in 3414 or 3416. If the arrangement pitch between the first convex lenses 3410c is assumed to be Aø (where A is a constant), the length of a side of substrates 3420 and 3422 may be given by $s = A\emptyset N^{1/2}$.

The length of one side of the substrates 172 and 174 in the case of the optical switch of the fifth embodiment of the construction shown in FIG. 20 was $s = A\emptyset(2N^{1/2}-1)$.

Accordingly, applying this to consideration of the arrangement of the various parts of the optical switch shown in FIG. 1 or FIG. 26, in an optical switch according to the seventh embodiment, the substrate size can be reduced in area by a factor of one quarter.

Also, if the maximum deflection angle produced by an input side moveable mirror 166 in the fifth embodiment described with reference to FIG. 20 is taken as being θm on one side, this may likewise be applied to consideration of the arrangement of the various parts in an optical switch as illustrated in FIG. 1 or FIG. 26.

The deflection angle of an input side moveable mirror 166 provided at a port arranged at the periphery of the matrix arrangement of input ports therefore had to be $\theta m = 2 A\emptyset N^{1/2}/L$.

On the other hand, considering a like case in this seventh embodiment, since a deflection angle of twice the deflection angle of the input side moveable mirror 166 in the optical switch shown in FIG. 20 can be employed, $\theta m = A\phi N^{1/2}/L$. In other words, in the seventh embodiment, compared with the fifth embodiment, $\theta m$ can be made half that of the fifth embodiment.

It is therefore possible to increase the number of circuits N by a factor of 4 for the same maximum deflection angle $\theta m$. The relationship of the maximum deflection angle with $\phi$ and N is: $N = [(\Pi \theta m \phi)/(\lambda A)]^2$.

This is a similar relationship to that of the technique disclosed in Reference 1. That is, as already described with reference to the fifth embodiment, in the optical switch disclosed in this Reference 1, the value of the diameter of a moveable mirror is set to 200 to 300 µm. In the fifth embodiment illustrated in FIG. 23, the value of the diameter of a relay lens provided as an optical element is the same value as this. This applies likewise to the first convex lenses provided in the seventh embodiment illustrated in FIG. 34 having a similar construction to the fifth embodiment.

From the above, the optical switches of the fifth and seventh embodiment of the present invention differ from the optical switch construction disclosed in Reference 1 in that the diameters of the moveable mirrors 3314 or 3316 can be made smaller than the value in Reference 1.

[Prior Art Example in the Eighth Embodiment]

Figure 25A:
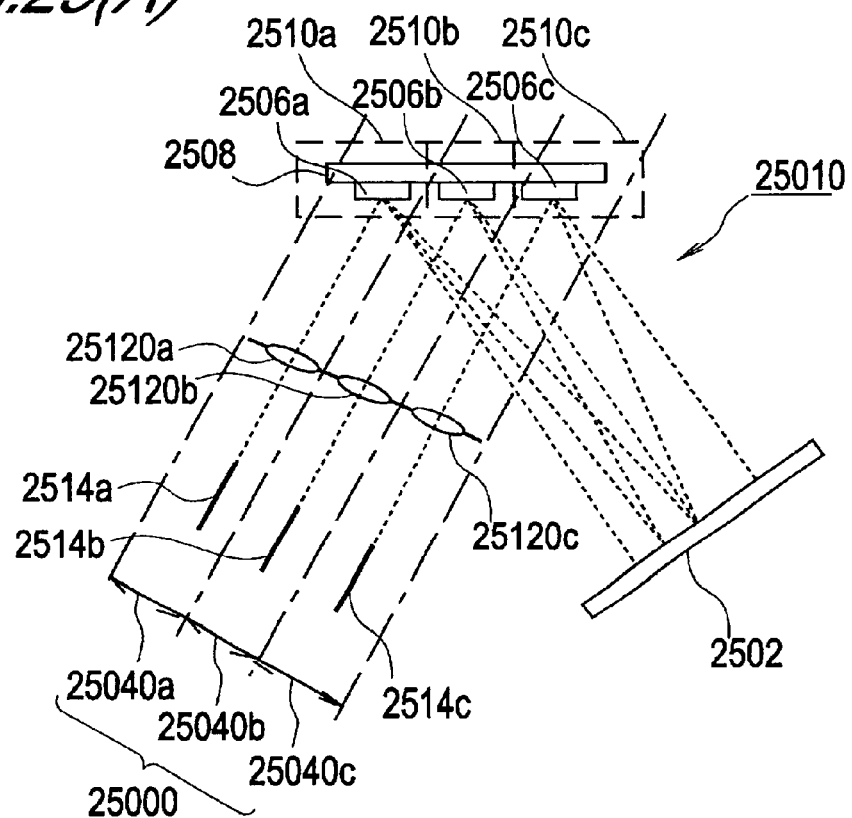
FIG. 25(A) is a view illustrating an example of an optical switch using a fixed reflecting mirror in an optical element, as a prior art example of an optical switch according to an eighth embodiment.

Next, a prior art example in an eighth embodiment of the present invention is illustrated in FIG. 25(A). This optical switch 25010 is a known prior art switch, in which a fixed reflecting mirror 2502 is employed as the optical reflecting element.

Using this, further problems with which the eighth embodiment is concerned will be clarified by describing this optical switch 25010.

This optical switch 25010 is of a construction in which the input side switching element and output side switching element are common. Accordingly, in this description, the input side switching element and output side switching element will be referred to by a general term as the input/output side switching element 25000. Also, the dotted lines connecting the various sections indicate diagrammatically the central optical paths of the optical flux in each section.

In FIG. 25(A), input/output side switching elements 25000 comprise optical deflection elements 2510a to 2510c of a construction in which moveable mirrors 2506a to 2506c corresponding respectively to optical input/output ports 25040a to 25040c are provided on a substrate 2508. Also, collimator lenses (fixed lenses) 25120a to 25120c are arranged between optical fibers 2514a to 2514c and moveable mirrors 2506a to 2506c, corresponding to respective optical deflection elements 2510a to 2510c. Specifically, in this construction, lens systems constituted by optical deflection elements 2510a to 2510c of the construction described above and collimator lenses (fixed lenses) 25120a to 25120c are formed at input/output ports 25040a to 25040c.

Also, fixed reflecting mirrors 2502 constituted by single sheets as optical elements are arranged in the middle of these lens systems i.e. between the input side switching elements and output side switching elements.

Also, collimator lenses (fixed lenses) 25120a to 25120c can be formed on substrate 2508 in the same way as moveable mirrors 2506a to 2506c.

The operation of this optical switch 25010 will now be described.

At a given input/output port 25040a to 25040c, the light that is emitted from optical fibers 2514a to 2514c is deflected and focused on the desired moveable mirrors 2506a to 2506c by means of collimator lenses 25120a to 25120c. And as shown in FIG. 25(A), the light from optical fibers 2514a to 2514c becomes parallel light directed towards moveable mirrors 2506a to 2506c thanks to the action of collimator lenses (fixed lenses) 25120a to 25120c.

Thus, after the light has been deflected by moveable mirrors 2506a to 2506c to fixed reflecting mirror 2502, it is reflected. In this process, by adjustment of the angle of incidence by means of a moveable mirrors 2506a to 2506c, the light is deflected so as to be incident upon a specified optical fiber 2514a to 2514c. Specifically, the light leaving the moveable mirrors 2506a to 2506c is reflected by fixed reflecting mirror 2502, and is directed towards the moveable mirror 2506a to 2506c corresponding to the desired input/output port 25040a to 25040c. After this, the light is deflected in the direction of the desired optical fiber 2514a to 2514c by moveable mirrors 2506a to 2506c. Then the light from the moveable mirrors 2506a to 2506c is focused onto the terminal faces of optical fibers 2514a to 2514c by the collimator lenses (fixed lenses) 25120a to 25120c.

After the light has been emitted from the terminal faces of the plurality of optical fibers 2514a to 2514c, by passing through collimator lenses (fixed lenses) 25120a to 25120c, it is converted to parallel light, and is directed onto moveable mirrors 2506a to 2506c. At this point, the central axes of the optical flux bundles that have passed through collimator lenses (fixed lenses) 25120a to 25120c are mutually parallel with respect to the central axes of the other optical flux bundles.

The surface of substrate 2508 where the optical components etc are mounted is a flat face; the mirror surfaces of moveable mirrors 2506a to 2506c mounted on this substrate 2508 in the uncontrolled condition are parallel with the surface of substrate 2508 and are mutually within the same plane. The central optical paths of the ray bundles reflected by moveable mirrors 2506a to 2506c in this condition are of course likewise mutually parallel.

If the fixed reflecting mirror 2502 is a plane mirror, the central optical paths of the ray bundles of the respective beams that are reflected thereby are also mutually parallel with respect to the central optical paths of the other ray bundles. When the moveable mirrors 2506a to 2506c are in the uncontrolled condition as described above, the respective beams reflected by the fixed reflecting mirror 2502 are again directed into the optical fibers 2514a to 2514c along the same optical path which they followed until they were incident on the fixed reflecting mirror 2502.

Let us now consider an input/output port 25040a corresponding to the moveable mirror 2506a which is an optical deflecting element at the periphery of substrate 2508. When moveable mirror 2506a is in an uncontrolled condition, the reflected optical flux from the moveable mirror is incident perpendicularly onto the fixed reflecting mirror 2502.

Furthermore, let us consider the case where the light emitted from optical fiber 2514a is directed into optical fiber 2514b or 2514c by adjustment of the angle of incidence at moveable mirror 2506a. In this case, the central optical path of the ray bundles deflected towards the fixed reflecting mirror 2502 by adjustment of the angle of incidence of moveable mirror 2506a must be displaced to one side with respect to the central optical path of the ray flux of the return beam of the light emitted from the optical fiber 2514a i.e. towards the optical fiber 2514b or 2514c.

Also, the same considerations apply to optical input/output port 25040b, which is in the middle of substrate 2508. In this case also, it will be assumed that moveable mirror 2506b is in an uncontrolled condition.

In order to ensure that the light emitted from optical fiber 2514b is incident on optical fiber 2514a or 2514c by adjusting moveable mirror 2506b, it is necessary to swing the central optical path of the ray bundle reflected at moveable mirror 2506b to any one of the two sides with respect to the central optical path of the ray flux emitted from optical fiber 2514b. Specifically, when this optical switch 25010 outputs to the same output port, there is the problem that drive is made troublesome by the fact that the deflection angle is different depending on the position of the deflection element on the substrate.

The eighth embodiment has the same object as the sixth and seventh embodiments and in addition was made with the object of facilitating drive of the optical switch in the light of the problems of the prior art example described above.

[Eighth Embodiment]

The optical switch of the eighth embodiment comprises an input side switching element having a plurality of input ports arranged in matrix fashion and an output side switching element having a plurality of output ports arranged in matrix fashion. In addition, the respective input ports comprise input side lens systems respectively associated with these input ports and the respective output ports comprise output side lens systems respectively associated with these output ports. This optical switch causes optical signals to be output from the input port side to the output port side.

Furthermore, in this eighth embodiment, optical elements are arranged between the input side switching elements and the output side switching elements. A constructional example will here be described in which fixed reflective mirrors are employed as the optical elements.

Figure 25B:
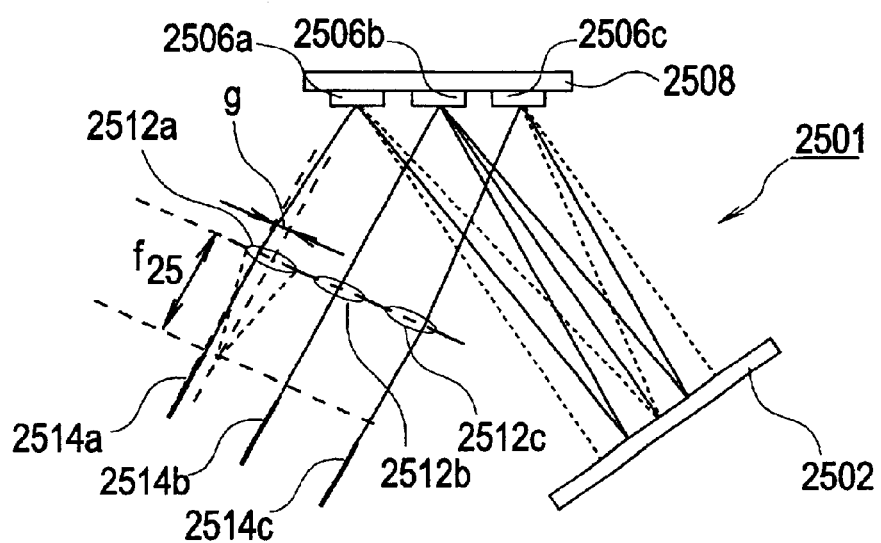
FIG. 25(B) is a view illustrating an example using a fixed reflecting mirror as an optical element, for an example of an optical switch according to the eighth embodiment.

FIG. 25(B) illustrates the construction of this optical switch 2501. In this optical switch 2501, the construction is practically the same as that of optical switch 25010 illustrated in FIG. 25(A) which was described in the prior art example of the eighth embodiment. Accordingly, duplicated description of identical structure will here be omitted.

In this FIG. 25(B), the dotted lines joining the various sections show diagrammatically the optical paths corresponding to the central optical paths of the ray bundles in each section for the conventional optical switch 25010 illustrated in FIG. 25(A). Likewise, the straight lines joining the various sections show diagrammatically the central optical paths of the ray bundles for illustrating the operation of this optical switch in the eighth embodiment.

It should be noted that, although not shown in FIG. 25(B), the input/output ports and input/output side switching elements in optical switch 2501 of this eighth embodiment show the same construction as the input/output ports 25040a to 25040c and input/output side switching elements 25000 in FIG. 25(A).

In this optical switch 2501, a fixed angle deflection action is conferred on fixed lenses 2512a to 2512c. For example, the lines of extension of the optic axes (lines of extension of the central axes of the optical fibers) from the input/output ports have a different arrangement for each port with respect to the center of fixed lens 2512a on the terminal side. That is, they have an arrangement in which the respective central axes of the input ray bundles are offset from the centers of the fixed lenses.

Thus, as shown in FIG. 25(B), if the focal point distance of fixed lens 2512a is assumed to be f25 with the respect to the distance g between the center of this fixed lens 2512a and the central optical path of the ray bundle from optical fiber 2514a, the light is deflected by an angle $g/f_{25}$ by the fixed lens 2512a.

Let us assume that moveable mirrors 2506a to 2506c are in an uncontrolled condition. In this optical switch 2501, moveable mirrors 2506a to 2506c are arranged in matrix fashion on substrate 2508. When moveable mirrors 2506a to 2506c are in an uncontrolled condition, the reflecting faces of moveable mirrors 2506a to 2506c are parallel with respect to the flat surface of substrate 2508 (fixed face of the moveable mirror).

The light from optical fibers 2514a to 2514c is deflected by fixed lenses 2512a to 2512c, reflected by moveable mirrors 2506a to 2506c in uncontrolled condition, reflected by fixed reflecting mirror 2502, and again directed to moveable mirrors 2506a to 2506c. At this juncture, the optical flux directed towards moveable mirrors 2506a to 2506c are reflected at fixed reflecting mirror 2502 is adjusted in deflection angle at fixed lenses 2512a to 2512c such that it is directed towards the moveable mirror 2506b positioned in the middle of the mirror array of substrate 2508.

In contrast, the light emitted from optical fiber 2514b provided at a central port passes through the center of the central fixed lens 2512b and is thus directed towards the central mirror 2506b. In this case, there is no need to deflect the light at the fixed lens 2512b, so the reflected light from fixed reflecting mirror 2502 is returned to the central mirror 2506b.

In the optical switch 2501 of the construction described above, moveable mirrors are arranged in a number of $N^{1/2}$ on one side, in a matrix arrangement of number N in a plane on substrate 2508. Thus, applying consideration to this with reference to the optical switch arrangement illustrated in FIG. 1 or FIG. 26, the necessary angle of deflection at the i-th lens 2512 from the middle is:

$$(2i/N^{1/2})Ls/(2L)=iA\phi/L \quad (40)$$

Where ø is the diameter of a moveable mirror of 2506, and A is constant.

It should be noted that, as shown in FIG. 25(B), this optical switch 2501 has a construction in which the input side switching element and output side switching element are common. Distance L is therefore the distance between the input/output side switching element 2500 and the fixed reflecting mirror 2502.

The amount of offset of the lens position with respect to the optical flux is therefore $g=iA\phi f_{25}/L$ and the maximum amount of offset is $N^{1/2}A\phi f_{25}/(2L)$. Taking the maximum deflection angle as being θm, this may be expressed as $N^{1/2}A\phi/(2L)$ so the maximum offset amount is $g=f_{25}\theta m$.

In the lenses that are normally used in an optical switch, θm is of the order of 6° and $f_{25}=1$ mm, so g=100 μm is obtained. This can be said to be a realistic value, smaller than the value of ø=300 μm that is generally used.

In the optical switch 2501 of this construction, the light from the input/output ports is all directed towards moveable mirror 2506b in the middle of the matrix of the moveable mirrors 2506a to 2506c arranged in matrix fashion on substrate 2508. Consequently, when deflection is performed towards moveable mirror 2506a or 2506c corresponding to the ports at the periphery of the matrix, of the plurality of input/output ports arranged in matrix fashion, this deflection can be performed by swinging the angle of deflection of moveable mirror 2506a or 2506c to the left and right from the uncontrolled condition.

Figure 36A:
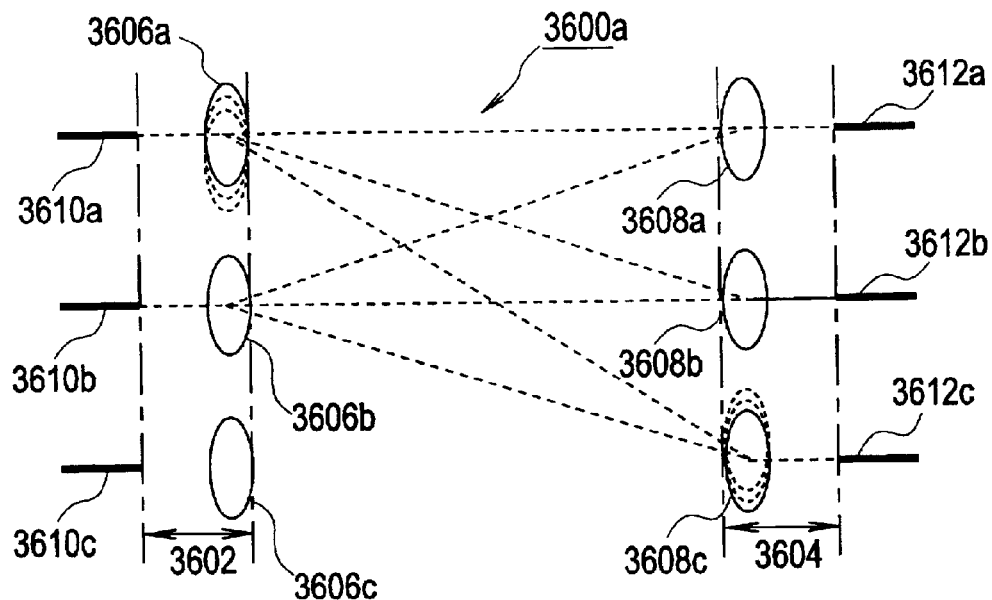
FIG. 36(A) is a view given in explanation of the operation in an optical switch prior to effecting an improvement according to the eighth embodiment.
Figure 36B:
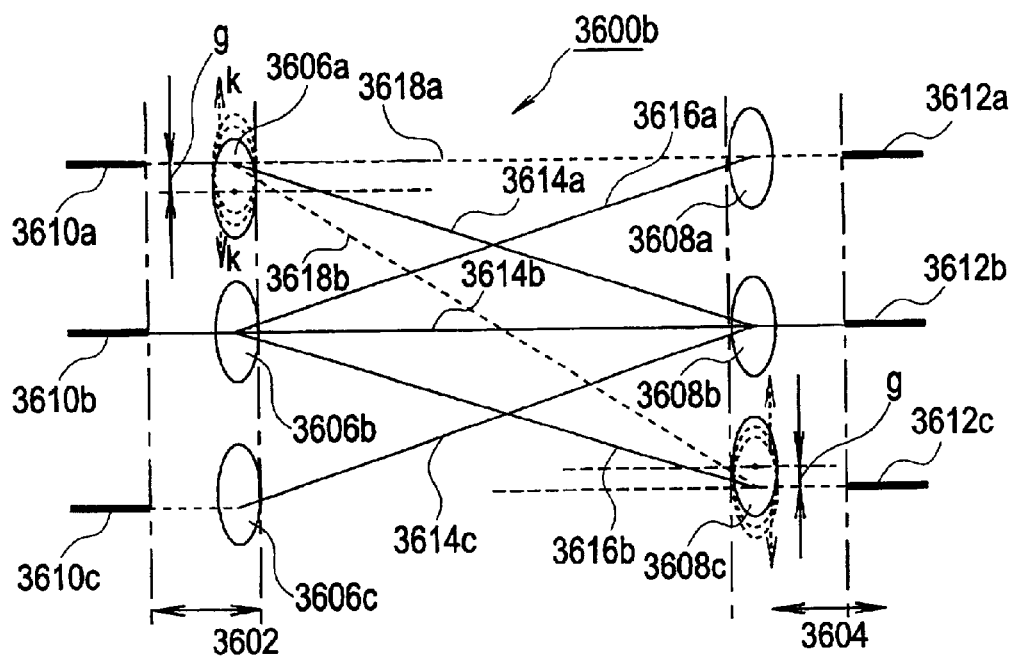
FIG. 36(B) is a view given in explanation of the operation of the eighth embodiment of a construction using a moveable lens as an optical deflection element.

In FIG. 36(B), another practical example of this eighth embodiment and in FIG. 36(A), an optical switch is illustrated having an arrangement prior to the addition of the improvement in the eighth embodiment.

The basic construction of these optical switches is the same as that illustrated in FIG. 25(B), so duplicated description of identical structure is omitted.

Also, in the optical switch 3600a prior to effecting the improvement in the eighth embodiment, the dotted lines linking the various sections shown in FIG. 36(A) indicate diagrammatically the shape of the ray bundles for describing the operation of the various sections.

Likewise also the straight lines 3614a to 3614c and 3616a, 3616b, and dotted lines 3618a, 3618b linking the various sections shown in FIG. 36(B) indicate diagrammatically the central optical paths of the ray bundles for describing the operation of the various sections of this optical switch 3600b according to the eighth embodiment.

In these optical switches 3600a and 3600b, the input side lens system and output side lens system are constituted of at least two moveable lenses 3606a to 3606c and 3608a to 3608c of different focal point distance.

The input side moveable lenses 3606a to 3606c are capable of movement in a plane perpendicular to the input direction of the optical signal and the output side moveable lenses 3608a to 3608c are capable of movement in a plane perpendicular to the output direction of the optical signal.

In these optical switches 3600a and 3600b, the input side switching element 3602 and the output side switching element 3604 are of the same construction.

However, in the optical switch 3600a shown in FIG. 36(A), the central axes of the moveable lenses 3606a and 3608b in the uncontrolled condition are on the lines of extension of the optical fibers provided corresponding thereto.

In FIG. 36(A), referring to moveable lenses 3606a and 3608c, the conditions illustrated by the solid lines indicate the moveable lenses in uncontrolled condition. Also, in an optical switch according to the present invention as illustrated in FIG. 1, of the input ports or output ports that are arranged in matrix fashion on the substrate, moveable lenses 3606a and 3608c are positioned within the ports arranged at the periphery of the substrate. The same applies to FIG. 36(B).

Also, in the optical switch 3600b illustrated in FIG. 36(B), the improvement is effected that the central axes of the moveable lenses 3606a and 3608c in the uncontrolled condition are arranged offset by an amount g from the lines of extension of optical fibers 3610a and 3612c, depending on the position of the input or output port.

The amount of the offset is the same as the amount of offset already described in regard to the optical switch of FIG. 25(B). In this way, the optical flux of the light issuing from the terminal face of input side optical fiber 3610a that is connected with the input port is directed towards optical fiber 3612b arranged at the central input port when moveable lenses 3606a to 3606c and 3608a to 3608c are in the uncontrolled condition.

This action is the same in the case of the optical flux emitted from output side optical fiber 3612c connected with the output port and passing through moveable lens 3608c arranged corresponding to this optical fiber 3612c.

Also, in FIG. 36(B), referring to the moveable lens 3606a arranged at a peripheral port of the input ports arranged in matrix fashion, this lens 3606a can be offset in the direction of the arrow k in the Figure i.e. in this case in the vertical direction in the Figure, as indicated by the lens shapes shown by dotted lines. In this way, by movement of this moveable lens 3606a, the central optical path of the ray bundles 3618a, 3618b can be directed towards the desired moveable lens 3608a or 3608c. In this way, by offsetting moveable lens 3606a in the vertical direction from the position in the uncontrolled condition, the beam from the input side optical fiber 3610a and hence the beam passing through the moveable lens 3606a can be swung in the vertical direction.

Figure 37:
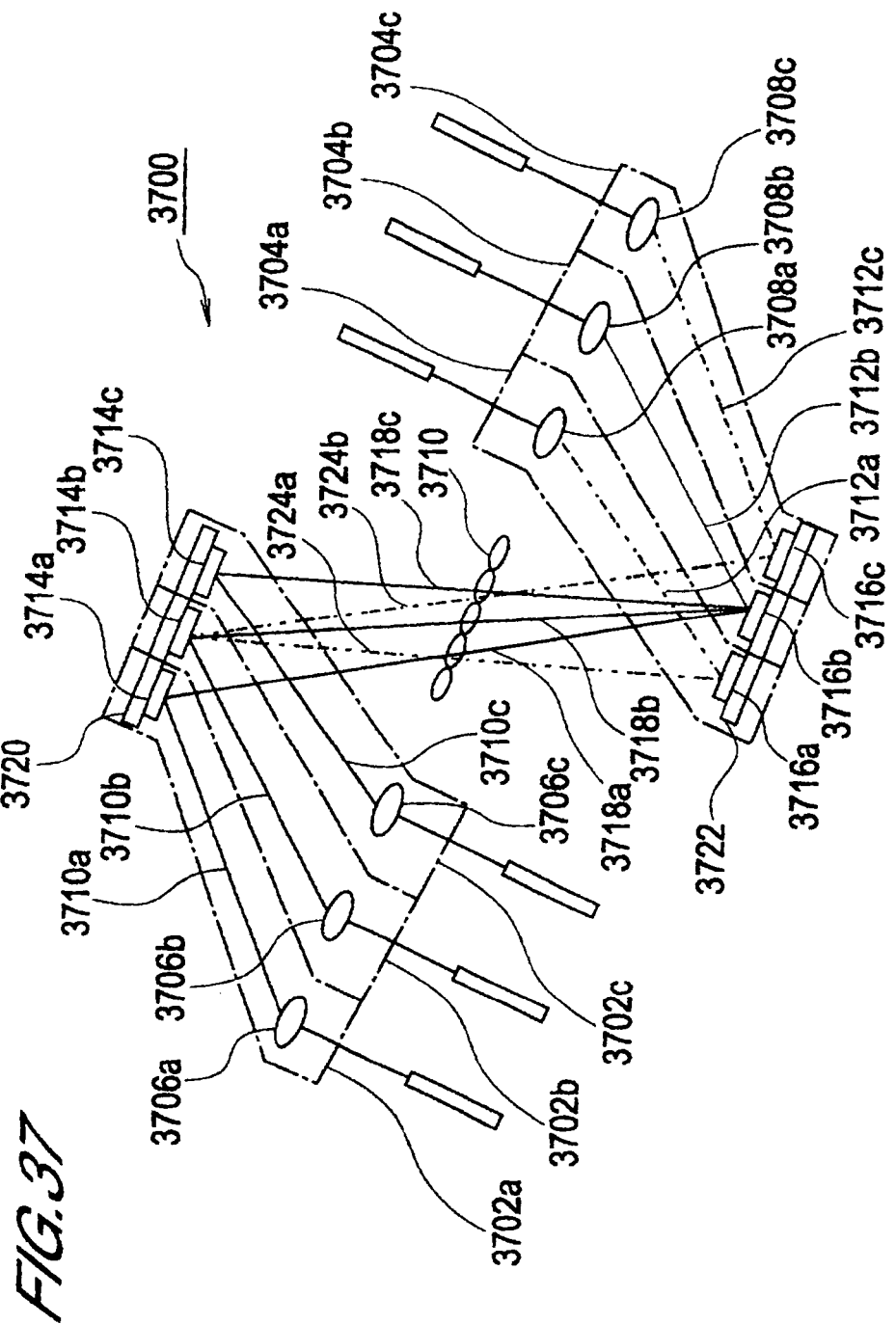
FIG. 37 is a view, given in explanation of the operation of the eighth embodiment, of a construction using a relay lens as an optical element.

Next, FIG. 37 is a view showing another constructional example of this eighth embodiment. The basic structure of this optical switch 3700 is practically identical with the construction described in the fifth embodiment. Accordingly, duplicated description of identical structure will be omitted.

Also, the straight lines 3710a to 3710c, 3718a to 3718c, 3712b and single dotted chain lines 3724a, 3724b, 3712a, 3712c linking the various sections illustrate diagrammatically the central optical paths of the ray bundles in each section, in order to describe the operation of this optical switch 3700.

The input and output ports 3702a to 3702c and 3704a to 3704c are arranged in more separated fashion than normally between the respective ports and furthermore are arranged such that the angles of deflection are different at fixed lenses 3706a to 3706c and 3708a to 3708c in the input side and output side lens systems, for each port. Lenses 3706a to 3706c and 3708a to 3708c may be constituted by respectively moveable lenses.

In this construction, the beams 3710a to 3710c that have respectively passed through the input side fixed lenses 3706a to 3706c and that are respectively emitted from optical fibers 3702a to 3702c are deflected as shown by the beams 3718a to 3718c by moveable mirrors 3714a to 3714c. In this case, the respective moveable mirrors 3714a to 3714c are controlled such that these deflected beams 3718a to 3718c are directed to moveable mirror 3716b positioned in the middle of substrate 3722.

Also, the light that is reflected by moveable mirror 3714b positioned in the middle of substrate 3720, of the moveable mirrors 3714a to 3714c arranged in each input side lens system, is directed towards any one of the moveable mirrors of the moveable mirrors 3716a to 3716c arranged on substrate 3722. Thus, it is directed to any one of the ports of the output ports 3704a to 3704c, as indicated by beams 3712a to 3712c, its deflection being controlled by these moveable mirrors 3716a to 3716c.

In this way, in this optical switch 3700, the range of values of the angle of deflection that can be taken when the light is emitted is the same for all the input ports 3702a to 3702c.

Also, fixed lenses 3706a to 3706c and 3708a to 3708c can be substituted by holograms having a deflecting action.

A modified example of the lens systems in this eighth embodiment will now be described. In the construction of this modified example, a single convex lens is introduced into the input side and output side lens systems.

In the eighth embodiment, a fixed deflection action is realized by offsetting the central position of the fixed lens (or moveable lens) provided in the input side and output side switching elements with respect to the optical flux. However, in this modified example, this action can be realized by using a convex lens.

Figure 38:
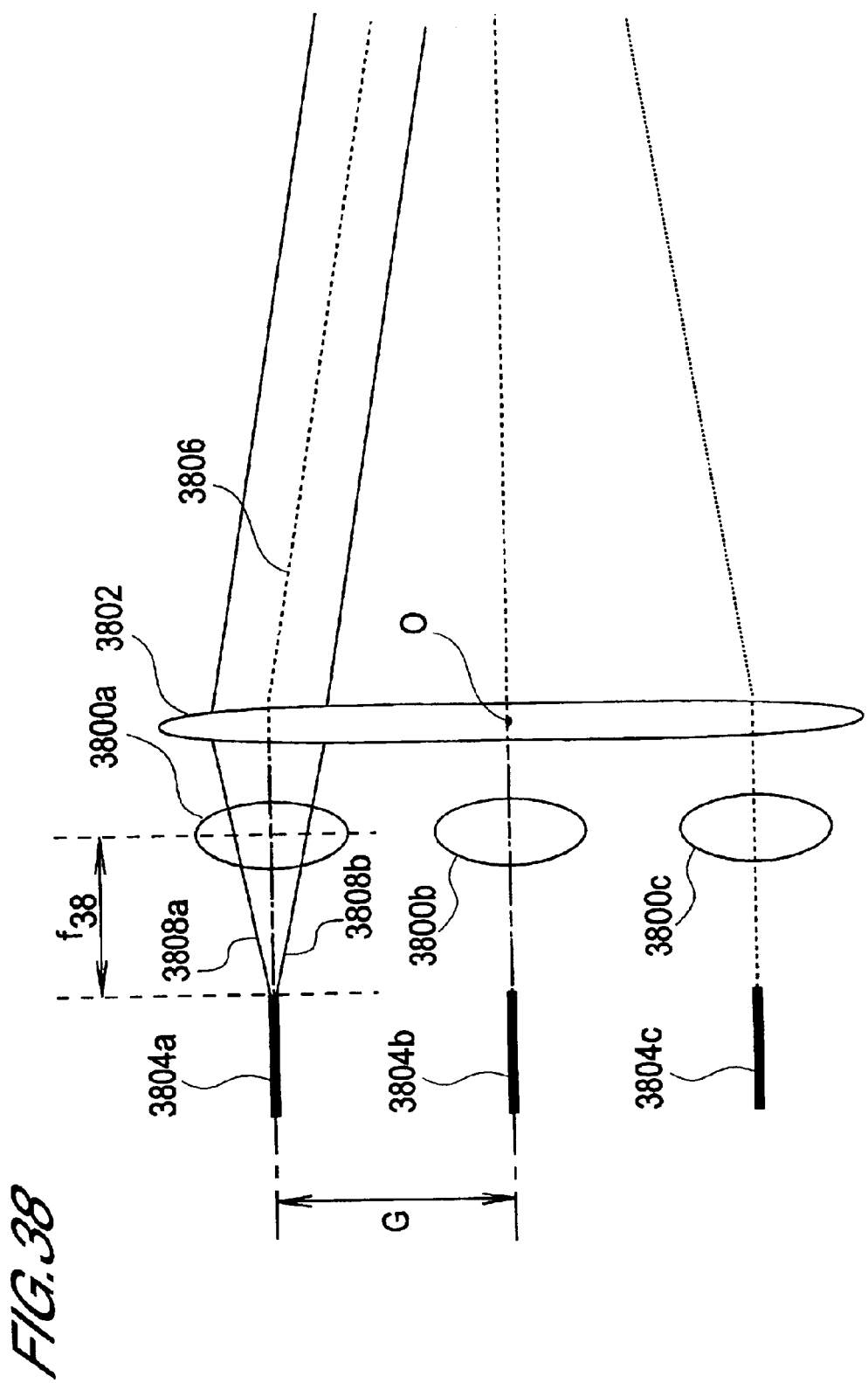
FIG. 38 is a view illustrating the operation of a lens system in the case where a convex lens is inserted according to the eighth embodiment.

The general arrangement of this convex lens as shown in FIG. 38. In this Figure, 3804a to 3804c indicate optical fibers provided at each port. Also, moveable lenses 3800a to 3800c are arranged respectively corresponding to these respective ports. It should be noted that fixed lenses could also be employed for these lenses 3800a to 3800c.

Convex lens 3802 is arranged to the rear of moveable lenses 3800a to 3800c such that the optical flux emitted from these moveable lenses can pass therethrough.

The straight lines and dotted lines linking the various sections indicate diagrammatically the shape of the optical flux, in order to describe the operation of these sections.

Central optical path 3806 of the ray bundles indicates a group of rays directed towards a center by the focusing action of the focusing convex lens 3802. Taking the position of each optical fiber based on the single dotted chain lines passing through the center point O of convex lens 3802 as G and taking the focal point distance of the convex lens 3802 as $F_{38}$, this angle is expressed by $G/F_{38}$.

Specifically, convex lens 3802 is arranged as follows. Referring for example to the input side switching element in FIG. 37, this convex lens 3802 is provided between moveable lenses 3706a to 3706c and moveable mirrors 3714a to 3714c. In the construction of this modified example, moveable mirrors 3714a to 3714c are arranged such that their distance from convex lens 3802 is equal to the focal point distance $F_{38}$ of the convex lens 3802.

In FIG. 38, the beams 3808a, 3808b issuing from optical fiber 3804a are focused by both moveable lens 3800a and convex lens 3802. For all of moveable lenses 3800a to 3800c, lenses whose physical properties are identical are employed. Consequently, the focal point distances of these moveable lenses 3800a to 3800c are the same. If this focal point distance is taken to be $f_{38}$, the combined focal point distance of moveable lenses 3800a to 3800c and convex lens 3802 is $f_{38}F_{38}/(f_{38}+F_{38})$.

In order to make the optical flux that has passed through moveable lenses 3800a to 3800c and then passed through convex lens 3802 become parallel light, the distance between the center of the compound lenses of moveable lenses 3800a to 3800c and convex lens 3802 and the optical fibers 3804a to 3804c are made equal to this combined focal point distance. If $F_{38} \gg f_{38}$, the combined focal point distance becomes practically equal to $f_{38}$.

[Ninth Embodiment]

Figure 39:
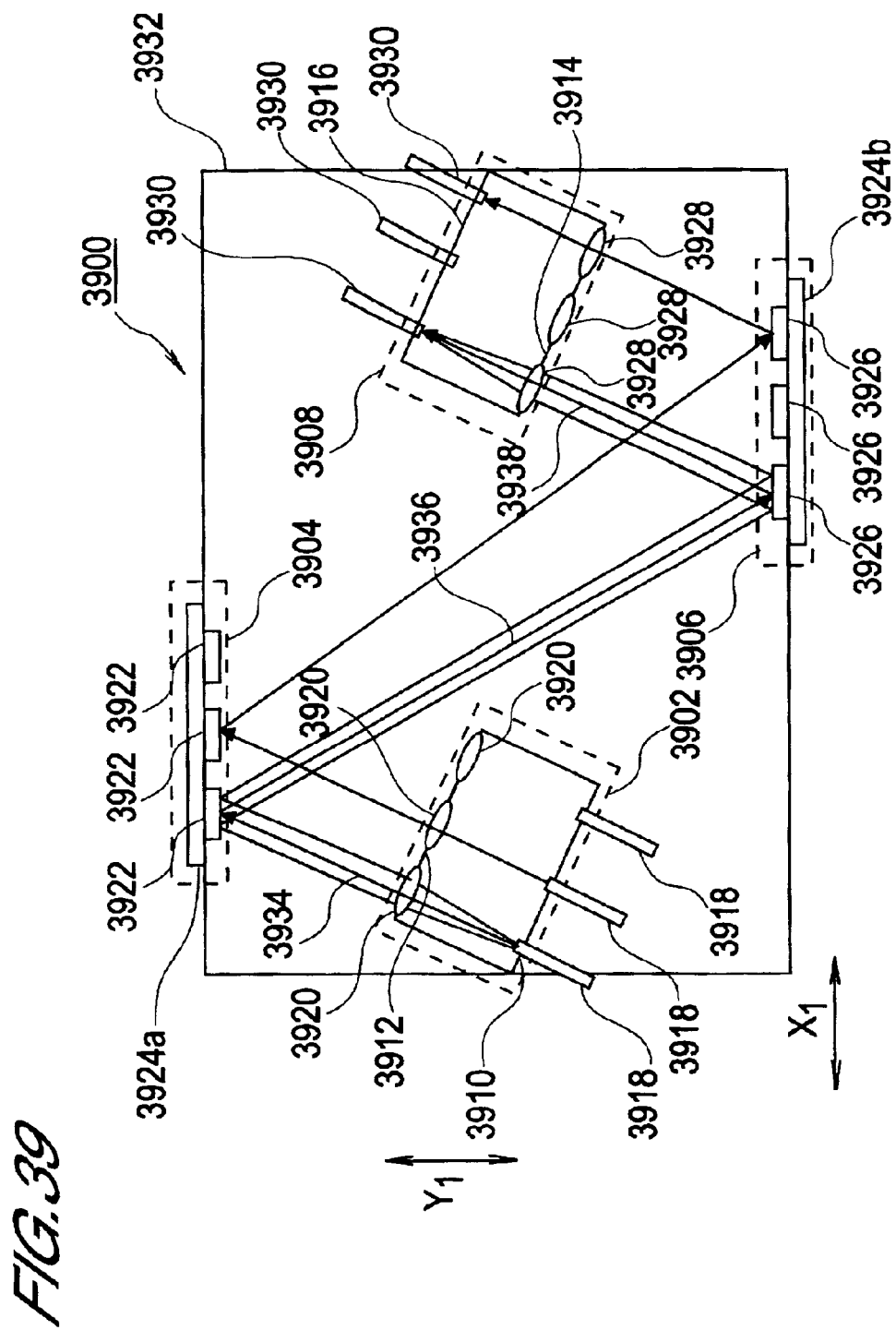
FIG. 39 is a view illustrating an example construction of an optical switch according to a ninth embodiment.

FIG. 39 shows a ninth embodiment of this invention. This optical switch 3900 comprises an input side switching element having a plurality of optical input ports and an output side switching element having a plurality of optical output ports, so that an optical signal that is input to any one of the optical input ports can be output from any one of the optical output ports.

The input side switching element comprises first and second optical units 3902, 3904 and the output side switching element comprises third and fourth optical units 3906, 3908.

First optical unit 3902 comprises a plurality of pairs consisting of combinations of an input side light guide 3918 and an incoming side lens system 3920 that focuses optical signals from the input side light guide 3918, respectively corresponding to the optical input ports.

Also, second optical units 3904 are provided corresponding with these lens systems. Also, they comprise a plurality of first moveable mirrors 3922 that reflect optical signals from these lens systems.

Also, third optical units 3906 comprise a plurality of second moveable mirrors 3926 that reflect optical signals from first moveable mirrors 3922 of second optical unit 3904 individually.

Fourth optical units 3908 comprise a plurality of pairs consisting of combinations of an emission side lens system 3928 that focuses optical signals from second moveable mirrors 3926 and output side waveguide 3930 into which is launched an optical signal from this lens system, respectively corresponding to the optical output ports.

These first, second, third, and fourth optical units 3902 to 3908 are preferably provided on a common substrate 3932.

Also, in optical switch 3900 of this embodiment, in the first optical unit 3902, input side light guide 3918 is fixed to first substrate 3910 and likewise incoming side lens system 3920 is fixed to second substrate 3912 and in the fourth optical unit 3908 the incoming side lens system 3928 is fixed to third substrate 3914 and likewise the output side light guide 3930 is fixed to fourth substrate 3916.

In this optical switch, the first to fourth substrates 3910 to 3916 are preferably of thermal expansion coefficient smaller than the first substrate or are the same substrate.

Also, as another suitable example, first substrate to fourth substrate 3910 to 3916 are of thermal expansion coefficient smaller than or the same as common substrate 3932.

Preferably, specific values of the thermal expansion coefficient in this ninth embodiment of the order of $10^{-7}$ or less.

The operation of the various sections in this optical switch 3900 will now be described. In order to describe the operation of this optical switch 3900, the shape of the optical flux is diagrammatically indicated as straight lines and arrows 3934 to 3938 joining the various sections in FIG. 39. Also, as shown in FIG. 39, the transverse direction of common substrate 3932 will be designated as $X_1$ and its length direction as $Y_1$.

In this optical switch 3900, optical signals are output from the terminal faces of the optical fibers constituting the input side light guides 3918 provided at the input ports. These optical signals, as indicated by arrows 3934 shown in FIG. 39, are directed in the form of beams onto moveable lenses 3920 provided on second substrate 3912, where they are collimated, and directed in the direction of first moveable mirrors 3922 provided on substrate 3924a.

The light beams are then directed as shown by arrows 3936 onto the desired second moveable mirror 3926 arranged on substrate 3924b, by controlling the angle of incidence and angle of reflection of the mirror surface of the beam at this first moveable mirror 3922 i.e. the inclination with respect to the surface of substrate 3924a.

The same action is then performed also in regard to second moveable mirror 3926. Specifically, the light beams are directed as shown by arrows 3938 in the direction of the desired output port corresponding thereto, by controlling the angle of incidence and angle of reflection of the beam at this second moveable mirror 3926 i.e. the inclination of the mirror surface with respect to the surface of substrate 3924b.

Figure 40:
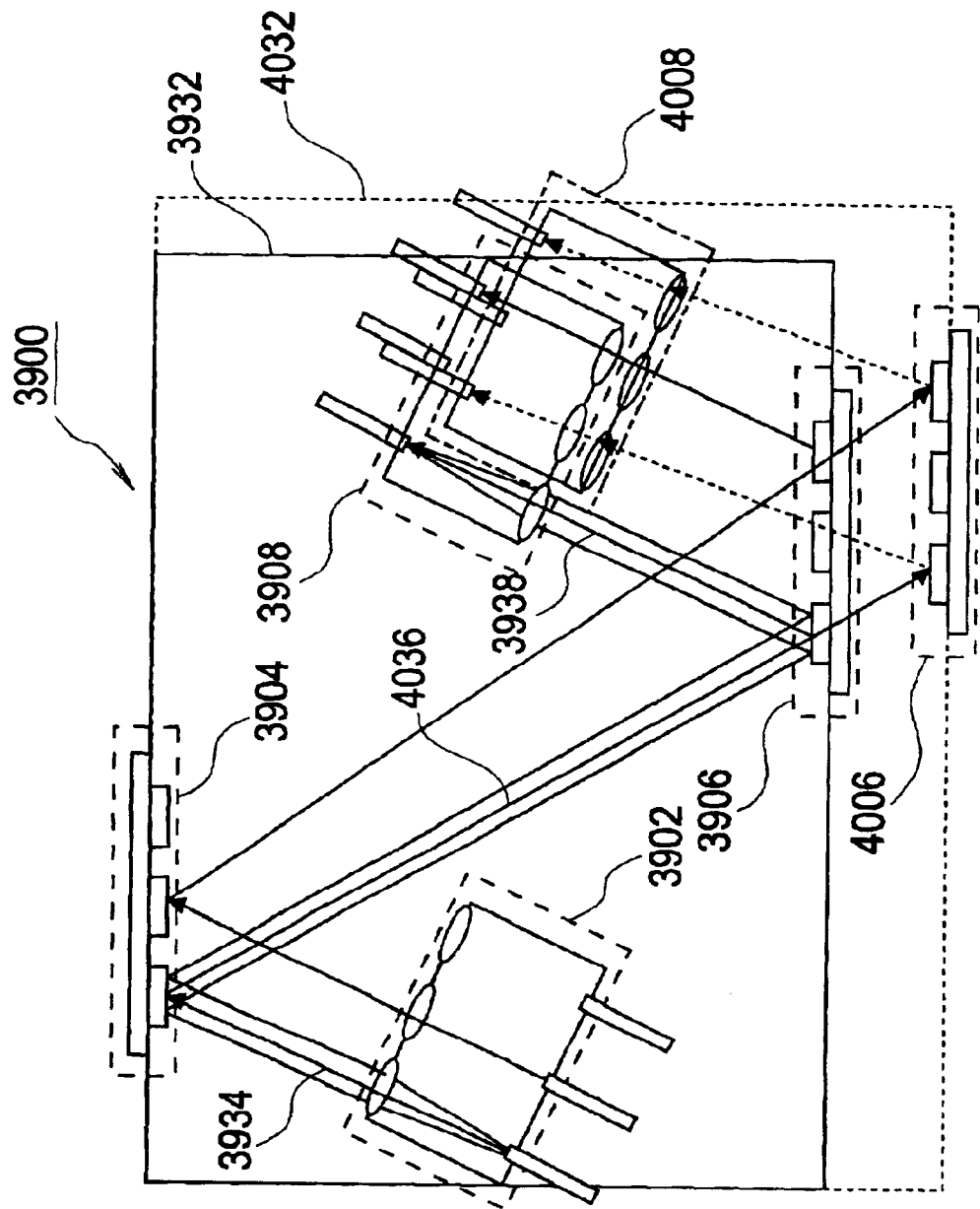
FIG. 40 is a view illustrating the optical switch operation of the ninth embodiment.

Assuming now that expansion of common substrate 3932 has taken place due to temperature fluctuation, the action in this case will be described with reference to FIG. 40. FIG. 40 is a view illustrating an example of the operation of an optical switch according to the ninth embodiment; this optical switch is of the same construction as described in FIG. 39, so duplicated description of identical structure will be omitted.

The expanded common substrate at this point is indicated by the dotted line frame 4032 in the Figure. The positions of the third optical unit and fourth optical unit with reference to the first and second optical units 3902, 3904 on the input side switching element prior to expansion are offset respectively as 4006, 4008.

In the arrangement shown in FIG. 39, first optical unit 3902 and third optical unit 3906 expand in the same way as common substrate 3932. However, if the thermal expansion coefficients of first substrate 3910 and second substrate 3912 are the same and the thermal expansion coefficients of third substrate 3914 and fourth substrate 3916 are the same, although offset of the position of incidence of the beam onto the first moveable mirror 3922 provided in second optical unit 3904 is produced, the angle of incidence does not fluctuate. There is no change in the propagation angle of the light beam, since there is little temperature fluctuation of the angle of inclination of the mirror surface of this first moveable mirror 3922 with respect to the surface of substrate 3924a. Also in regard to the second moveable mirror 3926 provided in the third optical unit 3906, only the position of incidence of the beam fluctuates; there is no fluctuation of the angle of incidence. In regard to this second moveable mirror 3926, since there is little change with temperature of the angle of inclination of this mirror surface with respect to substrate 3924b, although the position of incidence onto the second moveable mirror 3926 fluctuates, there is no fluctuation of the angle of incidence.

Figure 41A:
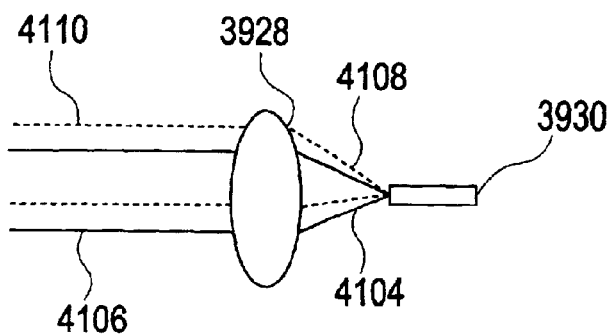
FIG. 41(A) is a view illustrating an example of the operation of an output side switching element according to the ninth embodiment.

Next, the effect of fluctuation of position of incidence onto the moveable lens 3928 provided in the output side switching element and constituting the output side lens system in this optical switch 3900 illustrated in FIG. 39 is shown using FIG. 41(A).

The solid lines 4104, 4106 and dotted lines 4108, 4110 in FIG. 41(A) show diagrammatically the shape of the optical flux.

The parallel light beam 4106 shown by the solid lines is focused by moveable lens 3928 onto the terminal face of output side light guide 3930 constituted by an optical fiber provided on fourth substrate 3916.

Let us assume that, due to thermal expansion of common substrate 3932 described using FIG. 40, the light beam 4106 to moveable lens 3928 is shifted as indicated by light beam 4110 so that it is incident onto the optical fiber constituting output side light guide 3930.

Due to the properties of moveable lens 3928, in this condition, as shown by the light beam 4108 indicated by the dotted line, the angle of incidence of the beam onto the optical fiber 3930 fluctuates from the angle of incidence of the light of light beam 4104 indicated by the solid line.

Typically, for an optical power fluctuation of no more than 0.5 dB in the case of a single mode optical fiber, a fluctuation of angle of incidence up to 1.5° is allowed.

Since the amount of beam position offset is of the order of a few tens of microns in the range of temperature change of 100° C. required by the conditions of use, if a moveable lens 3928 of focal point distance 1 to 2 mm is employed, the loss fluctuation can be kept within the allowed range. This focal point distance corresponds to the lens focal point distance which is usually employed.

In order to reduce the change of input angle with temperature variation, a lens of long focal point distance is desirable, but, in order to keep focal point positional offset produced by angular error of the moveable mirror to a low level, a lens of short focal point distance should be employed. There can therefore exist an optimum length of the focal point distance of the lens. Fluctuation of angle of incidence due to temperature change does not occur if the structural materials all have the same coefficient of expansion. In this case, the focal point distance should preferably be as short as possible.

Figure 41B:
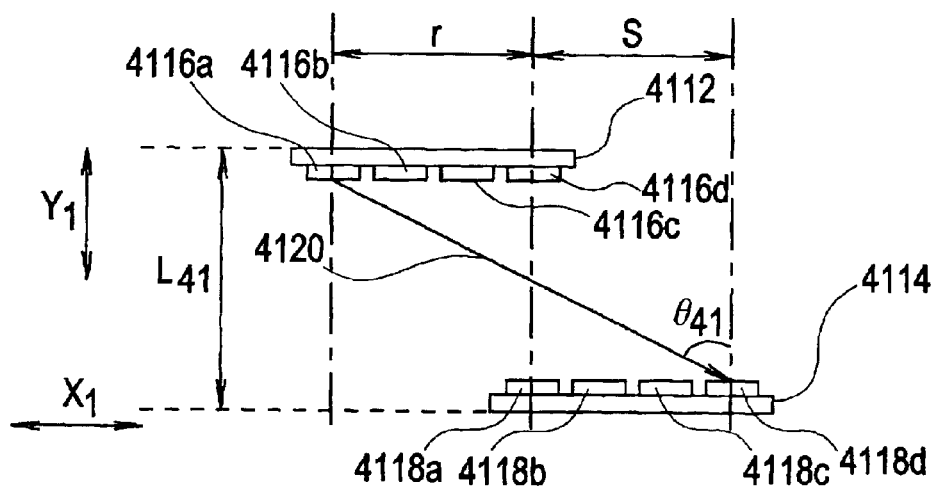
FIG. 41(B) is a view illustrating an example of the operation of a first moveable mirror and second moveable mirror according to the ninth embodiment.

Referring to FIG. 41(B), in optical switch 3900 of the ninth embodiment as shown in FIG. 39, the operation will be described referring to the portion including the first moveable mirror 3922 provided on substrate 3924a and the second moveable mirror 3926 provided on substrate 3924b.

In FIG. 41(B), the following arrangement was assumed in order to describe this in more detail. Specifically, in the optical switch shown in FIG. 39, first moveable mirrors 4116a to 4116d are provided on substrate 4112 arranged in second optical unit 3904 and second moveable mirrors 4118a to 4118d are provided on substrate 4114 arranged in third optical unit 3906. Substrate 4114 is arranged at a position separated by a distance $L_{41}$ in the perpendicular direction of substrate 4112.

Let us now further refer to one i.e. in this case moveable mirror 4116a of the moveable mirrors 4116a to 4116d in the second optical unit. The arrow 4120 linking moveable mirror 4116a and 4118d indicates the central optical path of the reflected ray bundle incident on moveable mirror 4116a and is shown such that it is incident on output side moveable mirror 4118d.

The positional offset on moveable mirror 4118d in respect of the central optical path 4120 of the ray bundle produced by thermal expansion of common substrate 3932 as described above in FIG. 40 may thereby be calculated. At this point, it will be assumed that the angle of incidence θ41 of this ray bundle 4120 onto moveable mirror 4118d is fixed and that this is a minute quantity. Furthermore, let the coefficient of thermal expansion of common substrate 3932 in the $X_1$ direction be α1, its coefficient of thermal expansion in the $Y_1$ direction be α1', and the coefficient of thermal expansion of substrates 4112 and 4114 be β.

Let us now consider the position of moveable mirror 4116a on substrate 4114 and substrate 4112. This position is represented as the total value of the following two types of relative position.

Specifically, let us consider the position of moveable mirror 4118d on substrate 4114 and the relative position of substrate 4112 with respect to substrate 4114.

As shown in FIG. 41(B), the relative position of moveable mirror 4116d on substrate 4114 with respect to moveable mirror 4118a may be taken as the distance S of the moveable mirror 4118a and moveable mirror 4118d on substrate 4114.

Also, as shown in FIG. 41(B), the relative position of moveable mirror 4116a on substrate 4112 with respect to substrate 4114 may be taken as the horizontal distance r in the $X_1$ direction of moveable mirror 4116a and moveable mirror 4118a which is present at a position symmetric with respect to moveable mirror 4116a on substrate 4114.

Accordingly, using these numerical values, the position of moveable mirror 4118d with respect to moveable mirror 4116a on substrate 4112 and substrate 4114 is r+S. Using this value, the angle of incidence is then expressed by θ=(r+S)/$L_{41}$. As a result, in the condition prior to occurrence of thermal expansion as described in FIG. 40, the position of incidence of the central optical path 4120 of the ray bundle on moveable mirror 4118d is originally θ$L_{41}$.

Let us now assume that thermal expansion has occurred in the interior of the optical switch 3900 of FIG. 39 i.e. in FIG. 41(B).

In this case, the position of incidence of the central optical path 4120 of the ray bundle in FIG. 41(B) on moveable mirror 4118d becomes θ$_{41}$α1'L. That is, the theoretical position of incidence of the central optical path 4120 of the ray bundle on the output side moveable mirror 4118d is α1'(r+S).

However, in fact, the thermal expansion coefficient has respectively different values in the $X_1$ direction, $Y_1$ direction on common substrate 3932 in FIG. 39, on substrate 3924a (i.e. substrate 4112 in FIG. 41(B)) and on substrate 3924b (i.e. substrate 4114 in FIG. 41(B)). That is, the position of incidence of the central optical path 4120 of the ray bundle on moveable mirror 4118d is α1r+βS.

Finding the difference of these, {(α1−α1')r+(β−α1')S}. This implies a relative beam shift.

In the optical switch 3900 of the construction shown in FIG. 39, the maximum values of r and S are both set to a magnitude of a few cm.

Thus, in FIG. 39 if we assume that substrates 3924a, 3924b are silicon (Si) (β−1=3×10$^{-6}$/° C.), and common substrate 3932 is iron (Fe) (α'−1=11×10$^{-6}$/° C.), when the relative beam shift for a temperature change of 100° C. is found, this is of the order of a few 10 μm.

Further, if, for common substrate 3932, a material of small thermal expansion such as nickel steel (64Fe36Ni) (($\alpha'-1$= $0.1\times 10^{-6}/°$ C.) or carbon i.e. material of $(\alpha'-1)=10^{-7}$ or less is employed, the relative beam shift can be reduced to half of this or below.

[Tenth Embodiment]

Next, an optical switch device for controlling the operation of an optical switch according to the present invention will be described using FIG. 43.

This optical switch device 4300 comprises an optical switch 4304 having a moveable section of 4302 for switching, a monitor section 4306 that monitors the emitted light from optical switch 4304, and an operation control section 4308 for adjusting the control condition of switching of optical switch 4304 by controlling moveable section 4302 for switching in response to a monitor signal from monitor section 4306.

This optical switch device 4300 comprises a first optical switch 4310 and a second optical switch 4312. Moveable section 4302 for switching comprises first optical signal introduction means 4314 and second optical signal introduction means 4316 mutually of the same construction for inputting optical signals to first and second optical switches 4310, 4312 which are of completely identical construction; monitor section 4306 comprises first optical signal output means 4318 and second optical signal output means 4320 which are mutually of the same construction.

First and second optical signal introduction means 4314, 4316 comprise a signal output source 4322 for monitoring and a signal synthesizing section 4324. Signal synthesizing section 4324 combines the monitoring signal that is output from monitoring signal output source 4322 and an optical signal that is input to this optical switch device 4300 from outside into a single synthesized signal, which it inputs to first and second optical switches 4310, 4312. In this case, an input side coupler is employed as signal synthesis section 4324. Also, a plurality of input side light guides 4330 constituted by a plurality of optical fibers are connected to this input side coupler.

Also, first and second optical signal output means 4318, 4320 comprise an optical signal distribution section 4326 and monitor 4328; optical signal distribution section 4326 distributes and outputs to outside monitor 4328 and optical switch device 4300 the optical signals that are output from optical switch 4304. In this case, an output side coupler is employed as optical signal distribution section 4326. A plurality of output side light guides 4332 constituted by optical fibers are connected to this output side coupler so that optical signals are output to the outside of the optical switch device 4300 from these optical fibers.

Furthermore, with this optical switch device 4300, the first and second optical signal output means 4318, 4320 are provided with filters whereby from the synthesized signal that is output from optical signal distributing section 4326 only the optical signal is extracted and output to outside optical switch device 4300. The operation of monitoring signal output source 4322 is controlled by operation control section 4308.

Preferably, apart from being employed for standby use, second optical switch 4312 is also employed for multicasting optical signals from switching moveable section 4302 to the first and second optical signal output means 4318, 4320.

Next, the operation of this optical switch device 4300 will be described.

The optical signals that are output from each of the input side light guides 4330 are combined with signals for monitoring purposes that are output from monitoring signal output source 4322 in input side coupler 4324 to produce a synthesized signal. The monitoring signals are signals constituting sign posts corresponding to the port numbers of the optical switch 4304. Port identification can be performed by changing the code, frequency, or wavelength of these monitoring signals.

The synthesized signal that is output from input side coupler 4324 is distributed and input to the first and second optical switches 4310, 4312. The first and second optical switches 4310 and 4312 perform circuit switching. The respective synthesized signals that are output from the first and second optical switches 4310 and 4312 are merged in the output side coupler 4326 and fed to output side light guide 4332.

The output side coupler 4326 thereupon distributes the synthesized signal to output side light guide 4332 and monitor 4328. Preferably, the construction is such that a filter is provided between output side coupler 4326 and output side light guide 4332 so that the monitoring signal is not output to outside optical switch device 4300 and only the optical signal is isolated. In this case, isolation can easily be achieved by employing different frequencies for the optical signal and the monitoring signal.

The monitoring signal is fed to monitor 4328. Monitor 4328 extracts the necessary information from the monitoring signal.

In this optical switch device 4300, the input side light guide 4330 will be called the input port and the output side light guide 4332 will be called the output port.

Using a port identification signal in the monitoring signal, monitor 4328 monitors from which input port 4330 each optical signal arrived. Apart from this, the control condition of the optical switch, such as for example optic axis position information obtained by monitoring the optical power is monitored.

The information of the monitoring signal is sent to a control circuit provided in the operation control section 4308. The condition of optical switch 4304 is held in optimum condition by means of this operation control section 4308. It is also a role of the control circuit provided in operation control section 4308 to detect whether or not connection has been effected to the correct port on switching.

It should be noted that, in the above description, an example was described in which the monitoring signal and optical signal were synthesized by the provision of a monitoring signal output source 4322. However, it is not necessarily essential to provide a monitoring signal output source 4322 in this optical switch device 4300. In this case, no monitoring signal is output in the first and second optical signal introduction means and only the optical signal is input to the first and second optical switches. Thus only monitoring of the optical signal is performed by the monitor 4328. Consequently, in this case, the optical signal output means 4318 and 4320 do not need to be provided with filters for separating the optical signal.

Also, the first and second optical switches 4310, 4312 employed in this optical switch device 4300 are not restricted to the optical switch construction of the present invention. The operation of a switch such as the conventional optical switch 4400 shown in FIG. 44 can therefore be controlled using this optical switch device.

In respect of the optical switch 4400 shown in FIG. 44, a method of detecting the control condition of this optical switch 4400 is described with reference to FIG. 43 and FIG. 42, using the optical switch device 4300 of FIG. 43.

Figure 42:
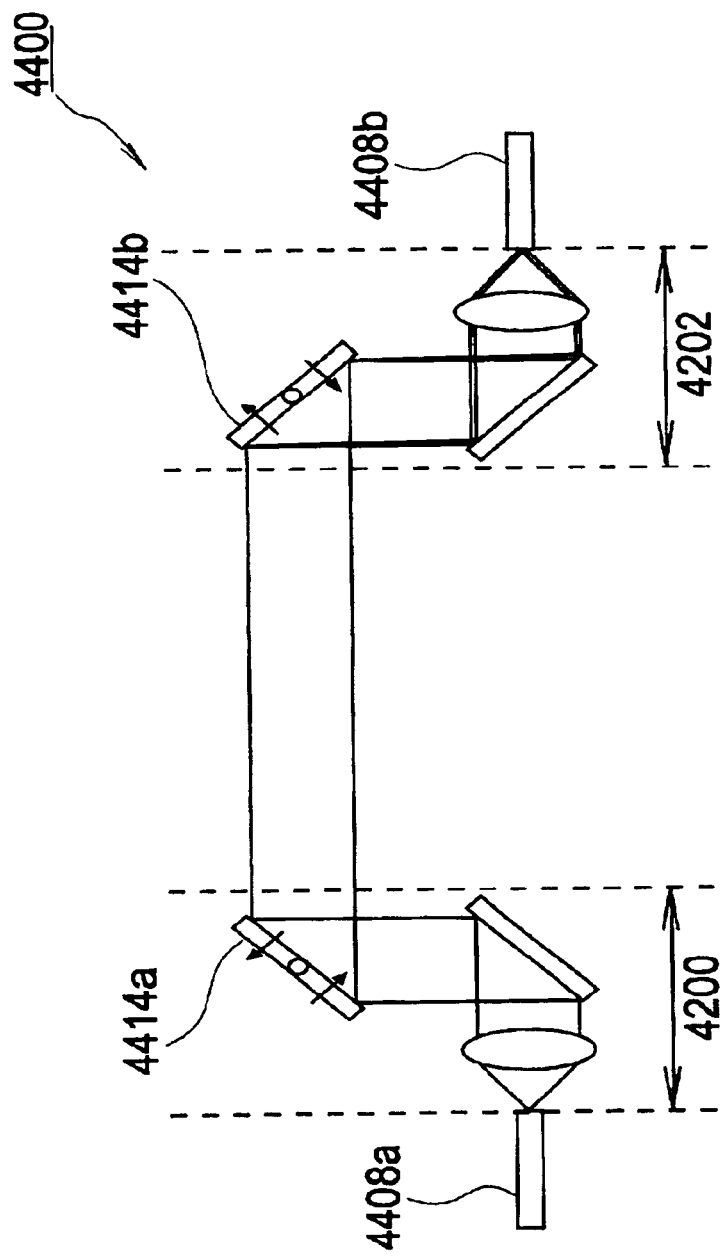
FIG. 42 is a view illustrating an example of the operation of a tenth embodiment.
Figure 44A:
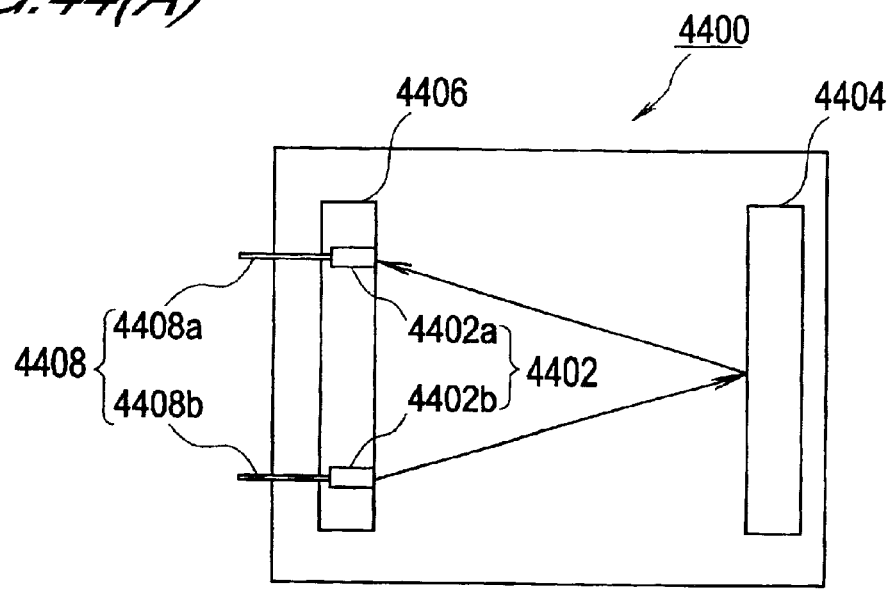
FIG. 44(A) is a view illustrating a constructional example of a prior art optical switch.
Figure 44B:
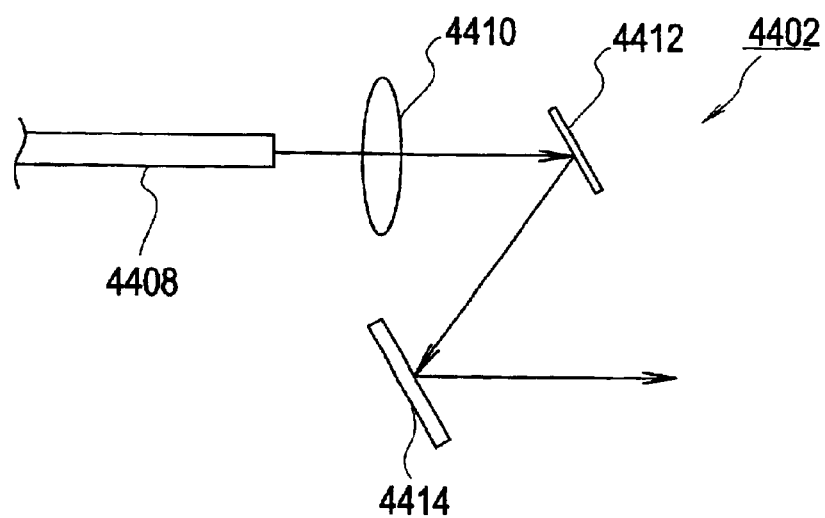
FIG. 44(B) is a view illustrating a constructional example of an optical deflection element employed in a prior art optical switch.

Referring to the single deflection element 4402b provided in input side switching element 4200 in the optical switch 4400 shown in FIG. 44, FIG. 42 is a view given in explanation of the operation with optical deflection element 4402a provided in the output side switching element 4202 corresponding thereto. Duplicated description of identical structure and operation with FIG. 44 described in the prior art will therefore be omitted.

Also, in FIG. 42, the straight lines linking the various sections illustrate diagrammatically the shape of the beams in each section. Also, the arrows shown at the moveable mirrors 4414a, 4414b in the Figure indicate the direction of movement of these moveable mirrors 4414a, 4414b. Drive of these moveable mirrors 4414a, 4414b is performed by varying the drive voltage using for example the same method as that described in FIG. 12.

First of all, the condition in which a circuit is maintained, after completion of changeover, will be described.

Figure 43:
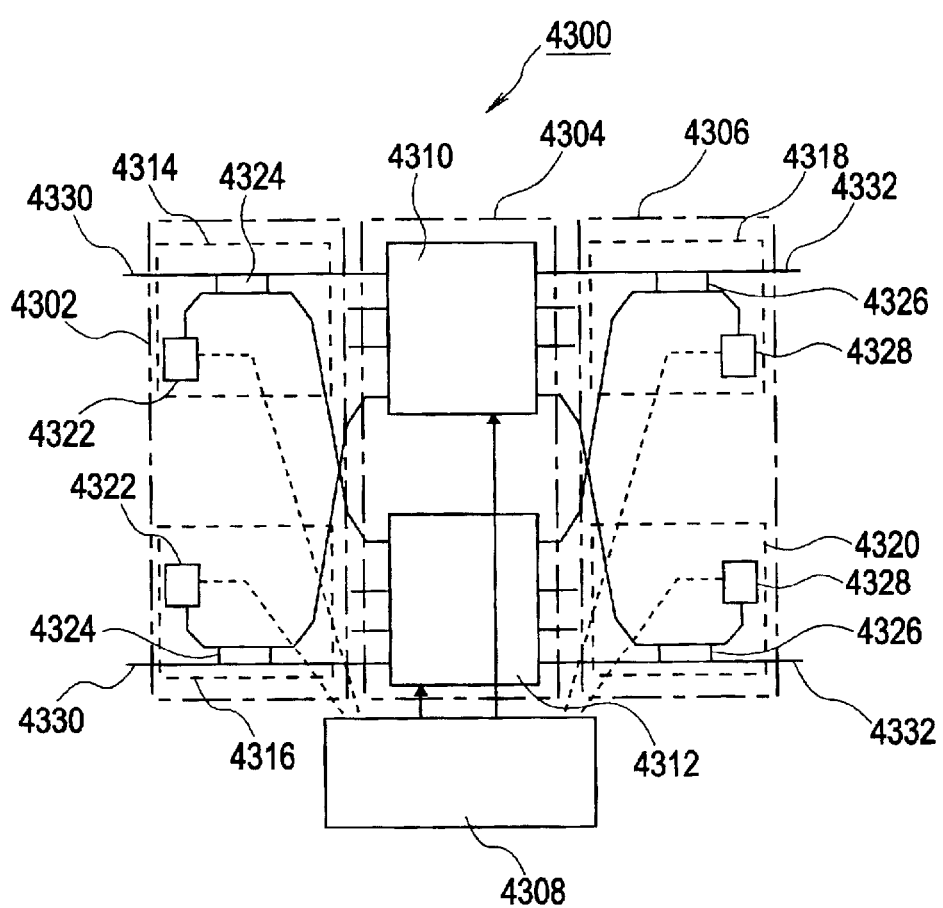
FIG. 43 is a view illustrating a constructional example of the tenth embodiment.

At this point, the monitor 4328 provided in optical switch device 4300 of FIG. 43 extracts information of input port number using an identification signal contained in the monitoring signal.

In FIG. 42, offset of the beam angle may occur due to secular change, for example change of drive voltage or temperature fluctuations etc of moveable mirror 4414a provided on input side switching element 4200. Caused by this offset, fluctuation of the focal point position on output fiber 4408b and hence fluctuation of optical power of the signal occur.

This fluctuation is detected by monitor 4328 provided in optical switch device 4300 of FIG. 43. Operation control section 4308 then determines, by detecting this fluctuation using information sent from monitor 4328, that offset of the beam angle has occurred.

In this situation, the optical switch device in FIG. 43 must again feed back from operation control section 4308 to optical switch 4400 information for making the angle of moveable mirrors 4414a, 4414b in FIG. 42 the correct angle. Operation control section 4308 must then determine which mirror has rotated to what angle in what direction.

Operation control section 4308 therefore sends information to optical switch 4400 such as to rotate moveable mirrors 4414a, 4414b in FIG. 42 slightly, within a range that has no effect on the data signal. As a result, the drive voltage for operating moveable mirrors 4414a, 4414b in optical switch 4400 is slightly changed.

Monitor 4328 detects the fluctuation of optical power of the signal that is thereby produced. Using this information, operation control section 4308 sends information for applying adjustment in the direction of increasing power to optical switch 4400. Thus, optical switch 4400 is restored to the optimum condition by controlling the drive voltage used to actuate moveable mirrors 4414a, 4414b.

Thus, whether or not correction is possible and by applying what degree of voltage in what direction can be monitored by applying slight rotational swings, always at respectively different periods, by changing the drive voltages to the moveable mirrors 4414a, 4414b in FIG. 42.

Also, secular changes such as changes in rigidity of the moveable mirrors can thereby be detected. The zero-point movement of the moveable mirror angle can be detected in terms of secular change of the moveable mirror control voltage whilst this is being held. It can also be ascertained whether or not the moveable mirror moves when required, by means of information relating to control of these mirrors. Such control is performed by operating control section 4308.

What is claimed is:

1. An optical switch device comprising:
   an optical switch having a moveable section for switching;
   a monitor section that monitors emitted light from said optical switch; and
   an operation control section for adjusting a control condition of switching of said optical switch by controlling said moveable section for switching in response to a monitoring signal from said monitor section;
   wherein said moveable section for switching comprises optical signal introduction means that inputs an optical signal to said optical switch;
   said monitor section comprises optical signal output means comprising an optical signal distribution section, and a monitor;
   said optical signal distribution section distributes and outputs said optical signal output from said optical switch to outside said monitor and the optical switch device;
   wherein said optical signal introduction means comprises a monitoring signal output source and a signal synthesizing section;
   said signal synthesizing section inputs said input optical signal and monitoring signal output from said monitoring signal output source to said optical switch after converting these into a single synthesized signal; and
   said optical signal distribution section comprises a filter that extracts only said optical signal from said synthesized signal output from said optical switch and outputs said optical signal to outside the optical switch device.

2. The optical switch device according to claim 1, wherein the operation of said monitoring signal output source is controlled by said operation control section.

3. An optical switch device comprising:
   an optical switch having a moveable section for switching;
   a monitor section that monitors emitted light from this optical switch; and
   an operation control section for adjusting a control condition of switching of said optical switch by controlling said moveable section for switching in response to a monitoring signal from said monitor section;
   wherein said optical switch comprises a first optical switch and second optical switch;
   said moveable section for switching comprises first optical signal introduction means and second optical signal introduction means mutually of the same construction for inputting optical signals to said first optical switch and said second optical switch;
   said monitor section comprises first optical signal output means and second optical signal output means mutually of the same construction;
   said first and second optical signal output means respectively comprise an optical signal distribution section and a monitor;
   said optical signal distribution section distributes and outputs said optical signal output from said optical switch to outside said monitor and the optical switch device;
   wherein said first and second optical signal introduction means respectively comprise a monitoring signal output source and signal synthesizing section;
   said signal synthesizing section inputs the monitoring signal that is output from said monitoring signal output source and said optical signal input to said optical switch device to said first and second optical switches after converting them into a single synthesized signal; and said first and second optical signal output means comprises a filter that extracts only said optical signal from said synthesized signal output from said optical signal distribution section for outputting said optical signal to outside the optical switch device.

4. The optical switch device according to claim 3, wherein the operation of said monitoring signal output source is controlled by said operation control section.

* * * * *